(12) United States Patent
Tsurufuji et al.

(10) Patent No.: US 6,233,862 B1
(45) Date of Patent: May 22, 2001

(54) INTERLINE FISHING ROD

(75) Inventors: Tomoyoshi Tsurufuji, Sayama; Shoichi Koganei, Higashikurume; Eiji Sugaya, Tokyo; Hiroshi Hashimoto, Hachioji; Masaru Akiba, Tokorozawa; Futoshi Nishikawa, Higashikurume; Hiroyasu Suzue, Niiza; Isao Ohta, Higashikurume, all of (JP)

(73) Assignee: NGB Corporation

( * ) Notice: Subject to any disclaimer, the term of this patent is extended or adjusted under 35 U.S.C. 154(b) by 0 days.

(21) Appl. No.: 09/338,866

(22) Filed: Jun. 23, 1999

Related U.S. Application Data

(62) Division of application No. 08/929,893, filed on Sep. 15, 1997.

(51) Int. Cl.[7] ................................. A01K 87/00
(52) U.S. Cl. .............................................. 43/18.1
(58) Field of Search ............................ 43/18.1, 24

(56) References Cited

U.S. PATENT DOCUMENTS

| | | | | |
|---|---|---|---|---|
| 2,334,646 | * | 11/1943 | Price | 43/18.1 |
| 2,777,239 | * | 1/1957 | Cushman | 43/18.1 |
| 5,564,214 | * | 10/1996 | Tsurufuji | 43/24 |

* cited by examiner

Primary Examiner—Robert P. Swiatek
(74) Attorney, Agent, or Firm—Liniak, Berenato Longacre & White

(57) ABSTRACT

An interline fishing rod which not only prevents stress centralization but also includes a fishing line guide and is high in strength. A rod pipe (12) includes a joining portion (12T) in the leading end portion thereof, a forwardly narrowed taper portion (12S) located just in the rear of the joining portion (12T), and a straight or forwardly narrowed and gently tapered rod pipe main body portion (12H) located in the rear of the taper portion (12S). A fishing line guide (RG2) is provided on and protected from the inside wall of the rod pipe main body portion (12H), while the inside diameter (d2) of the fishing line guide (RG2) is set larger than the inside diameters (d0) and (d4). Reinforcing layers (H1, H2) for reinforcing a main body layer are provided in such a manner that it extends from the joining portion (12T) to at least the front-most position of the fishing line guide (RG2).

30 Claims, 22 Drawing Sheets

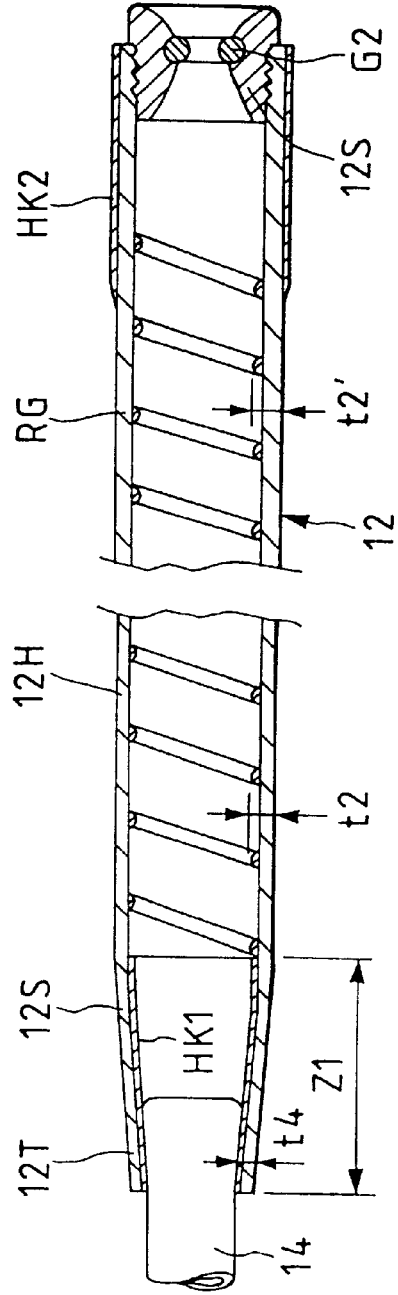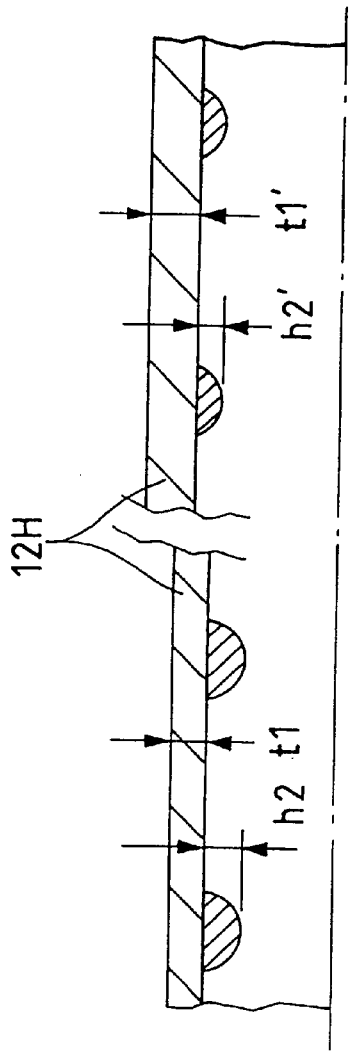

TB'  RG'

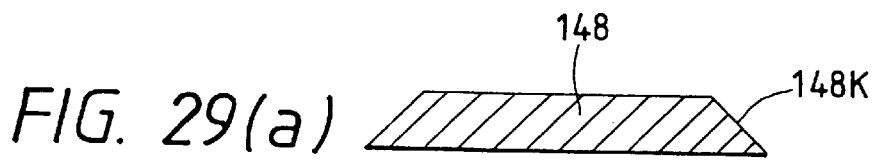
FIG. 29(a)
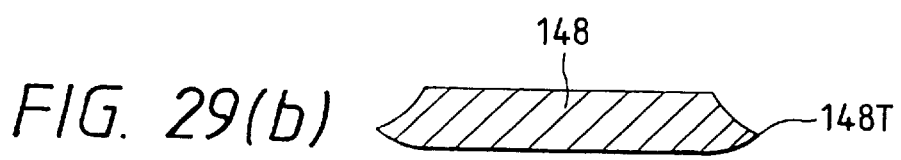
FIG. 29(b)
FIG. 30
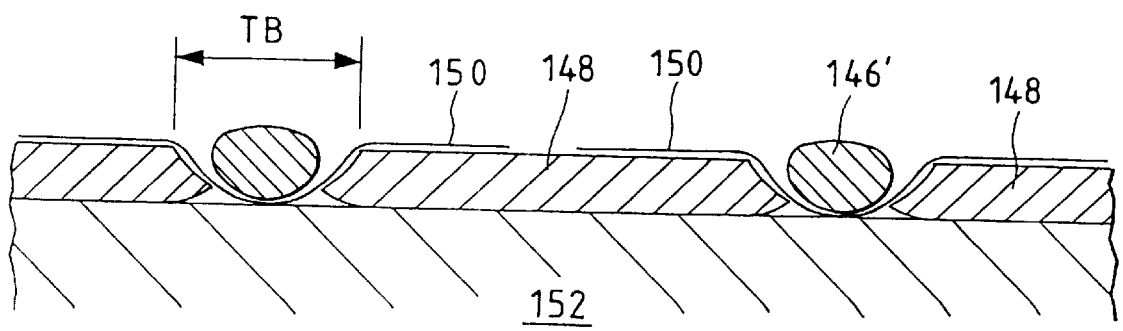

INTERLINE FISHING ROD

This is a divisional application of pending application having Ser. No. 08/929,893 filed Sep. 15, 1997.

BACKGROUND OF THE INVENTION

The present invention relates to an interline fishing rod in which an annularly or spirally shaped fishing line guide(s) is provided on and projected inwardly from the inside wall of a rod pipe.

In recent years, there has been used a fishing rod with a fishing line inserted and guided through the interior portion thereof because, with this type of fishing rod, a fishing line is difficult to be twined around the tip end of the fishing rod. In such interline fishing rod, since the fishing line is inserted through the interior portion of a rod pipe, generally, a fishing line guide is provided on the inner wall of the rod pipe in order to reduce the resistance of the fishing line. In connection with this structure for the interline fishing rod, there have been found various problems to be solved as follows:

(1) Since the joining portion of a fishing rod receives a load acting on a front side small diameter rod pipe which is joined with another rod pipe, the joining portion must have such a strength that can compete with the load. On the other hand, when a fishing line guide is provided in the interior portion of a large diameter rod pipe from the viewpoint of reduction of the resistance of a fishing line, a portion of the rod pipe including the fishing line guide is higher in rigidity than the other portions thereof in which such fishing line guide is not provided, and the centralization of stresses occurs in the portions having no fishing line guide. Especially, when the fishing line guide is so formed as to continue in a spiral shape, the rod pipe is lowered in strength in the neighboring portion of the portion where the fishing line guide is interrupted or terminated, and the stress centralization occurs in such lowered-strength portion of the rod pipe. In this manner, in a fishing rod, in general, the rigidity thereof varies according to the component portions thereof and, therefore, it is necessary to take measures to deal with the stress centralization. Also, if there is employed a swing-out joining system, then a forwardly arranged small diameter rod pipe must be structured in such a manner that it can be stored into the interior portion of a backwardly arranged large diameter rod pipe, which sets a limit on the dimensions of the respective component portions of the fishing rod. That is, the balance of the rigidity of the whole fishing rod must be set in compliance with such dimensional restrictions as well as in consideration of the stress centralization, so that the fishing rod can be flexed smoothly as a whole.

(2) In Japanese Patent Publication No. 8-172980 of Heisei, in view of the fact that, if a fishing line guide is formed such that it has a circular section, then it will be contacted with a fishing line in a point contact manner, which impairs the durability of the fishing line guide and fishing line, there is disclosed an interline fishing rod, including fishing line guides which are formed in a spiral manner and each of which has a trapezoidal section.

However, an experiment conducted by the present applicants shows that, when a large number of fishing line guides such as the spiral-shaped fishing line guides are arranged, the shape disclosed in the above-mentioned patent publication is not preferred from the viewpoint of reducing the resistance of the fishing line in such a manner that the fishing line guides are prevented against wear in the special points thereof and thus the durability of the fishing line guides is also kept from being impaired.

(3) There is provided an interline fishing rod in which a large number of fishing line guides, which are provided separately and are connected together continuously in an annular or spiral manner for guiding the fishing line, are provided on and projected from the inner surface of a rod pipe. In such projecting provision of the fishing line guides on the inner surface of the rod pipe, there is employed a method in which fishing line guide mother material is wound around a core metal after a thick tape having a thickness equal to or more than the height of the fishing line guides is wound around the core metal.

However, when the thick tape is wound around the core metal, due to its thickness and the like, the thick tape is difficult to be in close contact with the core metal and is thus hard to be stabilized in its wound condition. Also, when the thick tape is removed later from the rod pipe after it is formed, the removing operation must be performed efficiently.

(4) In view of the manufacturing method for providing the fishing line guides on the inner surface of the rod pipe, there arise problems that, when the fishing rod is flexed, stresses are centralized on the rod pipe main body side so that the rod pipe can be broken at such stress-centralized portion, and also that the above-mentioned fishing line guides are poor in durability. Further, even when the fishing line guides are provided, if the shapes and sizes of the fishing line contact portions of the fishing line guides are not set properly, then it is not possible to enhance the reduction effect of the fishing line resistance.

(5) As means for providing fishing line guides, in Japanese Utility Model Publication No. 5-88259 of Heisei, there is disclosed an interline fishing rod in which a fishing line guide provided on and projected from the inner peripheral surface of a rod pipe main body layer is formed integrally with the rod pipe main body layer.

Conventionally, a rod pipe main body layer is generally formed thin in order to reduce the weight of the rod pipe. As described above, in the above-mentioned conventional fishing rod, the fishing line guide is formed integrally with such thin rod pipe main body layer, that is, the existence of the fishing line guide causes its peripheral portion to increase in rigidity. Therefore, when the fishing rod is flexed, stresses are centralized in the integrally formed fishing line guide peripheral portion of the rod pipe main body layer. Accordingly, when fish is caught and thus the fishing rod is flexed very greatly, there is a fear that the rod pipe can be broken due to such stress centralization.

(6) As noted above, in the interline fishing rod, in view of the fact that the fishing line is inserted and guided through the interior portion of the rod pipe, since there arises a basic problem that the resistance of the fishing line increases, there is provided an annular guide ring or a spiral-shaped fishing line guide in the interior portion of the rod pipe for receiving the fishing line, thereby preventing an increase in the resistance of the fishing line. Also, in the fishing rod with a fishing line guided outside the rod, there are provided on the outer periphery of the fishing rod a plurality of guide rings spaced apart from each other in the longitudinal direction of the fishing rod, and the fishing line is inserted and guided through the guide rings.

In a fishing rod manufacturing method in which a spiral-shaped fishing line guide is integrally provided on and projected from the inner surface of a rod pipe, generally, a heat resisting tape having a thickness corresponding to the projection amount of the fishing line guide is wound around a core metal, fishing line guide forming mother material is wound in a clearance existing between the side edges of the tape wound, a prepreg for forming a rod pipe main body is then wound from above the fishing line guide forming mother material, and the above-mentioned components or the resultant assembly is then heated to thereby form a rod pipe.

However, if the size or shape of the tape clearance is deviated from a predetermined value, then the fishing line guide forming mother material cannot be wound correctly, or, when the components are heated, the resin of the rod pipe main body forming prepreg spreads into a gap between the tape clearance and fishing line guide forming mother material to thereby form burrs, so that the thus formed fishing line guide can damage the fishing line or can bring about an increase in the fishing line resistance. In consideration of a mold releasing property or the like, the above-mentioned heat resisting tape is generally composed of a synthetic resin tape which is formed of single material such as fluorine resin or the like and, therefore, the tape is rigid and thus is difficult to be wound around a portion which is small in diameter. On the other hand, if the tape is formed flexible, then the elongation percentage of the tape is also increased and, therefore, when the tape is wound with tension applied thereto, the section shape of the tape is deformed, which causes the tape clearance or the like to be deviated from the predetermined value.

Also, when the tape is removed after the rod pipe is formed, the tape can be cut during the tape removing operation, which makes it difficult to remove the remaining portions of the tape.

Further, from the viewpoint of the cost and weight thereof, the pitch of the spiral-shaped fishing line guide or the clearance between the annular guide rings must be set large. Or, when the inside diameter of a rod pipe is too small and thus it is difficult to provide a projecting fishing line guide on the inner surface of the rod pipe, instead of providing the projecting fishing line guide, slightly uneven portions or slight undulations are formed on the inner surface of the rod pipe and water repellent material or highly sliding material such as wax or the like is stored and held in the slight undulations, in order to reduce the resistance of the fishing line. That is, there is a need to manufacture easily and simply a fishing rod which can satisfy these requirements. I Moreover, in the fishing rod with a fishing line guided outside the rod, if the clearance between a plurality of guide rings provided on the outer periphery of the rod pipe at such clearance from each other in the longitudinal direction thereof is too large, then there is a possibility that the fishing line can hang down and touch the surface of the rod pipe in such large clearance. Especially, if the rod pipe surface is wet with water, then there arises an inconvenience that the fishing line adheres to the wet rod pipe surface and thus the fishing line cannot be played out smoothly.

(7) In an interline fishing rod, in order to prevent a fishing line from touching the inner surface of a rod pipe to thereby increase the resistance of the fishing line, it is quite common to provide a fishing line guide in the interior portion of the rod pipe. Such fishing line guide includes a ring-shaped fishing line guide, a spiral-shaped fishing line guide and the like. The spiral-shaped fishing line guide is used because it can be provided easily and at low costs.

However, if a rod pipe including a spiral-shaped fishing line guide is flexed greatly due to a load applied thereto, then a fishing line is received substantially only by the local portion of the fishing line guide that exists at a position of a large flexure curvature. Therefore, it is not sufficient to simply devise the cross section shape of the spiral-shaped fishing line guide itself. If the shape of the cross section of the spiral-shaped fishing line guide extending in a direction at right angles to the longitudinal direction of the rod pipe is approximate to the shape of a ring-shaped fishing line guide, then the fishing line can be received in a proper condition and, therefore, such spiral-shaped fishing line guide is ideal as a fishing line guide. However, in this case, if the circumferential shape of such cross section is formed in a projecting shape, then the fishing line is easy to come out of the projectingly-shaped surface of the fishing line guide and, therefore, such fishing line guide is not suitable for a fishing line guide. Also, as in the spiral-shaped fishing line guide in which the shape of the cross section thereof is approximate to that of the ring-shaped fishing line guide, if the most part of the inner periphery of a rod pipe is almost covered by the spiral-shaped fishing line guide, similarly to a case in which a rod pipe is increased in thickness more than necessary, the rod pipe increases in weight, which is contrary to the reduction of the weight of a fishing rod. Further, if the reinforced area of a fishing line guide is collectively arranged only in the local portion of the inner periphery of the fishing line guide, then stress centralization is easy to occur there.

SUMMARY OF THE INVENTION

In view of the above-mentioned circumstances, it is an object of the invention to provide a high-strength interline fishing rod which includes a fishing line guide in the interior portion thereof in such a manner that the above-mentioned stress centralization can be prevented.

In attaining the above object, according to the invention, there is provided an interline fishing rod, in which a forwardly narrowed taper portion is formed just in the rear of a joining portion existing in the leading end portion of a rod pipe, the portion of the rod pipe that is situated backwardly of the above taper portion is a rod pipe main body portion having a straight shape or a forwardly narrowed and gently tapered shape, a fishing line guide is provided on and projected inwardly from the inside wall of the rod pipe main body portion, the inside diameter of the fishing line guide is set larger than the inside diameter of the joining portion, and a reinforcing layer for reinforcing a main body layer is disposed in such a manner that it extends from the joining portion to at least the front-most end position of the fishing line guide.

In the interline fishing rod having the above-noted feature, since the fishing line guide is provided, the resistance of the fishing line is reduced and, because the inside diameter of the fishing line guide is set larger than the inside diameter of the joining portion existing in the front end portion of the rod pipe, even when the present rod pipe is joined with a front side small diameter rod pipe in a swing-out joining manner, the front side small diameter pipe can be stored into the interior portion of the present rod pipe. Also, due to the fact that the reinforcing layer for reinforcing the main body layer is so provided as to extend from the joining portion of the front end portion of the rod pipe up to at least the front-most end position of the present rod pipe, it is possible to prevent stresses from being centralized on an area which exists between the joining portion so reinforced by the reinforcing layer as to have high rigidity and an area in which the fishing line guide is provided and also which is originally low in rigidity, when the fishing rod is flexed. Further, partly because the fishing line guide having a reinforcing action as well is so provided as to continue with the reinforcing layer, and partly because the greater part of the reinforcing layer is so provided as to exist in the taper portion having a forwardly narrowed taper larger than the taper of the rod pipe main body portion and in the joining portion situated in front of the taper portion, a difference in rigidity between the rod pipe main body portion and the thus reinforced portions is small and thus the rigidity of the rod pipe is well balanced, so that the fishing rod can be flexed smoothly.

Also, according to the invention, there is provided an interline fishing rod, in which a fishing line guide is provided integrally on and projected inwardly from the inside wall of a rod pipe, and a reinforcing layer for reinforcing a main body layer is disposed in such a manner that it extends from a joining portion formed in the rear end portion of the rod pipe to at least the front-most end position of the fishing line guide.

In the interline fishing rod having the above-noted feature, since the fishing line guide is provided, the resistance of the fishing line is reduced and, due to the fact that the reinforcing layer is so provided as to extend from the joining portion of the rear end portion of the rod pipe down to at least the rear-most end of the present rod pipe, it is possible to prevent stresses from being centralized on an area which exists between the joining portion so reinforced by the reinforcing layer as to have high rigidity and an area in which the fishing line guide is provided and also which is originally low in rigidity, when the fishing rod is flexed. Further, because the fishing line guide having a reinforcing action as well is so provided as to continue with the reinforcing layer, the flexure of the rod pipe can be made smooth continuously toward the leading side of the rod pipe.

Another object of the invention is to provide an interline fishing rod which can secure durability and includes a large number of fishing line guides provided in the interior portion of a pipe element thereof and each having a shape to be able to reduce the resistance of a fishing line as much as possible.

In attaining the above object, according to the invention, there is provided an interline fishing rod, which uses, as a pipe element, the rod pipe main body of the present fishing rod or a pipe member that is inserted removably into the interior portion of the rod pipe main body, and also which includes a large number of fishing line guides provided on and projected from the inside wall of the pipe element, characterized in that each of the fishing line guides has such a wide section shape that the width thereof is two or more times as large as the height thereof and the fishing line guide surface of the fishing line guide is a curved surface projecting toward the central side of the pipe element.

Since the fishing line guide is formed large in width, even if resistance due to the contact of the fishing line is given to the fishing line guide surface thereof on the central side of the pipe element, the fishing line guide is stable. Also, because the fishing line guide surface is a curved surface which projects on the central side of the pipe element, the area (length) of contact of the fishing line is small or like a dot, so that the resistance of the fishing line can be made small as much as possible. Even in this case, since the fishing line guides are provided in a large number, there is also eliminated the possibility that the special points of the fishing line guides can be worn and the durability of the fishing line guides can be thereby lowered.

Another object of the invention is to provide a fishing rod manufacturing method for projectingly providing a fishing line guide on the inner surface of a rod pipe main body, which is improved in operation efficiency and can improve the quality of a product.

In attaining the above object, according to the invention, there is provided a fishing rod manufacturing method in which a fishing line guide is provided on and projected from the inside wall of a rod pipe main body formed of synthetic resin as the matrix thereof and reinforced with reinforcing fibers, characterized in that resin is applied onto a core member before a tape or a sheet used to form on the core member a groove on which mother material for forming the fishing line guide can be wound, or resin is applied onto the tape or sheet wound around the core member before a prepreg for forming the rod pipe main body is wound around the core member.

According to the above-noted method, since the resin is applied to the core member before the tape or sheet used to form the groove is wound, or the resin is applied onto the tape or sheet wound on the core member before the prepreg for forming the rod pipe main body is wound, the tape (or sheet) and rod pipe main body forming prepreg, while they are being wound, are difficult to slide with respect to their base members such as the core member and the like and are thereby stabilized, which in turn facilitates the winding operation.

Also, there is provided a fishing rod manufacturing method in which a fishing line guide is provided on and projected from the inside wall of a rod pipe main body formed of synthetic resin as the matrix thereof and reinforced with reinforcing fibers, characterized in that a core member having a tapered outer shape is used, and a tape used to form on the core member a groove on which mother material for forming the fishing line guide can be wound starting from one of the front and base sides of the core member in which the inclination angle of the tape decreases when the inclination angle is measured on the basis of the circumferential direction of the core member extending at right angles to the longitudinal direction of the core member.

Also, according to the above-noted method, since the winding of the tape starts from the side thereof which has a smaller inclination angle with respect to the core member, the start of the tape winding operation can be stabilized earlier, which facilitates the following steps of the tape winding operation.

Further, according to the invention, there can be provided a fishing line manufacturing method for projectingly providing a fishing line guide on the inner wall of a rod pipe main body formed of synthetic resin as the matrix thereof and reinforced with reinforcing fibers, in which, while a tape used to form on a core member a groove on which mother material for forming the fishing line guide can be wound is already wound around the core member and at least one end side of the tape is left free or unwound, a prepreg for forming the rod pipe main body is wound around on top of the tape.

Further, if the rod pipe main body forming prepreg is wound from above the tape with at least one end side thereof left unwound, then the tape can be pulled by holding the unwound end of the tape when the tape is removed after the rod pipe main body is formed, so that the tape can be removed easily. This makes it possible to carry out the fishing rod manufacturing operation with high efficiency.

Another object of the invention is to provide an interline fishing rod and a method for manufacturing the same, in which, even if a fishing line guide is provided on and projected from the inner surface of the rod pipe main body, the degree of reduction in the strength of the rod pipe is small as well as the durability of the fishing line guide and the fishing line can be guided with a high efficiency.

Also, it is another object of the invention to provide an interline fishing rod, which includes a fishing line guide high in both durability and fishing line guiding performance.

In attaining the above object, according to the invention, there is provided an interline fishing rod, including a fishing line guide provided on the inner surface of a rod pipe main body formed of synthetic resin as the matrix thereof and reinforced with reinforcing fibers, in which the fishing line guide is formed of fishing line guide mother material composed of a bundle of large number of fibers impregnated with synthetic resin, the fishing line guide has a substantially rice-ball-shaped cross section with the top portion thereof formed as a curved surface, and the angle of the two corners of the base of the rice ball shape is set substantially in the range of 45±15 degrees. Preferably, the angle may be set substantially in the range of 45±10 degrees. The shape of the rice ball means a shape which can be obtained by rounding the corners of a triangle.

When the angle of the two corners of the base of the rice ball shape is too small, the deformation spreading of the fishing line guide mother material when it is formed by pressure is difficult to reach the two corners of the base, and, even if resin flows in, a sufficient amount of resin to fill up the corners is difficult to flow, with the result that the two corners provide the foot portions of the rice-ball shape which are short of resin. Also, when the angle of the two corners of the base of the rice ball shape is too large, that is, when the vertex angle of the rice ball shape is too small, the deformation spreading of the fishing line guide mother material when it is formed by pressure is difficult to reach the top portion of the rice ball shape, and, even if resin flows in, the resin flows into the top portion almost only from the fishing line guide mother material and thus a sufficient amount of resin to fill up the top portion does not flow in, with the result that the top portion runs short of resin. Therefore, if the angle of the two corners of the base is set substantially in the range of 45±15 degrees, then it is possible to prevent the occurrence of the areas that are short of fibers or resin, so that the durability and fishing line guiding performance of the fishing line-guide can be enhanced. This also prevents not only the occurrence of the stress centralization in the rod pipe main body caused by the shortage of the fibers or resin in the foot portions when the angle of the two corners of the base is small, but also the occurrence of the stress centralization in the rod pipe main body caused when the angle is large. That is, there can be provided an interline fishing rod in which the strength of the rod pipe main body can be maintained.

Also, due to the fact that not only the above angle of the two corners of the base is set in the above-mentioned angle range but also the outer shape of the fishing line guide is formed in a rice ball shape, the top portion of the fishing line guide is not too wide, thereby being able to reduce the resistance of the fishing line.

Also, there is provided an interline fishing rod, including a fishing line guide provided on the inner surface of a rod pipe main body formed of synthetic resin as the matrix thereof and reinforced with reinforcing fibers, in which the fishing line guide has a substantially rice-ball-shaped cross section with the top portion thereof formed as a curved surface, and the distance between two points of intersection, where two lines extended from the two sides of the rice ball shape respectively intersect a line which is drawn in such a manner that it is tangent to the curved surface top portion and parallel to the base of the rice ball shape, is set to be 0.1 mm or more and less than 0.4 mm.

Since the distance between the points of intersection is set 0.1 mm or more and less than 0.4 mm, the top portion of the fishing line guide to be contacted by the fishing line is not too sharp and not too wide, which is just proper for the fishing line guiding performance (fishing line damage prevention and fishing line resistance reduction) of the fishing line guide. When the distance is less than 0.1 mm, then the top portion is too sharp, so that the fishing line can be cut easily and can be damaged heavily. When it is 0.4 mm or more, the contact length of the top portion with the fishing line is too large, thereby increasing the resistance of the fishing line.

There is provided a method for manufacturing an interline fishing rod in which a fishing line guide is provided on and projected from the inner surface of a rod pipe main body formed of synthetic resin as the matrix thereof and reinforced with reinforcing fibers, characterized in that a tape is wound around a core member with a clearance in which fishing line guide mother material can be wound, or a tape or sheet including a groove in which the fishing line guide mother material can be wound is wound around the core member, the fishing line guide mother material is formed in such a manner that a large number of fibers are tied up in a bundle, the whole of the bundle of large number of fibers is twisted and the thus twisted bundle is impregnated with synthetic resin, the tape capable of forming said clearance has a trapezoidal cross section with the angle of the two corners of the lower base side of the trapezoid being set substantially in the range of 45±15 degrees, and the sheet or tape including the groove is structured such that an angle formed by a surface extended linearly from the side wall surface forming the groove and the surface of the sheet or tape is set substantially in the range of 45±15 degrees.

If the two corners angle of the trapezoidal cross section of the tape so wound as to form the clearance in which the fishing line guide can be wound and the angle between the groove side wall surface and the surface of the sheet or tape are too small, then the deformation spreading of the twisted fishing line guide mother material when it is formed by pressure is difficult to reach the foot portion of the clearance or groove and, even if the resin flows in, a sufficient amount of resin to fill up this area is difficult to flow in, so that the foot portion runs short of resin. Also, if the above-mentioned angles are too large, then the deformation spreading of the twisted fishing line guide mother material is difficult to reach the top portion of the clearance or groove and, even if the resin flows in, it flows into this area almost only from the fishing line guide mother material and thus a sufficient amount of resin to fill up this area does not flow in, so that the top portion runs short of resin. Therefore, if the angle is set substantially in the range of 45±15 degrees, then the occurrence of the areas that are short of fibers or resin can be prevented, and the fishing line guide is allowed to have high durability and fishing line guiding performance; and, not only the stress centralization in the rod pipe main body due to the shortage of fibers or resin in the foot portion when the angle is small, but also the stress centralization in the rod pipe main body caused when the angle is large can be prevented. In this manner, there can be provided an interline fishing rod in which the strength of the rod pipe main body can be maintained.

There is provided a method for manufacturing an interline fishing rod in which a fishing line guide is provided on and projected from the inner surface of a rod pipe main body formed of synthetic resin as the matrix thereof and reinforced with reinforcing fibers, the method comprising the steps of: winding a tape around a core member in such a manner that a proper clearance is provided between the side edges of the tape; arranging a thin tape or sheet in such a manner that the thin tape or sheet covers the clearance, or winding a tape or sheet including a proper groove around the core member with the groove facing outwardly; winding, in the clearance or groove, fishing line guide mother material which is produced in such a manner that a large number of fibers are tied up in a bundle, only the whole of the bundle of large number of fibers is twisted and the thus twisted bundle is impregnated with synthetic resin; winding mother material for forming the rod pipe main body from outside the fishing line guide mother material; and, removing the tape or sheet after the rod pipe is formed, while the section area of the clearance or groove capable of receiving the fishing line guide mother material is set substantially equal to the area of the cross section of the fishing line guide mother material. The thin tape or sheet can be left there according to cases.

The section area of the clearance or groove capable of receiving the fishing line guide mother material is substantially equal to the cross section area of the fishing line guide mother material, and the fishing line guide mother material is formed by twisting the bundle of fibers so that the fibers are difficult to become loose. Due to this, even if the mother material for forming the rod pipe main body is wound on the outside of the fishing line guide mother material and is then formed by pressure, the component fibers of the fishing line guide mother material are prevented from moving greatly, which in turn prevents the rod pipe main body forming mother material from moving into the clearance or groove, whereas the synthetic resin impregnated into the fishing line guide mother material mainly flows into the clearance or the remaining clearance of the groove. This prevents the reinforcing fibers of the rod pipe main body forming mother material from being disturbed, thereby being able to provide a high-strength rod pipe.

Also, since the fishing line guide is pressed toward the core member by pressure and is twisted so that the component fibers thereof can little move, the fibers prevail on the top portion side of the fishing line guide. Therefore, the top portion of the fishing line guide has resistance to friction by the fishing line, a shortage of resin is difficult to occur in the top portion, and the top portion provides a high fishing line guiding performance. Further, the fishing line guide mother material is formed in such a manner that only the whole of the bundle of the component fibers is twisted, that is, it is not structured in such a manner that there are a plurality of small bundle elements and they are then tied up in a large bundle. When the bundle elements are collected together into a large bundle, there are left boundaries between the bundle elements even after they are formed, resulting in the small resistance of the fishing line guide to the fishing line friction. When compared with this, the fishing line guide of the fishing rod formed according to the present invention can be enhanced in such resistance or durability.

It is another object of the invention to provide an interline fishing rod which not only includes a fishing line guide provided on and projected from the inner surface of a rod pipe main body layer to thereby be able to reduce the resistance of a fishing line, but also can prevent the rod pipe against breakage even if the fishing rod is greatly flexed.

In attaining the above object, according to the invention, there is provided an interline fishing rod, in which a fishing line guide is provided on and projected from the inner surface of a rod pipe main body layer produced by winding a prepreg formed of reinforcing fibers impregnated with synthetic resin, characterized in that a layer having a mold releasing property is interposed between the rod pipe main body layer and the fishing line guide.

Since the layer having a mold releasing property is interposed between the rod pipe main body layer and fishing line guide, the fishing line guide is not formed integrally with the rod pipe main body layer. Thus, if the flexure of the rod pipe is increased, then the fishing line guide is seen in appearance as well in such a manner that it is separated from the rod pipe main body layer, that is, stresses are not centralized as in a case when a fishing line guide is formed integrally with a rod pipe main body layer, thereby being able to prevent the rod pipe against breakage.

Also, the above-mentioned fishing line guide is provided in such a manner that it is embedded in a recessed portion formed in the rod pipe main body layer. In addition to the above effect, because the fishing line guide is provided in such a manner that it is embedded in a recessed portion formed in the rod pipe main body layer, although they are not united together, their mutual positions are difficult to shift and, even if rubbed by the fishing line, the fishing line guide is stabilized, thereby being able to prevent an increase in the fishing line resistance.

Further, there is provided a method for manufacturing an interline fishing rod, in which, after fishing line guide mother material is disposed, a mold releasing agent is applied onto the upper side of at least the fishing line guide mother material or a film-like member having a mold releasing property is disposed on the same, before a prepreg for forming a rod pipe main body layer is wound on the fishing line guide mother material.

Before the prepreg for forming the rod pipe main body layer is wound on the fishing line guide mother material, the mold releasing agent is applied onto the upper side of the fishing line guide mother material or a film-like member having a mold releasing property is disposed on the same. Therefore, after then, if the prepreg for forming the rod pipe main body layer is wound and the thus formed winding assembly is then heated according to the usual method, then the rod pipe can be formed. At the same time, the fishing line guide projected inwardly can be provided easily and at low costs through the layer having a mold releasing property.

Accordingly, the thus formed rod pipe provides the same effect as noted above.

It is another object of the invention to provide a fishing rod manufacturing method in which, in an interline fishing rod, a projecting fishing line guide having a precision allowing a fishing line to be guided smoothly can be provided and, in a fishing rod with a fishing line guided outside, uneven portions or undulations are formed on the surface of a rod pipe and the fishing line can be received and guided smoothly by the projecting portions of the undulations. Also, it is another object of the invention to provide a method in which, in an interline fishing rod, slightly uneven portions or undulations can be formed simply and easily on the inner surface of a rod pipe.

In attaining the above objects, according to the invention, there is provided a fishing rod manufacturing method, in which a prepreg formed of high-strength fibers impregnated with or mixed with resin is wound and a rod pipe is formed by heating, the fishing rod manufacturing method comprising the steps of: winding and disposing a tape, which consists of an integrated body of a layer formed of flexible material having heat resistance to the heating temperatures of said rod pipe and a reinforcing layer composed of an aggregate of fibers smaller in elongation than the flexible material and so disposed as to adjoin the flexible material layer, on an inner mold such as a core metal or the like; winding fishing line guide mother material in a space between the side edges of the tape; winding a rod pipe main body forming prepreg on both of the fishing line guide mother material and tape; heating and forming the above-mentioned respective components as a whole; and, removing the tape from the components after completion of the above-mentioned heating and formation.

The tape is formed in such a manner that the flexible material layer and the reinforcing layer consisting of an aggregate of fibers small in elongation are so disposed as to adjoin each other and are then united together into an integral body. Although the tape is small in elongation due to the existence of the reinforcing layer, the tape is easy to flex because the reinforcing layer is an aggregate of fibers, so that the tape can be arranged easily along even a core metal having a small diameter and thus it can be wound with high precision. Also, the tape is difficult to deform due to the existence of the reinforcing layer even if it is wound with tension applied thereto, which makes it possible to define the space between the side edges of the tape with high accuracy. Therefore, if the fishing line guide mother material is wound and disposed in the space defined with high accuracy and is then heated to be thereby united with the rod pipe main body forming prepreg, and, after then, the above-mentioned integrated tape is removed from the components formed, then there can be produced a fishing rod which includes a high-precision fishing line guide. Since the integrated tape is reinforced with the reinforcing layer, the tape is prevented against being cut when it is removed, so that the tape removing operation can be executed smoothly.

The fishing rod manufacturing method can be used not only in a case in which a fishing line guide is formed on the inner surface of a rod pipe but also in a case in which mother material for forming other types of projecting portions is wound on the inner surface of the rod pipe.

There is provided a fishing rod manufacturing method, in which a prepreg formed of high-strength fibers impregnated with or mixed with resin is wound and a rod pipe is formed by heating, the fishing rod manufacturing method comprising the steps of: winding a rod pipe main body forming prepreg; winding and a tape, which consists of an integrated body of a layer formed of flexible material having heat resistance to the heating temperatures of the rod pipe and a reinforcing layer composed of an aggregate of fibers smaller in elongation than the flexible material and so disposed as to adjoin the flexible material layer, on the rod pipe main body forming prepreg; winding string-shaped mother material in a space between the side edges of the tape wound; disposing an outer mold including a tightening tape and an outer metal mold on both of the string-shaped mother material and tape, and heating and forming the above-mentioned respective components as a whole; and, removing the tape from the components after completion of the above-mentioned heating and formation.

Also, if an integrated tape having the same property is wound on the rod pipe main body forming prepreg, the string-shaped mother material is wound and disposed in the space between the side edges of the tape and is then heated to be thereby united with the rod pipe main body, and, after then, if the integrated tape is removed, then there can be produced a fishing rod which includes a high-precision undulated surface and, in this fishing rod, even if the surface is wet, the fishing line is difficult to adhere to the surface.

There is provided a fishing rod manufacturing method, in which a prepreg formed of high-strength fibers impregnated with or mixed with resin is wound and a rod pipe is formed by heating, the fishing rod manufacturing method comprising the steps of: winding a tape, which has heat resistance to the heating temperature of the rod pipe and includes small undulations at least on one side surface thereof, on an inner mold including a core metal or the like, with such one side surface facing outwardly; winding a rod pipe main body forming prepreg from above the tape wound; heating and forming the above-mentioned respective components; and, removing the tape after completion of the above-mentioned heating and formation.

The tape so formed as to include the slight undulations is wound with the surface of the undulated side thereof facing to the rod pipe main body forming prepreg, and the rod pipe main body forming prepreg is wound from above the tape wound. Due to this, on the inner surface of the rod pipe with the tape removed after completion of the above-mentioned heating and formation, there are formed slight undulations that correspond to the slight undulations of the tape. Water repellent material and highly sliding material can be stored and held in such undulations and thus the fishing line can be guided smoothly. Also, the slight undulations can be formed at the same time when the rod pipe is heated and formed, that is, they can be formed easily and simply.

It is another object of the invention to provide an interline fishing rod which is not contrary to the expected weight reduction, prevents the occurrence of the stress centralization, and, even when a rod pipe is flexed, is able to guide a fishing line in the reinforced area of a fishing line guide.

In attaining the above object, according to the invention, there is provided an interline fishing rod, including a spiral-shaped fishing line guide provided in the interior portion of a rod pipe, in which, in the transverse section of the spiral-shaped fishing line guide in a direction intersecting at right angles to the axial direction of the rod pipe in the interior portion of which the spiral-shaped fishing line guide is provided; the spiral-shaped fishing line guide includes a reinforced area with a relatively large amount of reinforcing material contained therein, and resin areas which are respectively formed mainly of resin and are located on the two sides of the reinforced area; the inner peripheries of the two resin areas are so formed as to be substantially continuous with the inner periphery of the reinforced area, while the reinforced area inner periphery is so formed as to have a substantially recessed or plane shape; and, when the central position of the outer periphery of the reinforced area is set in the lower-most position, the two resin areas respectively decrease little by little in thickness as they become more distant from the reinforced area, while the respective end portions of the resin areas are present at positions of 90 degrees or less in the circumferential direction of the rod pipe from the central position and higher than the reinforced area.

The respective inner peripheries of the two resin areas situated on the two sides of the reinforced area and formed mainly of the resin are so formed as to be substantially continuous with the inner periphery of the reinforce area and, at the same time, the respective resin areas decrease gradually in thickness as they become distant from the reinforced area, thereby being able to prevent the stress centralization of the rod pipe from occurring in the two side end portions of the reinforced area. Also, since the periphery of the fishing line guide, even when the resin areas and reinforced area are put together, is less than half of the inner periphery of the rod pipe, the reduced weight of the rod pipe is possible. Further, due to the fact that the inner peripheries of the two resin areas are so formed as to be substantially continuous with the inner periphery of the reinforced area, while the reinforced area inner periphery is so formed as to have a substantially recessed or plane shape, and also due to the fact that, when the central position of the outer periphery of the reinforced area is set in the lower-most position, the respective end portions of the two resin areas are present at positions higher than the reinforced area, even if the fishing line is situated in the resin areas, it moves from there at once down into the reinforced area having excellent wear resistance and is stabilized there.

The expression "the inner peripheries of the two resin areas are so formed as to be substantially continuous with the inner periphery of the reinforced area, while the reinforced area inner periphery is so formed as to have a substantially recessed or plane shape" is expressed as the structural requirements that the fishing line is to be situated in the reinforced area not in the resin areas for its stable guidance. That is, this expression implies general structures which are capable of guiding a fishing line in a stable manner.

BRIEF DESCRIPTION OF THE DRAWINGS

In the accompanying drawings:

FIG. 16 is a longitudinal section view of another rod pipe;

FIG. 17 is an explanatory view of a difference in the size of a fishing line guide between the front and rear positions thereof in the interior portion of a rod pipe;

Figure 21A:
Figure 21B:
Figure 21C:
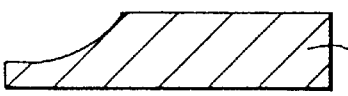
Figure 22:
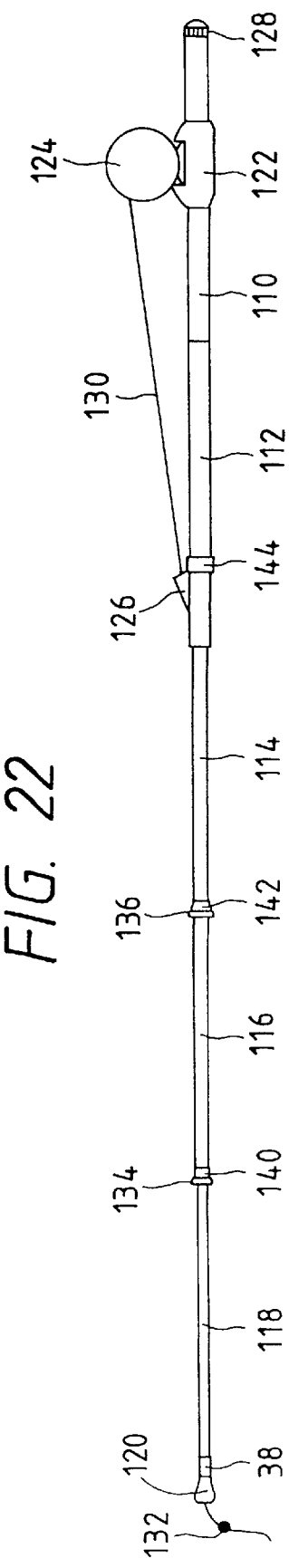
Figure 23:
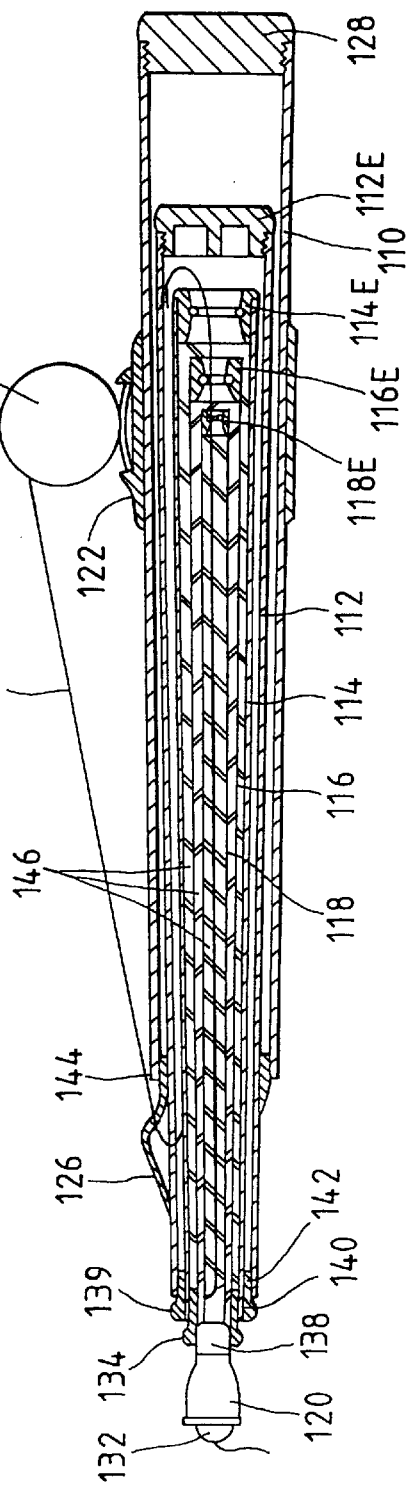
Figure 24:
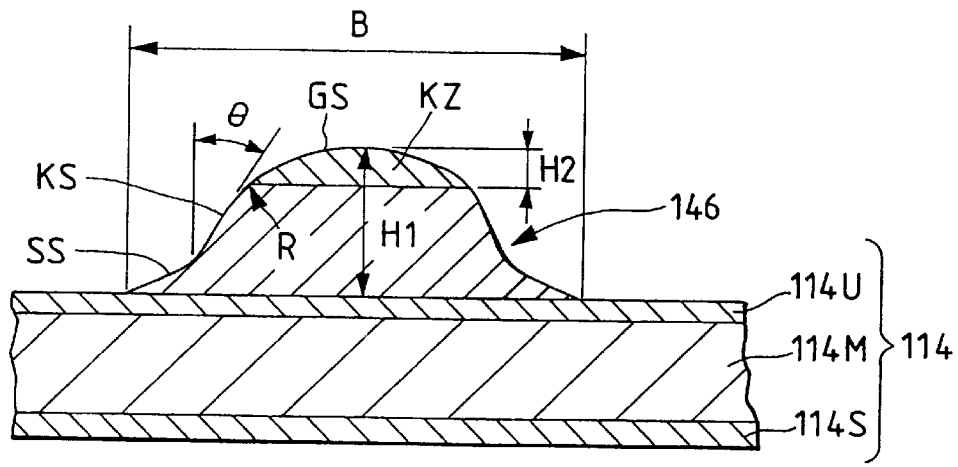
Figure 25:
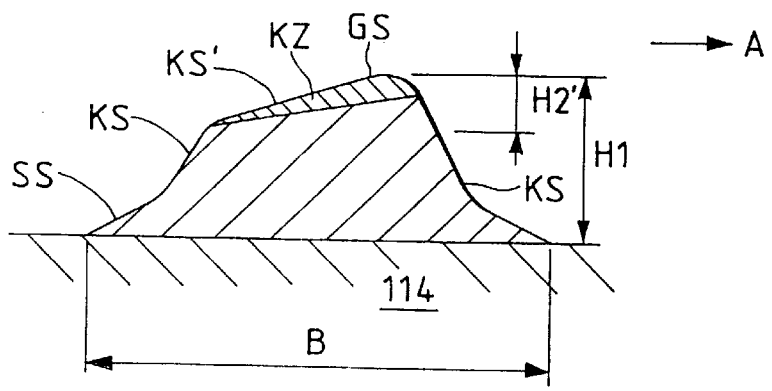
Figure 26:
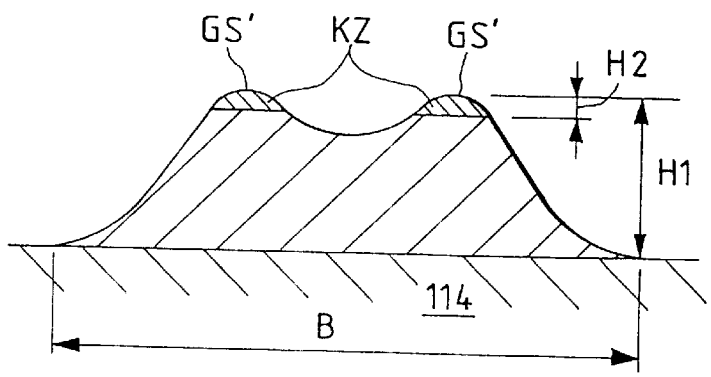
Figure 27:
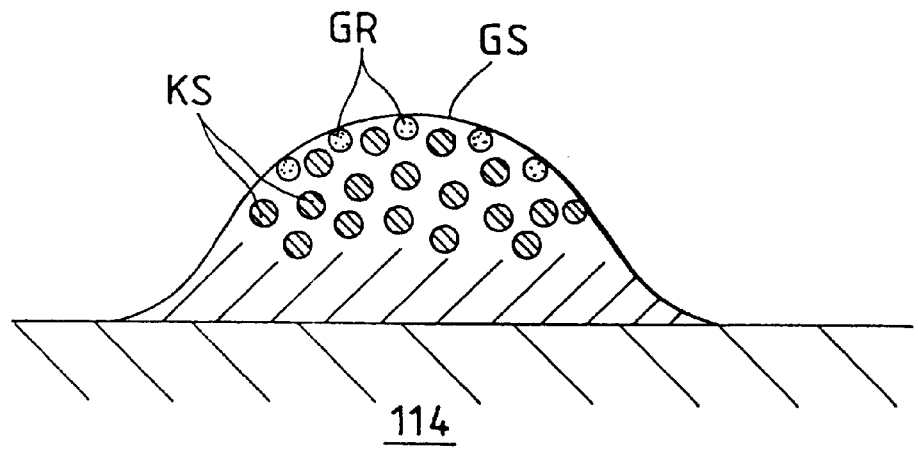
Figure 28:
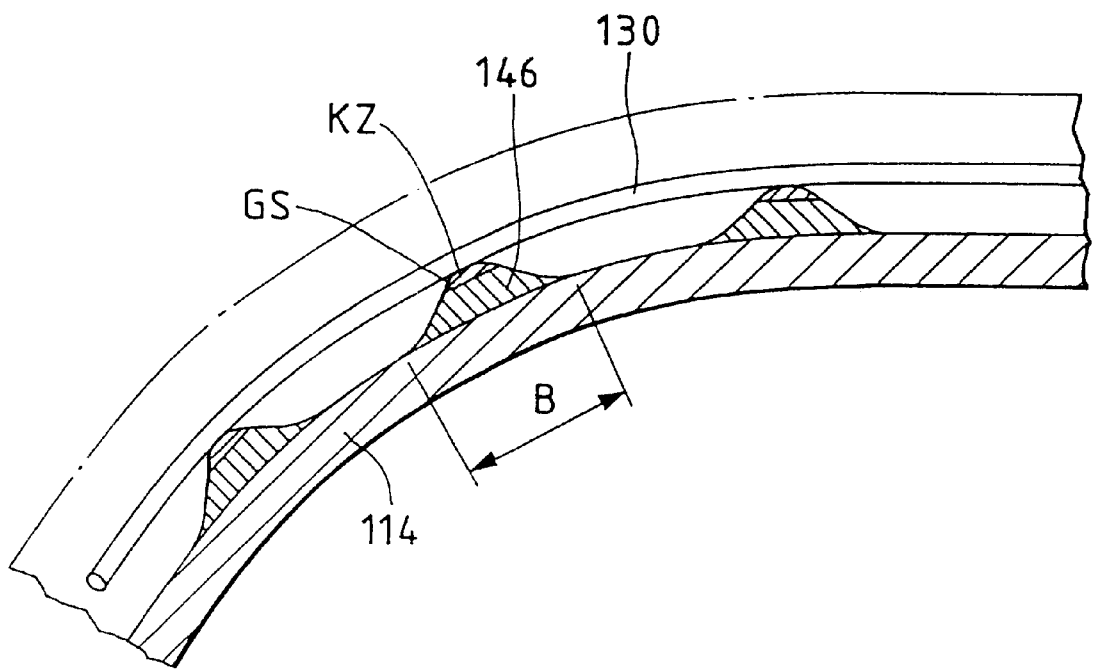
Figure 31:
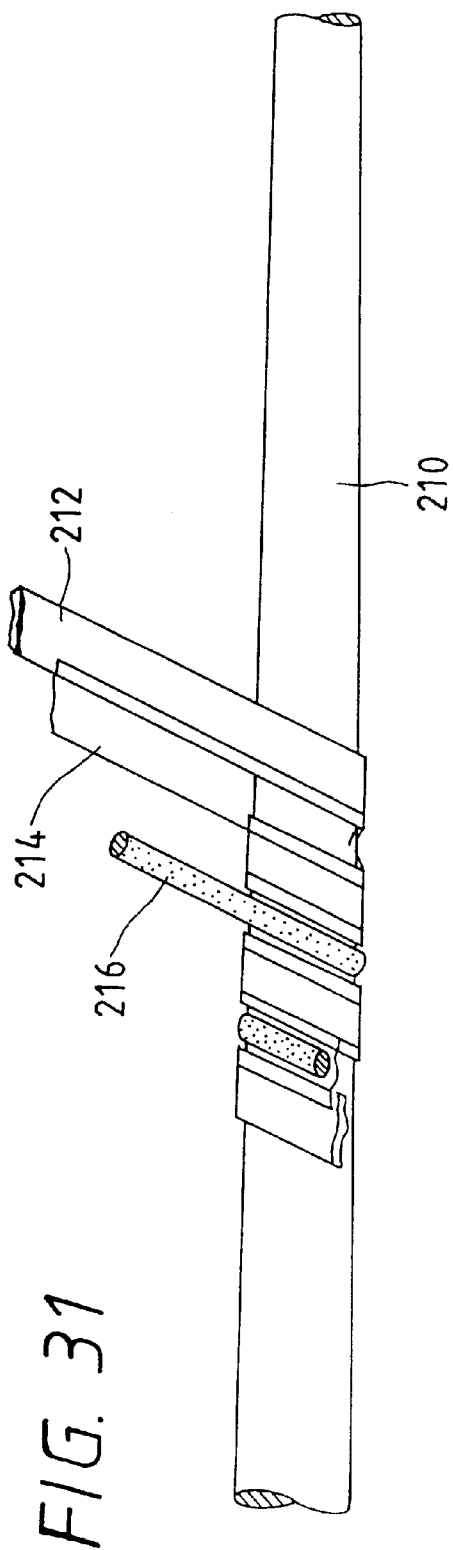
Figure 32:
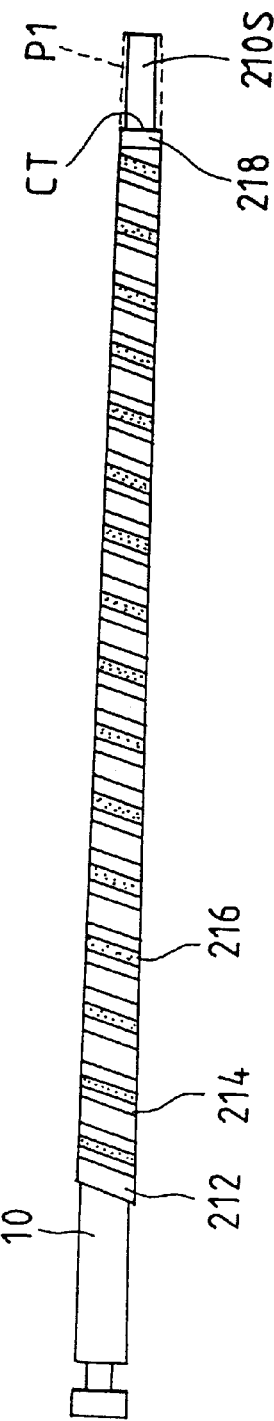
Figure 33:
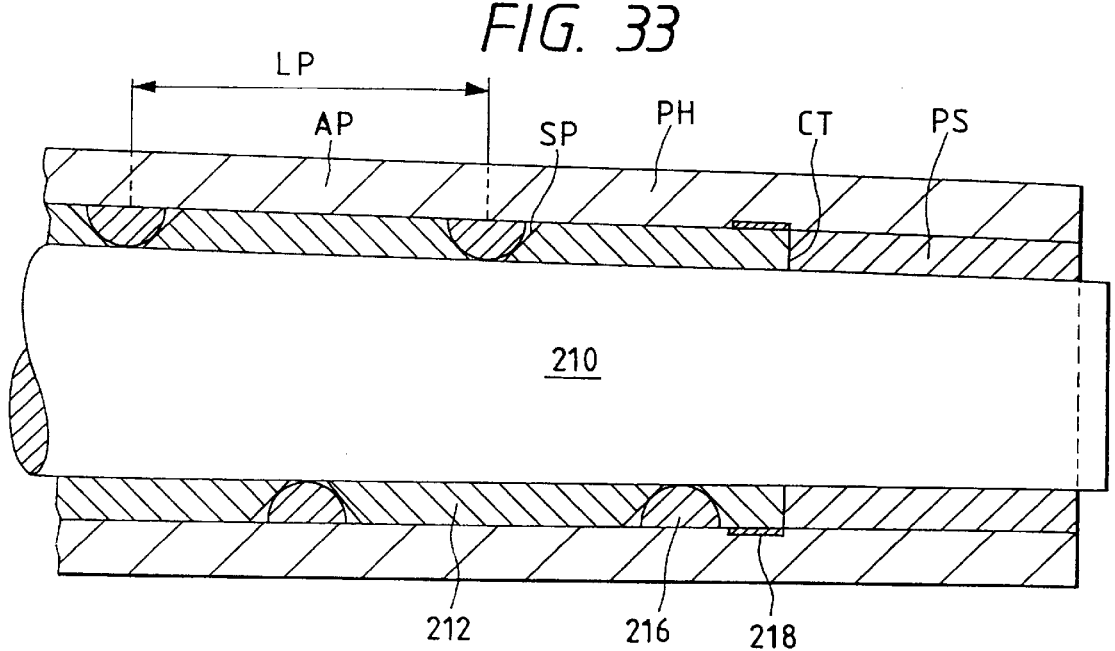
Figure 34:
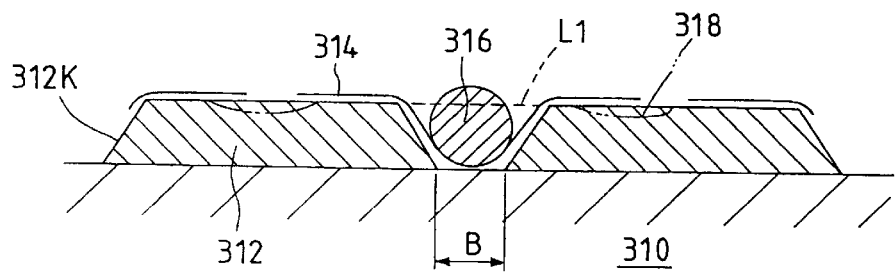
Figure 35:
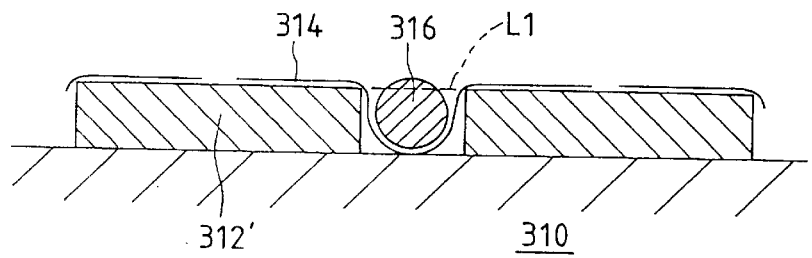
Figure 36:
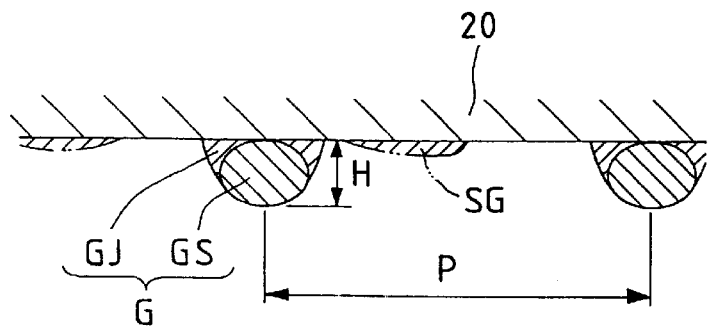
Figure 37:
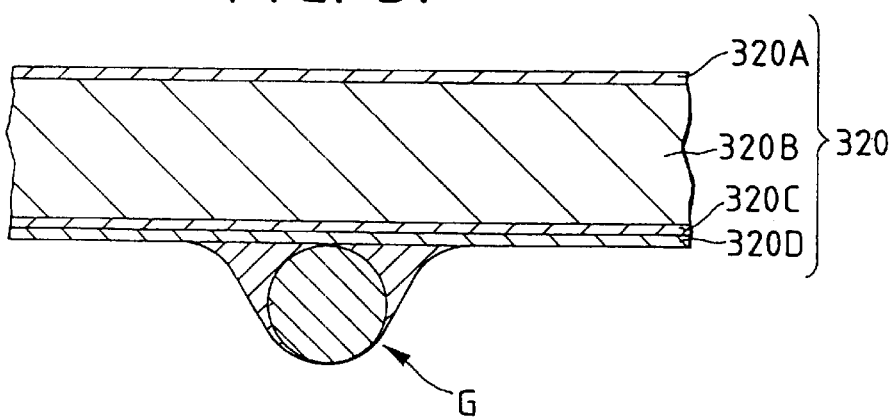
Figure 38:
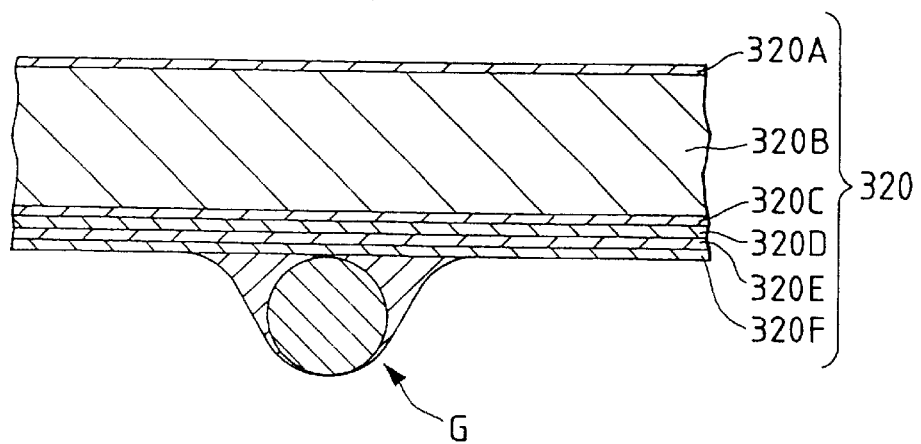
Figure 39:
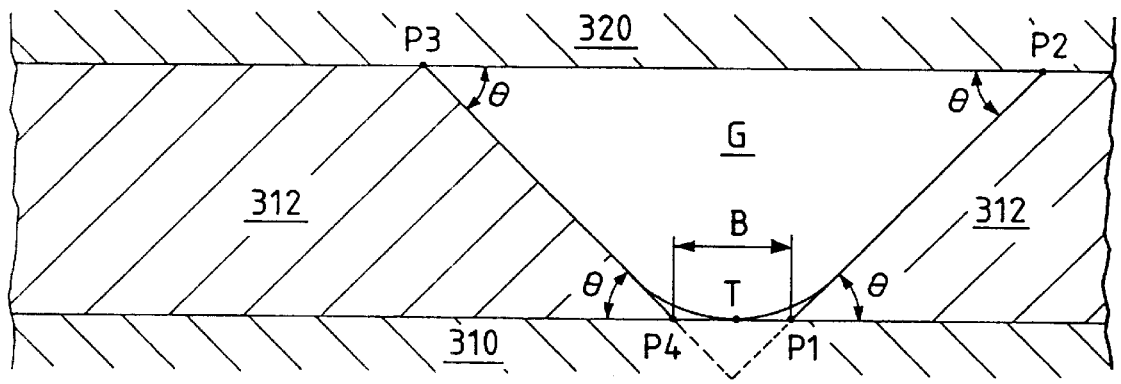
Figure 40:
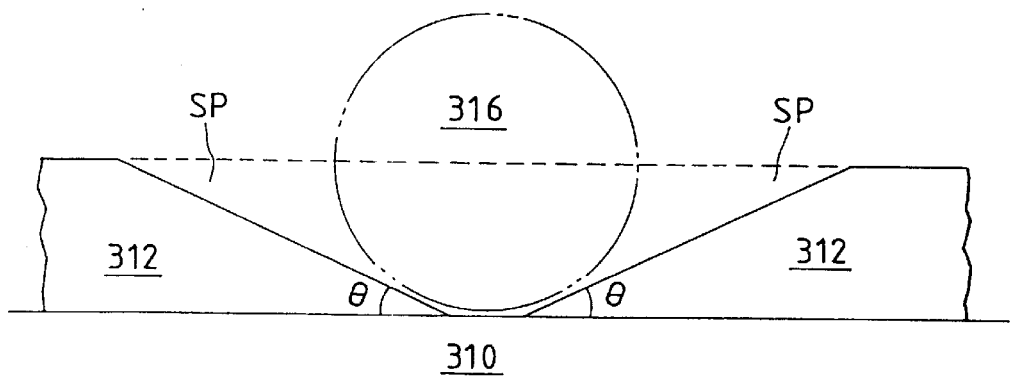
Figure 41:
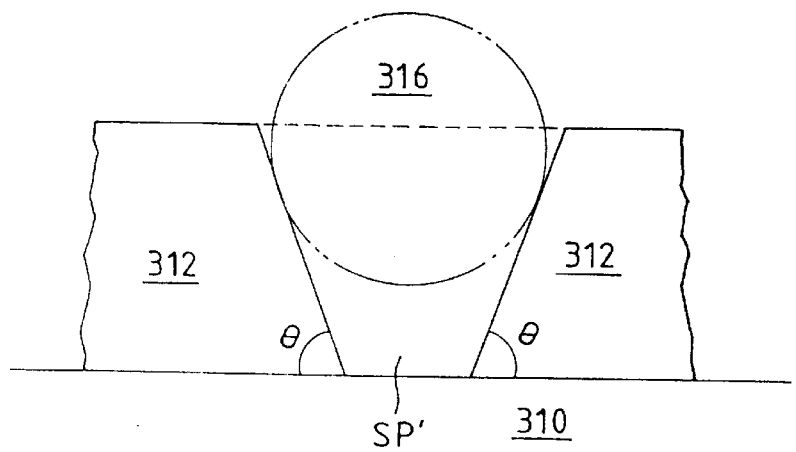
Figure 42A:
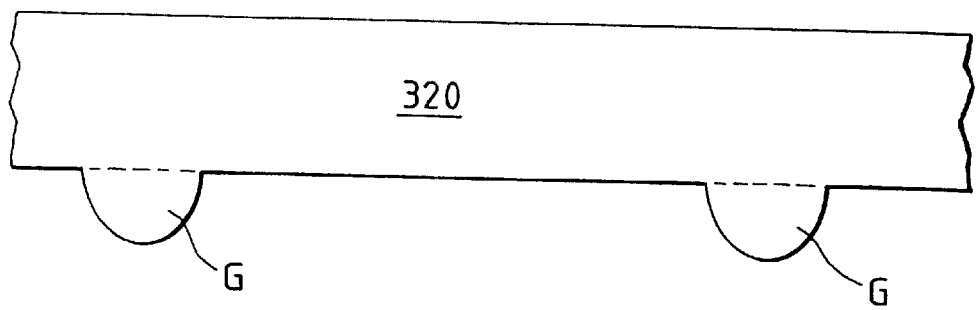
Figure 42B:
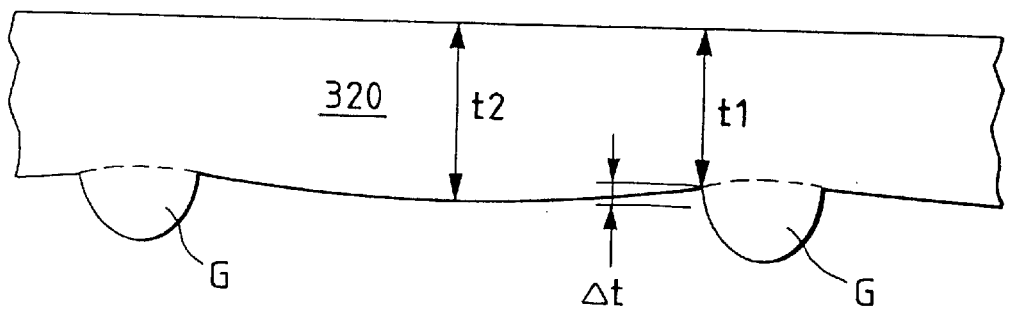
Figure 42C:
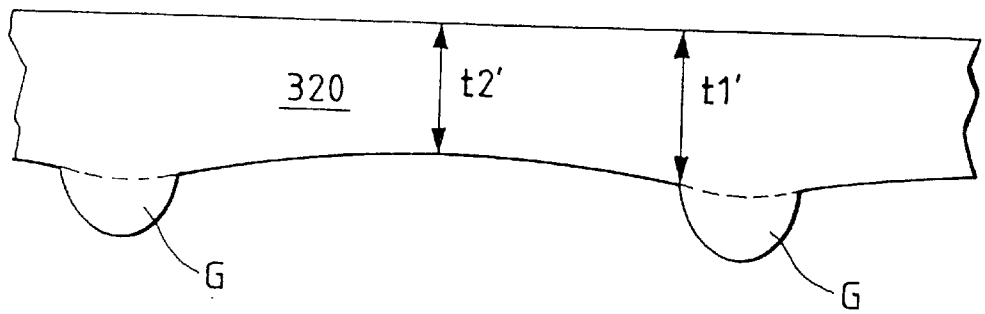
Figure 43:
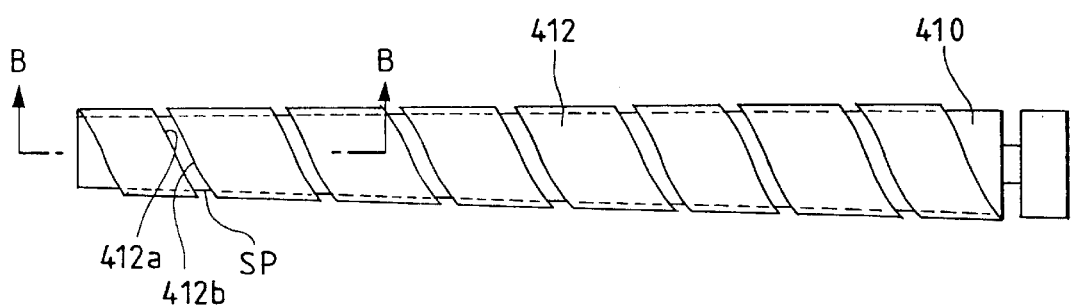
Figure 44:
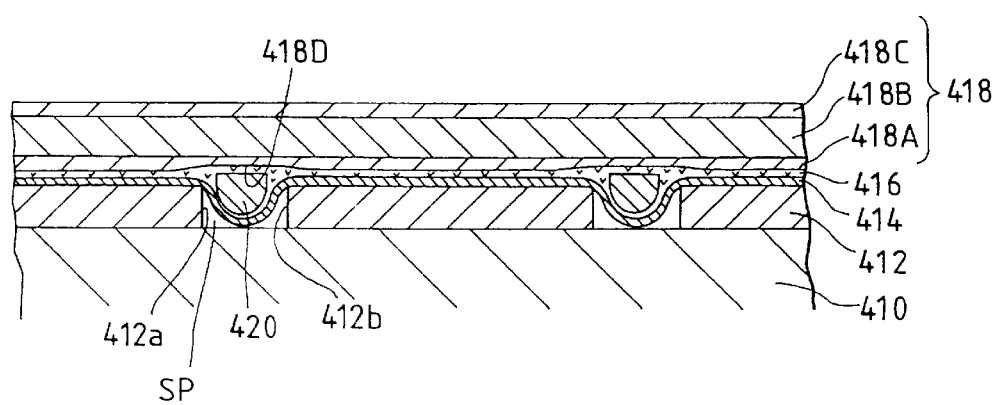
Figure 45:
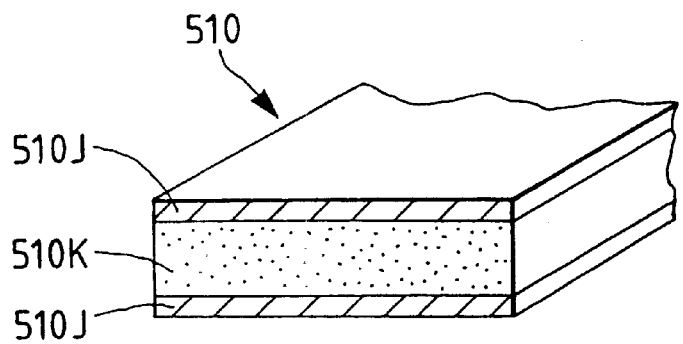
Figure 46:
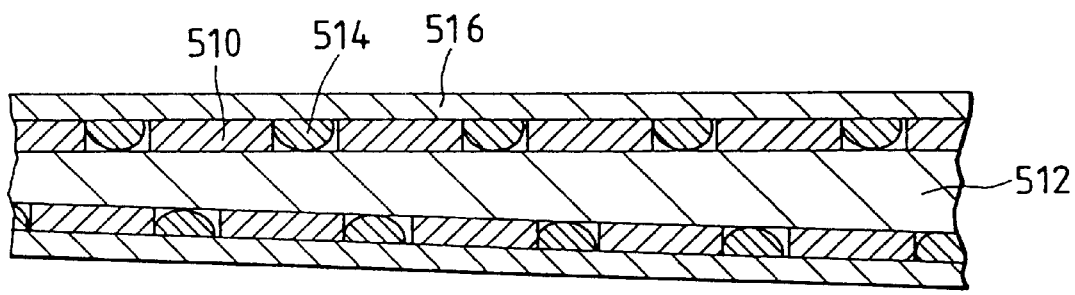
Figure 47:
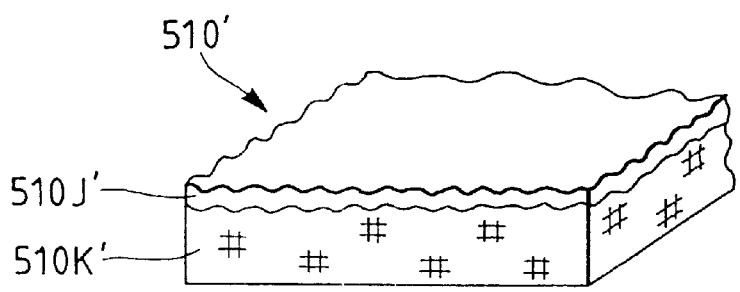
Figure 48:
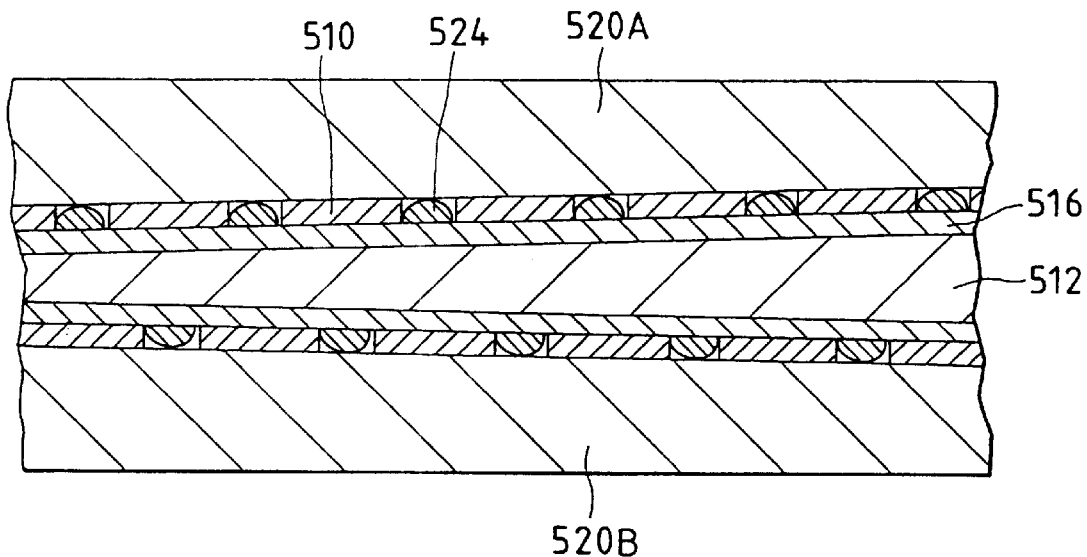
Figure 49:
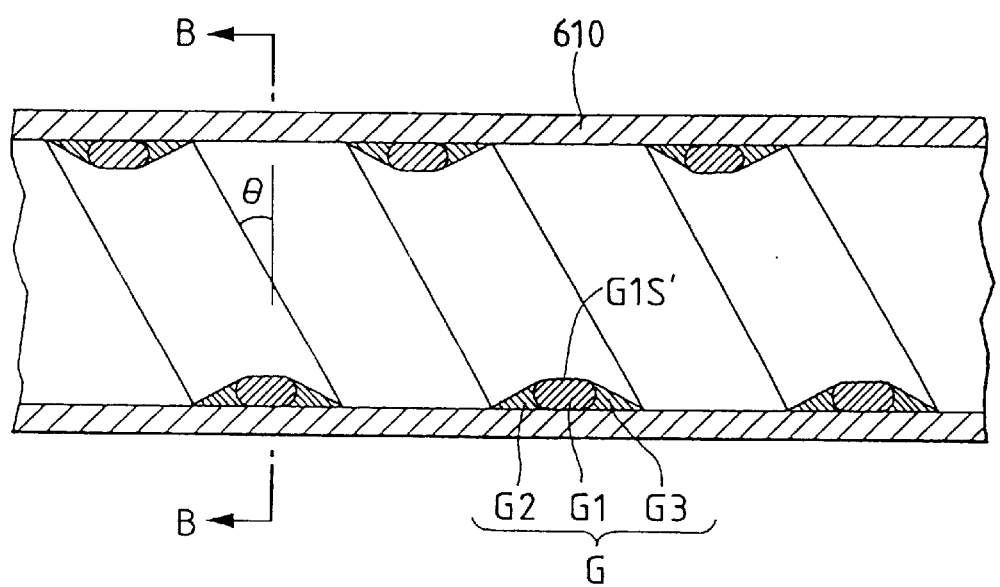
Figure 50:
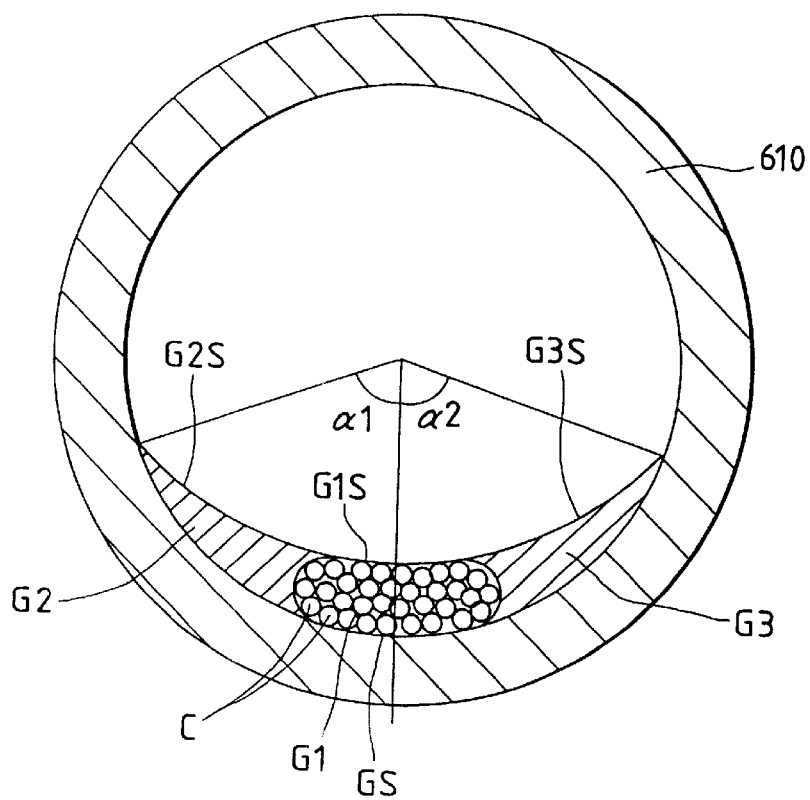
Figure 51:
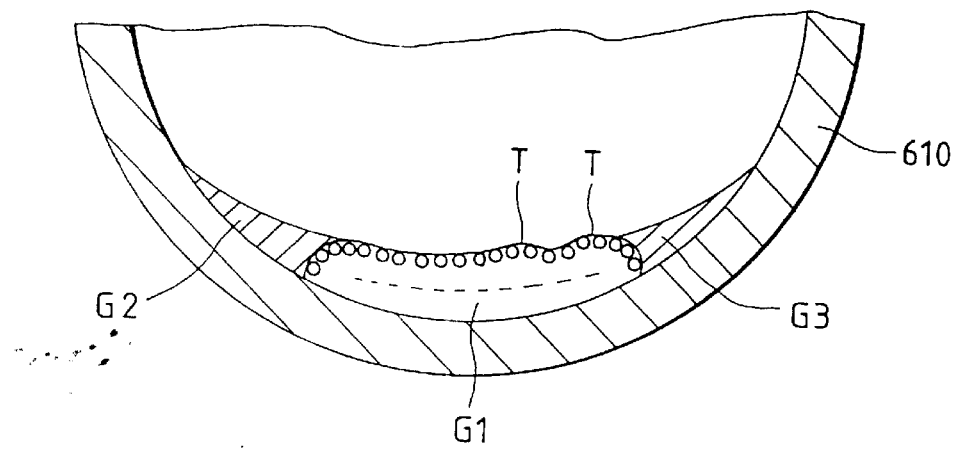

Each of FIGS. 21(a) to 21(c) is a transverse section view of a tape which is used to form a fishing line guide;

FIG. 22 is a side view of a fishing rod according to the invention;

FIG. 23 is a longitudinal section view of the fishing rod, showing a state in which the fishing rod is stored;

FIG. 24 is an enlarged section view of a fishing line guide used in the fishing rod shown in FIG. 22;

FIG. 25 is a section view of another embodiment of the fishing line guide;

FIG. 26 is a section view of still another embodiment of the fishing line guide;

FIG. 27. is a section view of yet another embodiment of the fishing line guide;

FIG. 28 is a longitudinal section view of the fishing rod, showing a state in which the fishing rod is in use;

Each of FIGS. 29(a) and 29(b) is a section view of material used to form a fishing line guide;

FIG. 30 is an explanatory view of a method for manufacturing a fishing rod according to the invention;

FIG. 31 is a partial view of a rod pipe, explaining a rod pipe manufacturing method according to the invention;

FIG. 32 is an explanatory view of steps contained in the rod pipe manufacturing method;

FIG. 33 is an enlarged explanatory view of the steps contained in the rod pipe manufacturing method;

FIG. 34 is a partial section view of a rod pipe, explaining another embodiment of a method for manufacturing a fishing rod according to the invention;

FIG. 35 is a partial section view of a rod pipe, explaining another embodiment of a method for manufacturing a fishing rod according to the invention;

FIG. 36 is a view of a fishing line guide formed according to the method shown in FIG. 34;

FIG. 37 is a section view of another embodiment of a rod pipe characterized by the boundary portion between a fishing line guide and a rod pipe main body layer;

FIG. 38 is a section view of another embodiment of a rod pipe characterized by the boundary portion between a fishing line guide and a rod pipe main body layer;

FIG. 39 is an explanatory view of a fishing rod and a method for manufacturing the same according to the invention;

FIG. 40 is an explanatory view of a modification of the fishing rod and the method for manufacturing the same shown in FIG. 39;

FIG. 41 is an explanatory view of a further modification of the fishing rod and the method for manufacturing the same shown in FIG. 39;

FIGS. 42(a) to 42(c) are longitudinal section views of embodiments of fishing rods formed according to the methods shown in FIGS. 34 and 39;

FIG. 43 is a side view of a rod pipe for an interline fishing rod according to the invention, showing a state in which the rod pipe is under formation;

FIG. 44 is an enlarged section view of the above rod pipe taken along the arrow line B—B shown in FIG. 43, showing a state after the rod pipe is formed by heating;

FIG. 45 is a partially perspective view of a tape used in a fishing rod manufacturing method according to the invention;

FIG. 46 is an explanatory view of a method for manufacturing an interline fishing rod according to the invention;

FIG. 47 is a partially perspective view of a tape used in a method for manufacturing an interline fishing rod according to the invention;

FIG. 48 is an explanatory view of a method for manufacturing a fishing rod with a fishing line guided outside the rod according to the invention;

FIG. 49 is a longitudinal section view of the main portions of an interline fishing rod according to the invention;

FIG. 50 is an enlarged transverse section view taken along the arrow line B—B shown in FIG. 49; and, FIG. 51 is a partial section view of a modified version of the embodiment shown in FIG. 50.

DETAILED DESCRIPTION OF THE PREFERRED EMBODIMENTS

Now, description will be given below in more detail of the embodiments of an interline fishing rod according to the invention with reference to the accompanying drawings.

Figure 1:
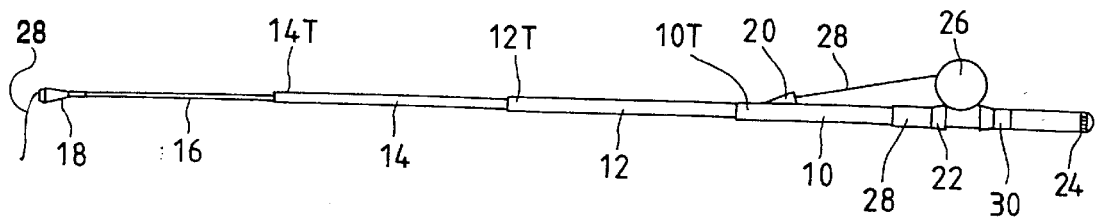
FIG. 1 is a side view of an embodiment of a fishing rod according to the invention.

FIG. 1 is a side view of an embodiment of an interline fishing rod according to the invention, in which a first middle rod 12 is joined to a joining portion 10T of a base rod 10, a second middle rod 14 is joined to a joining portion 12T of the first middle rod 12, and a top rod 16 is joined to a joining portion 14T of the second middle rod 14 in a swing-out manner respectively. A top guide 18 is threadedly mounted on the top rod 16 in such a manner that it can be removed therefrom. In the respective rod pipes, the matrices thereof are respectively formed of synthetic resin such as epoxy resin or the like, while the matrices are respectively reinforced by reinforcing fibers such as carbon fibers or the like. Also, on the base rod 10, there is mounted a reel fixing device 22 which is used to fix a reel 26 to the base rod 10, while the base rod 10 includes in the front portion thereof a fishing line introduction portion 20 which is used to introduce a fishing line 28 into the interior portion of the base rod 10. This fishing line introduction portion 20 may also be formed in the first middle rod 12. In front of and behind the reel fixing device 22, there are formed grips 28 and 30 respectively, while reference character 24 designates a bottom plug which is removably mounted on the bottom of the base rod 10.

Figure 2:
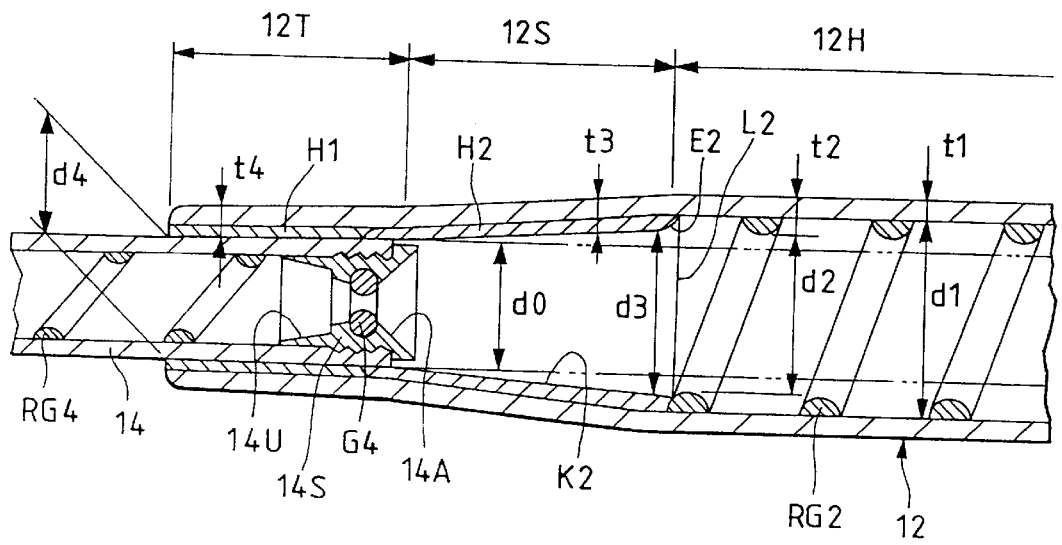
FIG. 2 is an enlarged longitudinal section view of the main portions of the fishing rod shown in FIG. 1.

Now, FIG. 2 is an enlarged longitudinal section view of the main portions of the fishing rod shown in FIG. 1, showing a state in which the second middle rod 14 used as a front side small diameter rod pipe is joined to the joining portion 12T of the first middle rod 12 used as a rear side large diameter rod pipe. The leading end portion of the first middle rod 12 consists of the joining portion 12T which is tapered forwardly or decreased in diameter forwardly, and the portion of the first middle rod 12 that is situated in the rear of the joining portion 12T is formed as a taper portion 12S which is decreased in diameter forwardly with a greater taper than the taper of the joining portion 12T. However, the taper portion 12S may also be formed with the same taper as the joining portion. Also, in the rear of the taper portion 12S, there is arranged a rod pipe main body portion 12H which is so formed as to have a slightly forwardly narrowed or tapered shape or have an almost straight shape, while a spirally shaped fishing line guide RG2 is formed at a suitable pitch integrally with the interior portion of the rod pipe main body portion 12H.

The length of the taper portion 12S may be set longer than the length of the joining portion 12T and also may be double or more, preferably, three or more times the pitch of the fishing line guide RG2. However, there may be formed a stepped portion instead of the taper portion, while the portion of the rod pipe situated in the rear of the joining portion may be formed as the main body portion of the rod pipe having a large inside diameter. In this case as well, as will be described later, a reinforcing layer is so formed as to extend up to the fishing line guide provision portion of the rod pipe main body portion.

A first reinforcing layer H1 is formed integrally with the interior portion of the joining portion 12T, while a second reinforcing layer H2 is formed integrally with the interior portion of the taper portion 12S. The taper ratio of the inner surface K2 of the second reinforcing layer H2 may be preferably set in the range of more than $2/1000$ to $100/1000$ or less. Also, the rear end edge L2 of the second reinforcing layer H2 is so formed as to continue with the front side terminated portion of the fishing line guide RG2, while the other portion E2 of the rear end edge L2 than the continuing portion thereof with the fishing line guide RG2 is curved or inclined to be thereby reduced in the thickness thereof and is so formed as to continue with the rod pipe main body portion 12H. This structure is preferable in that the rear end edge L2 can keep its continuity with the fishing line guide RG2, can prevent a sudden change in the thickness of the rod pipe to thereby relieve the stresses given thereto when the rod pipe is flexed, and can prevent the fishing line against damage. Further, the rear end edge L2 is formed almost at right angles to the longitudinal direction of the rod pipe. This is also preferable in that the reinforcing layer can be arranged uniformly with respect to the circumferential direction of the rod pipe and thus the reinforcing layer can reinforce the whole rod pipe uniformly.

Now, referring to the thicknesses of the respective portions of the first middle rod 12 having the above-mentioned structure, the thickness t4 of the joining portion is set larger than the thickness t1 of the rod pipe main body portion and smaller than the total thickness t2 of the fishing line guide provision portion, while the relationship of the thickness t4 with respect to the thicknesses of other portions is as follows:

$t2 > t3 > t4 > t1$

Therefore, since the thicknesses of the joining portion and taper portion of the first middle rod 12 are larger than the thickness t1 of the rod pipe main body portion 12H thereof, the joining portion and taper portion are increased in strength to thereby be able to compete with a joining force.

Also, the relationship between the inside diameters of the respective portions of the first middle rod 12 is as follows:

$d1 > d2 > d3 > d0 > d4$

Therefore, since the inside diameter d2 of the fishing line guide is larger than the maximum outside diameter d0 (which is equal to or larger than the maximum inside diameter of the joining portion 12T of the first middle rod) of the rear end joining portion of the second middle rod 14, the small diameter rod pipe 14 can be stored up into the rear portion of the rod pipe main body portion 12H of the large diameter rod pipe 12. In particular, if the difference between the diameters d2 and d0 is 1 mm or more, then it is easy to store the small diameter rod pipe 14. That is, even when the small diameter rod pipe 14 is stored with the fishing line inserted through the interior portions of the rod pipes, it is possible to prevent the fishing line from being caught and twined between the small diameter rod pipe 14 and fishing line guide RG2.

Referring to the thicknesses of the respective portions of the rod pipe, the thicknesses of the joining portion 12T and taper portion 12S are larger than the thickness t1 of the rod pipe main body portion 12H, so that the joining portion 12T and taper portion 12S are both enhanced in strength and flexure rigidity. However, the joining portion 12T and taper portion 12S, which form the front portion of the rod pipe, are forwardly narrowed or tapered and are thus greatly reduced in diameter than the rod pipe main body portion 12T, so that they are smaller in flexure rigidity by an amount equivalent to the reduced diameter. Also, on the rod pipe main body portion side, the fishing line guide has not only a guiding action but also a reinforcing action. As a result of this, the rigidity of the whole rod pipe is well balanced. Therefore, the flexure of the rod pipe can be made smooth easily. Also, because the front portion of the rod pipe, where the fishing line guide is not provided, is reduced in diameter, the height of the fishing line guide can be set large easily, which contributes toward reducing the resistance of the fishing line.

If the taper ratio of the rod pipe main body portion 12H is set $2/1000$ or less, preferably, $1/1000$ or less, then, when the fishing line guide RG2 is formed of resin or fiber reinforced resin mother material and is pressurized and heated to thereby be united integrally with the rod pipe main body portion formed of fiber reinforced resin, it is possible to control or reduce not only the degree of the positional displacement of the fishing line guide mother material due to the action of pressurization by a fastening tape or the like but also the flow of the resin and fibers, so that the rod pipe can be formed stably as well as the strength of the rod pipe can be improved.

On the rear end of the second middle rod 14 which is formed as a small diameter rod pip, there is threadedly and removably mounted a hold body 14S which is formed of synthetic resin or the like and holds an annular guide ring G4 formed of hard material such as ceramics or the like. A spirally shaped fishing line guide RG4 is formed at a suitable pitch integrally with the interior portion of the rod pipe main body portion. The rear side terminated end of the fishing line guide RG4 is situated adjacent to the hold body 14S. Also, in order to facilitate the reception of the fishing line or the like when the fishing line is inserted, the rear portion of the hold body 14S is formed as a conical-shaped receive surface 14A which spreads out backwardly. Further, in the front portion of the hold body 14S, there is formed a recessed portion which spreads out forwardly. When the top rod 16 is stored, such recessed portion is able to receive the rear end portion of the top rod 16 easily, or, hold the rear end portion according to the dimensions of the rear end portion of the top rod 16.

The reinforcing layer H1 is an inside layer which is used to reinforce the joining portion 12T, while the reinforcing layer H2 is an inside layer which is used to connect the reinforcing layer H1 with the fishing line guide RG2. In both of the reinforcing layers H1 and H2, the reinforcing fibers thereof are mainly composed of circumferentially directed fibers. Even with use of a prepreg which is mainly formed of circumferentially directed fibers, if the rod pipe is increased in thickness, then the strength thereof can be enhanced, the joining resisting strength thereof can also be enhanced, and it is possible to prevent stress centralization which otherwise could occur in the rear end portion of the fishing line guide. Also, since the quantity of longitudinally directed fibers is lowered and the rod pipe is narrowed forwardly due to use of a tapered shape, the flexure rigidity of the rod pipe is not enhanced so much for the high strength thereof, so that the flexure of the whole rod pipe can be made smooth. The reinforcing layer H1 means the whole of a reinforcing layer produced by winding a different prepreg from a main body prepreg which is used to form the main body layer of the rod pipe, that is, the reinforcing layer H1 may be formed as the inside layer of the main body prepreg, or the middle layer thereof, or the outside layer thereof, or a combination of these layers.

In the present embodiment, as described above, the reinforcing layer H1 of the joining portion and the reinforcing layer H2 for connecting the reinforcing layer H1 continuously with the fishing line guide are formed separately. However, they are not always be formed separately but, for example, the reinforcing layer H1 may be extended in such a manner that the reinforcing layer H2 can be formed together with the reinforcing layer H1. When the two reinforcing layers H1 and H2 are formed separately, in order to prevent any clearance from being produced between the two layers H1 and H2, preferably, the boundary portion between them may be overlapped slightly on each other as in the present embodiment and, in order that the outside diameter of the overlapped portion can be expanded outwardly, the overlapped boundary portion may be formed larger in thickness than the portions of the two layers that are respectively present in front of and behind the overlapped boundary portion. Especially, it is preferred that the thick portion may be formed in the neighborhood of the rear end of the small diameter rod pipe 14 joined. Also, the average thickness of the reinforcing layer H2 is set larger than that of the reinforcing layer H1 and, at the same time, the fiber ratio per the unit volume of the circumferentially directed fibers of the reinforcing layer H2 is set relatively small. The reason for this is as follows: That is, when it comes to tear or breakage which could occur from the leading end of the rod pipe, the reinforcing layer H1 can prevent it effectively because the ratio of the circumferentially directed fibers thereof is large, whereas the reinforcing layer H2 does not need to take precautions against such tear or breakage.

In the foregoing description, the first middle rod is used as a large diameter rod pipe and the second middle rod is used as a small diameter rod pipe. However, this is just an example and, of course, the invention is not limited to this.

Figure 3:
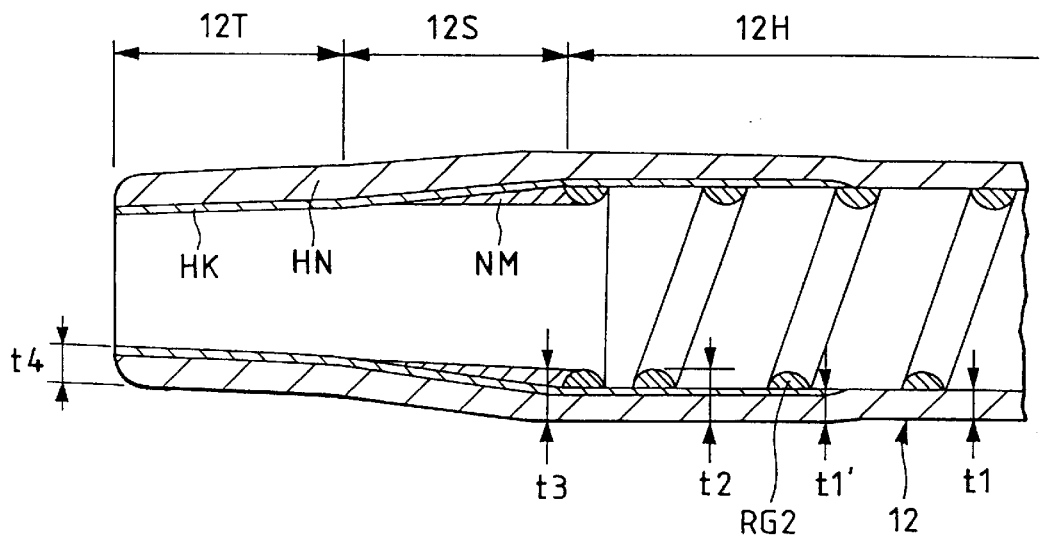
FIG. 3 is an enlarged longitudinal section view of another embodiment of the main portions corresponding to those shown in FIG. 2.

Now, FIG. 3 shows another embodiment of the main portions of the interline fishing rod according to the invention, which is substituted for the embodiment shown in FIG. 2. The present embodiment is different from the embodiment shown in FIG. 2 in that a layer for reinforcing the joining portion 12T is composed of a reinforcing layer HK which is so formed as to extend from the end of the spirally-shaped fishing line guide RG2 up to a position existing about two pitches backwardly thereof. Also, the final end portion of the fishing line guide is wound in a direction substantially at right angles to the longitudinal direction of the rod pipe 12. Further, continuously with the fishing line guide, there is formed a raised portion NM which is gradually decreased in thickness forwardly from such final end portion of the fishing line guide and is terminated within the taper portion 12S.

The above-mentioned reinforcing layer HK performs a general reinforcing action on the joining portion of the rod pipe, prevents a decrease or variations in the strength of the taper portion 12S located near such joining portion, and further prevents stress centralization which is caused by a difference in rigidity and the like between the end portion of the fishing line guide and the portion of the rod pipe main body that is present adjacent to the fishing line guide end portion. Further, the raised portion NM fills up a difference in height between the top portion of the fishing line guide and the inner surface of the rod pipe, whereby the raised portion NM not only performs an action to prevent the stress centralization in the end portion of the fishing line guide but also, when storing a small diameter rod pipe which is joined to the joining portion 12T in a swing-out manner, performs an action to be able to store the small diameter rod pipe smoothly without the rear end of the small diameter rod pipe being caught on the end portion of the fishing line guide. Especially, when storing the small diameter rod pipe with a fishing line inserted therethrough, the raised portion NM makes it difficult for the fishing line to be twined.

The reinforcing layer HK may be formed in one or more layers by using a longitudinally continuous prepreg, or it is also possible to form the same by winding a prepreg which is longitudinally divided into a plurality of sections. The number of layers is arbitrary but, preferably, as a result of the reinforcement, the thickness t4 of the joining portion may be 1.2 or more times and 2 or less times the thickness t1 of the rod pipe main body portion. The reinforcing layer HK is formed of a properly arranged prepreg consisting mainly of circumferentially directed fibers, or woven cloth, or a combination of them. Use of a prepreg higher in elasticity and strength than the material of the fishing line guide can further enhance the reinforcing effect of the reinforcing layer HK. Also, if the quantity of axially directed fibers of the main body layer is decreased toward the leading end side thereof within the range thereof in which the reinforcing layer is provided, then there can be obtained such a rod pipe that is highly strong against tear or breakage in the leading end portion thereof and at the same time can be flexed easily. The description of this paragraph can also apply similarly to the embodiment shown in FIG. 2.

In the present embodiment, if the thickness of the rod pipe main body portion with the reinforcing layer added thereto is expressed as $t1'$, the total thickness of the fishing line guide portion is expressed as $t2$, and the thickness of the neighborhood of the fishing line guide end portion with the raised portion MN added thereto is expressed as $t3$, then there can be obtained the following relationship between them:

That is, $t2=t3>t4>t1'>t1$ where $t2=t3$ means that they are substantially equal to each other. This makes it possible to enhance the reinforcing efficiency, to secure the sufficient height of the fishing line guide to thereby reduce the resistance of the fishing line, and to improve the balance of the flexure rigidity of the rod pipe. However, depending on the manner of formation of the reinforcing layer, the thickness t4 of the joining portion may be larger than the thickness t2.

The taper ratio of the taper portion 12S, preferably, may be more than $2/1000$ and less than or equal to $100/1000$ and, more preferably, it may be more than $2/1000$ and less than or equal to $20/1000$. Also, a point of change in the taper ratio between the rod pipe main body portion 12H and taper portion exists in the portion where the reinforcing layer HK is formed or in the portion where the raised portion NM is formed. Therefore, even if the reinforcing fibers are caused to meander or fall into disorder due to the change in the taper, a sufficient strength can be secured, that is, there can be provided a rod pipe which is high in strength.

The remaining portions of the structure of the present embodiment are similar to the embodiment shown in FIG. 2.

Figure 4:
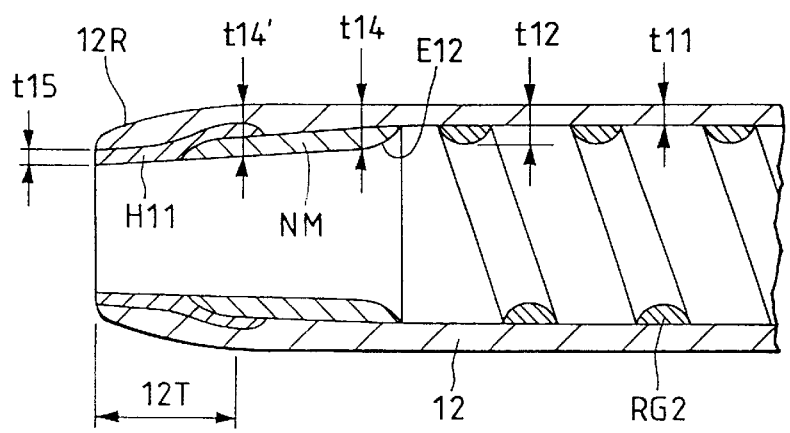
FIG. 4 is a longitudinal section view of an embodiment of a joining portion provided in the present fishing rod.

Now, FIG. 4 shows an embodiment of the front portion of the rod pipe 12. In this embodiment, a reinforcing layer H11 for the main body layer is provided in the interior portion of the joining portion 12T and the fishing line guide RG 2 is structured in such a manner that the projecting side of the cross section thereof is enclosed by a curved line and is thereby formed smooth. After the fishing line guide RG 2 is terminated, the mother material of the fishing line guide RG 2 is used as it is or is crushed to form a wider shape to thereby provide a raised portion NM which can reduce a difference in level between the area of the rod pipe front portion, where the raised portion NM is provided, and the above-mentioned reinforcing layer H11 and fishing line guide terminated end portion. The thickness t15 of the joining portion front end may be set smaller than the thickness t12 of the fishing line guide portion and larger than the thickness t11 of the rod pipe main body portion, that is, preferably, the thickness t15 may be 1.2 or more times and less than or equal to 1.6 times the thickness t11. The thickness t14 of the raised portion NM is substantially equal to or larger than the thickness t12 of the fishing line guide portion, while the thickness $t14'$ of the overlapped portion of the raised portion with the reinforcing layer H11 is the greatest thickness.

The rear end edge portion E12 of the raised portion NM is formed in a curved surface or in an inclined surface in order to relieve the stress centralization as well as prevent the fishing line against damage. The outer shape of the joining portion is tapered or narrowed forwardly in such a manner that the front portion outer periphery 12R is formed in a curved surface or in an inclined surface. Further, a point of change in the taper of the rod pipe 12 is set in the portion of the above-mentioned greatest thickness $t14'$, thereby being able to prevent the lowered strength of the rod pipe.

Figure 5:
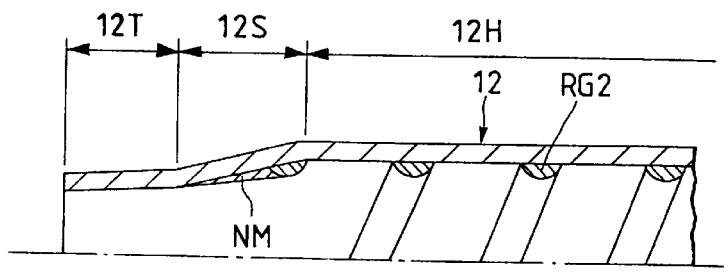
FIG. 5 is a longitudinal section view of a further embodiment of a joining portion provided in the present fishing rod.

Now, referring to FIG. 5, a raised portion NM is formed in the taper portion 12S which is located just after the joining portion 12T of the rod pipe 12, while a spirally-shaped fishing line guide RG2 is provided in the rod pipe main body portion 12H which continues with the taper portion 12S. The raised portion NM continues with the terminated end portion of the fishing line guide RG2 while the raised portion NM is set substantially equal in height to the fishing line guide terminated end portion, and it gradually decreases in thickness toward the front end thereof. This makes it possible to store a small diameter rod pipe into the present rod pipe smoothly.

Figure 6:
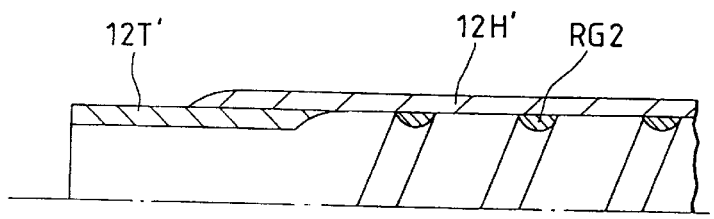
FIG. 6 is a longitudinal section view of a still further embodiment of a joining portion provided in the present fishing rod.

Now, FIG. 6 shows another embodiment of the joining portion of a rod pipe. In particular, in this embodiment, a joining portion 12T' is formed of a separate prepreg which is separated from a prepreg used to form a rod pipe main body portion 12H' with a fishing line guide RG2 included therein, whereas these prepregs are heated together to be thereby united into an integral body. This prevents axially directed reinforcing fibers used in the prepregs from meandering due to the taper portion or stepped portion, which in turn facilitates the formation of the rod pipe main body portion 12H' as well as the integral formation of the fishing line guide.

Figure 7:
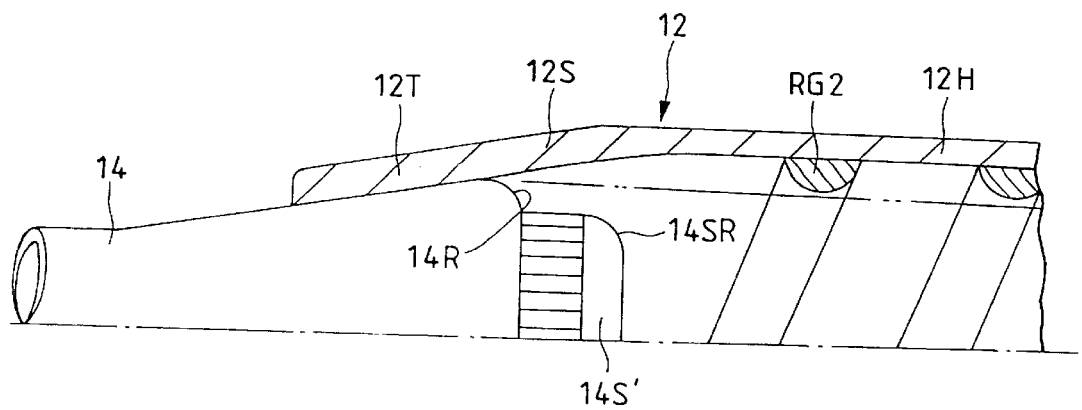
FIG. 7 is a longitudinal section view of a joining portion of a swing-out (telescopic) type;.

Now, with reference to FIG. 7, description will be given below of a device or technique to store a small diameter rod pipe 14 into a large diameter rod pipe 12 smoothly. In particular, the taper portion 12S of the rod pipe 12 is situated just in the rear of the joining portion 12T of the rod pipe 12 and, just in the rear of the taper portion 12S, there is formed a rod pipe main body portion 12H with a spiral-shaped fishing line guide RG2 arranged on the inside wall thereof. The cross section of the present fishing line guide RG2, as shown in FIG. 7, does not include a surface intersecting at right angles to the axial direction of the rod pipe 12 but is enclosed by a curved line with no corners (that is, a semi-circular curved line). On the other hand, the rear end edge portion 14R of the small diameter rod pipe 14 joined to the joining portion of the rod pipe in a swing-out manner and the rear end edge portion 14RS of a hold body 14S' for holding an annular guide ring equivalent to the fishing line guide G4 shown in FIG. 2 are both rounded at their corners. This prevents these rear end edge portions from touching or being caught by the fishing line guide RG2 when the small diameter rod pipe 14 is stored into the large diameter rod pipe 12. That is, they are prevented against breakage or damage.

The rounded radiuses of the respective corners, including the fishing line guide, may be set 1.5 mm or more, preferably, 5 mm or more (other shapes than a circle may also be used). The rear end edge portions 14R and 14RS may also be formed in an inclined surface. The length of the inclined surface appearing on FIG. 7, preferably, may be 2 mm or more. However, it may be set smaller than this, provided that the smaller diameter rod pipe can be stored smoothly.

Also, the rear portion of the hold body 14S' may be formed softer than the surface hardness of the fishing line guide RG2. For example, if the hold body 14' is formed of flexible material such as rubber, synthetic resin or the like, the fishing line and the fishing line guide can be protected. Further, the rear end edge portion 14R of the small diameter rod pipe 14 may be formed of or coated with such flexible material and, more preferably, use of such flexible material may be combined together with the above-mentioned rounding of the corners or inclined surfaces.

Now, in FIG. 8, description will be given below of a relationship between the main body layer HS of the rod pipe and fishing line guide RG. The main body layer HS typically includes an outside layer SS, a middle layer TS and an inside layer US. In particular, the outside layer SS is formed of a fiber reinforced resin prepreg which mainly consists of circumferentially directed reinforcing fibers, the middle layer TS is formed of a fiber reinforced resin prepreg which mainly consists of axially directed reinforcing fibers, and the inside layer US is formed of a fiber reinforced resin prepreg which mainly consists of circumferentially directed reinforcing fibers. Also, further inside the inside layer US, as the inside-most layer; there may be provided axially directed reinforcing fibers, a woven cloth, or a resin layer. In this case, the fishing line guide RG is provided on and projected from the inside wall of the inside-most layer.

It is desirable that the quantity of the circumferentially directed fibers of the inside layer or the sum of the circumferentially directed fibers of the inside layer and fishing line guide is set larger than the quantity of the circumferentially directed fibers of the outside layer, because such quantity distribution can prevent the lowered strength of the rod pipe due to the uneven surface condition of the interior portion of the rod pipe caused by the presence of the fishing line guide. The fishing line guide may be formed larger in thickness than the inside layer. Also, if fibers lower in elasticity than the circumferentially directed fibers of the inside layer are used as the fibers of the fishing line guide, then the fishing line guide can be easily formed in a spiral or annular shape and is difficult to break. Further, if the resin ratio of the fishing line guide is set higher than that of the inside layer to thereby reduce the fiber density of the fishing line guide, then the fishing line guide can be easily formed in a spiral or annular shape and is difficult to break.

And, preferably, the fishing line guide RG may be formed such that it includes fibers directed in a direction substantially at right angles to the axial direction of the rod pipe, because the fishing line guide RG is allowed to receive the fishing line easily to thereby enhance the wear resistance thereof and the resistance of the fishing line. Also, from the viewpoint of reduction of the fishing line resistance, it is preferred that such fibers consist of fibers which are highly wear resisting and are easy to slide. Similarly, from the viewpoint of reduction of the fishing line resistance, it is also preferred that such fibers have a large diameter, because the exposed large-diameter fibers are able to receive the fishing line in a stable manner.

When the reinforcing fibers of a prepreg used to form a rod pipe and the fibers of a fishing line guide to be united integrally with the rod pipe are the same kind of fibers, in order to enhance the wear resistance and reduce the fishing line resistance, it is preferred that the fishing line guide may be formed of fibers which are larger in diameter. When the reinforcing fibers of the inside layer of the rod pipe main body layer are inclined, preferably, the direction of inclination of the fibers may be near to the inclined direction (directed direction) of the fishing line guide. For example, there are available two directions when the direction of the reinforcing fibers of the inside layer is set at an angle of 45 degrees with respect to the axial direction of the rod pipe and, in this case, the angle of 45 degrees on the inclined side of the spiral-shaped fishing line guide is selected.

More preferably, the above-mentioned respective requirements may be combined together.

However, the above-mentioned respective requirements are not limitative but, for example, if the thickness of the fishing line guide is set smaller than the thickness of the inside layer, then there can be obtained a structure suitable for a case in which the fishing line is received more by the inner surface of the main body layer.

Figure 9:
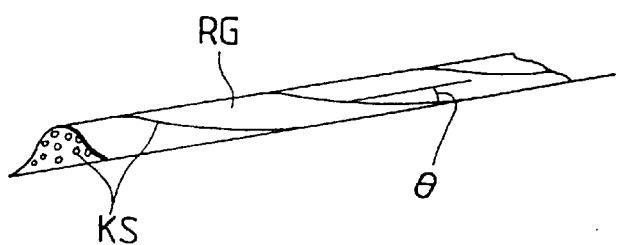
FIG. 9 is a perspective view of a fishing line guide.

When the fishing line guide RG is formed in a spiral shape, as schematically shown in FIG. 9, preferably, synthetic resin may be used as the matrix of the fishing line guide RG and the synthetic resin may be reinforced by fibers KS. Especially, it is preferred that the synthetic resin of the fishing line guide RG is of the same quality as the rod pipe from the viewpoint of the integral formation thereof. As the reinforcing fibers of the fishing line guide RG, preferably, there are available not only reinforcing fibers such as carbon fibers, ceramics fibers, glass fibers, metal fibers, composite material fibers and the like, but also wear resisting fibers and highly slidable fibers. These fibers are tied up in a bundle and are then united with the synthetic resin to thereby provide a fishing line guide mother element. After then, if the fishing line guide mother element is twisted and wound around a core metal, then a high (thick) fishing line guide can be formed easily. However, preferably, the inclination angle θ of the fibers KS with respect to the longitudinal direction of the fishing line guide itself is set at an angle of 45° C. or lower, preferably, 30° C. or lower so that the fishing line passing through the interior portion of the rod pipe can pass at right angles to the fibers KS.

Further, in order to form the fishing line guide in such a manner that it is sufficiently large in height and stable in shape, the fishing line guide mother element, which is produced in a strip body formed of thermoplastic resin or the like that is difficult to melt completely even at temperatures when the rod pipe is formed, is treated previously at normal temperature and is thereby made to approximate to the final shape of the fishing line guide, that is, the fishing line guide mother element is formed into a given shape; and, after then, the thus shaped fishing line guide mother element is wound around the core metal and is finally formed together with the rod pipe main body layer.

In addition, thermosetting resin or natural material, which is formed in a thread strip, can also be used to form a fishing line guide mother element.

Figure 10:
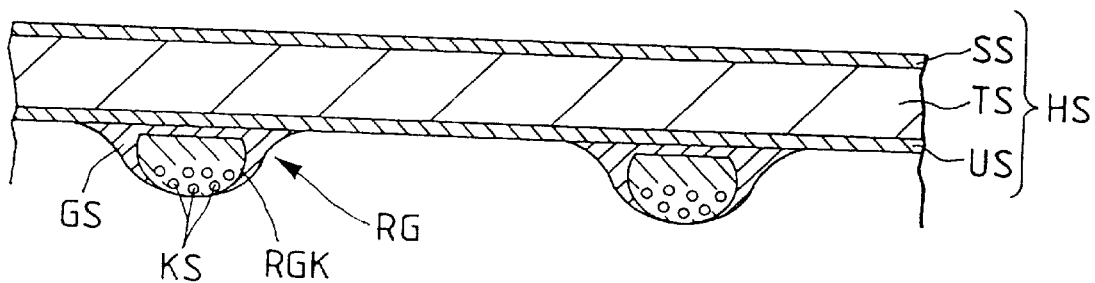
FIG. 10 is an explanatory view of a relationship between a fishing line guide and a main body layer.

Now, with reference to FIG. 10, description will be given below of the structure of a fishing line guide RG which can be connected integrally with a rod pipe main body layer HS. A fishing line guide mother element RGK is previously formed according to such a method as described in connection with FIG. 9. The fishing line guide mother element RGK is formed in such a manner that the matrix resin thereof is reinforced by reinforcing fibers KS, while the reinforcing fibers are gathered in the neighborhood of the projecting side surface of the fishing line guide mother element RGK. The reinforcing fibers preferably may consist of fibers which are formed of wear resisting material such as ceramics, metal or the like, but this is not limitative. As the matrix resin of the fishing line guide mother element RGK, there is used synthetic resin which is harder than the matrix resin of the rod pipe main body layer. For example, ethylene tetrafluoride resin of fluororesin can be used. This resin is high in both hardness and heat resistance.

Then, the thus formed fishing line guide mother element RGK is integrally connected with the inside layer US of the main body layer HS through a connecting layer GS formed of synthetic resin which is softer than the matrix resin of the rod pipe main body layer and fishing line guide mother element (the portion of the rod pipe existing between the main body layer and fishing line guide mother element also corresponds to a boundary layer which will be described later). As a result of this, there is provided a structure in which the hardness thereof becomes softer step by step from a fishing line contact portion, which is the rod pipe central side with the fishing line guide projecting therefrom, toward the rod pipe main body layer side; the fishing line contact portion is difficult to wear because the wear resisting reinforcing fibers KS is arranged here; and, stresses are difficult to center on the rod pipe main body.

As the heat resisting resin material that is prevented against damage even if heat is generated due to friction, there are available polypropylene, polyethylene, polytetrafluoroethylene, poly-P-xylene, polystyrene, polyacrylonitrile, and the like. These material can also be used in the present embodiment.

Also, a transparent fishing line guide may be formed, that is, by recognizing and judging visually and simply the dirty fishing line guide RG existing in the interior portion of the rod pipe from one end of the rod pipe, a timing for cleaning the same can be decided.

Figure 11:
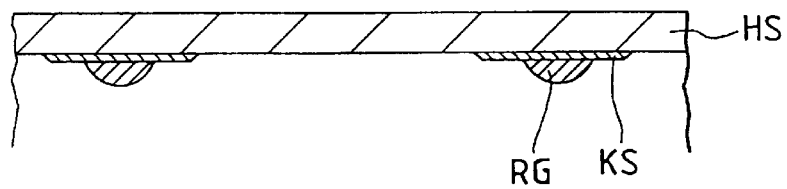
FIG. 11 is an explanatory view of a relationship between a fishing line guide and a main body layer.

Now, with reference to FIG. 11, description will be given below of a boundary layer KS interposed between the main body layer HS of a rod pipe and a fishing line guide RG formed integrally with the main body layer HS. This boundary layer KS is wider than the width of the fishing line guide RG and extends forwardly and backwardly of the fishing line guide RG. Also, the boundary layer KS is formed of synthetic resin such as epoxy resin or the like which can be highly closely contacted with the rod pipe main body layer, or a fiber reinforced prepreg such as a scrim cross sheet of glass fibers with such synthetic resin contained therein. Further, there are also used a carbon tape, a synthetic resin film, paper and the like. However, the above-mentioned sheet-shaped member is not limitative but, for example, thread-shaped synthetic resin, cotton thread and the like can also be used. It is also possible to use a thermoplastic resin film or a thread strip which does not melt completely when the rod pipe is formed by heating.

Figure 8:
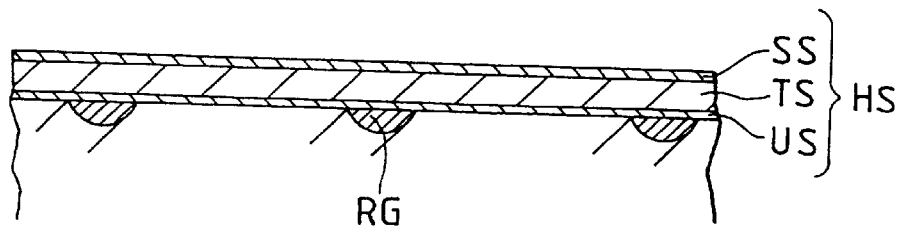
FIG. 8 is an explanatory view of a relationship between a fishing line guide and a main body layer.

The main body layer HS may be formed in such a three-layer structure as shown in FIG. 8 or may be formed in a single layer. Further, the boundary layer KS may be formed in such a manner that, as shown in FIG. 11, it is not buried under the main body layer HS but is adhered to the inner surface of the main body layer HS, or may be formed in such a manner that the thickness direction portion of the boundary layer is in part or wholly buried under the main body layer. When the boundary layer is buried in part or wholly, it is easy to bury it under the inside layer of the main body layer consisting of three layers.

In this manner, the main body layer is reinforced against the stress centralization which is caused to occur on the peripheral portion of the rod pipe main body layer existing near the fishing line guide when the fishing line guide is formed integrally with the rod pipe main body layer, thereby being able to enhance the strength of the main body layer.

When the boundary layer is formed of material softer than the matrix material of the main body layer or fishing line guide, or rubber material or soft synthetic resin which has large elasticity, then the influences of the stresses between the main body layer and fishing line guide can be relieved further, thereby being able to stabilize and enhance the strength of the rod pipe.

In this embodiment, reinforcing fibers are arranged in the fishing line guide RG to thereby form the fishing line guide RG in a spiral shape, and the boundary layer KS is formed of material which can be separated from the fishing line guide, or the boundary surface of the boundary layer KS to the fishing line guide is treated so that it can be separated from the fishing line guide. With use of this arrangement, even when the rod pipe main body layer HS is broken while the fishing rod is in use, the fishing line guide is easy to peel off from the main body layer, which, in combination with the reinforcing action of the reinforcing fibers, prevents the fishing line guide from being torn to pieces due to the breakage of the main body layer HS. Thanks to this, the fishing line, which is inserted through the interior portion of the rod pipe, is difficult to be cut off and thus terminal tackles mounted on the tip end portion of the fishing line can be collected.

If the boundary layer KS is formed of hard material, high-strength material, highly lubricating material, highly wear resisting material, highly water repellent or oil repellent material, and highly expandable material when compared with the inside layer of the main body layer and fishing line guide, and in a forwardly and backwardly wider range than the width of the fishing line guide (this range may also cover the whole of the inner surface of the main body layer), then not only the boundary layer KS can perform the function of the reinforcing and relieving layer, which is originally expected of the boundary layer, but also the surface having such characteristics can be exposed on the rod pipe inner side, that is, there can be obtained a rod pipe which can make use of the characteristics of the above-mentioned material.

Figure 12:
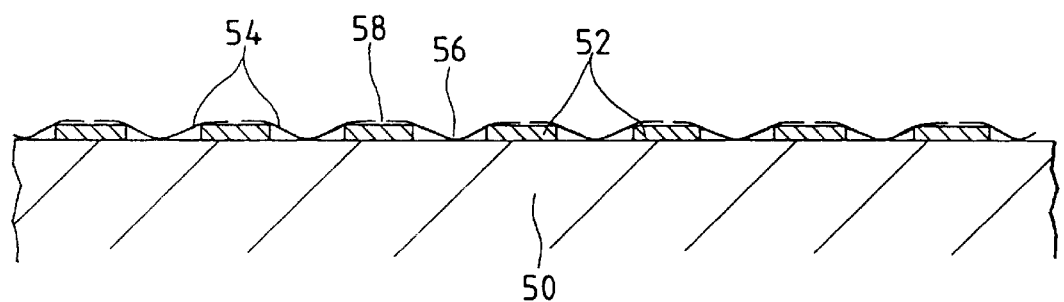
FIG. 12 is an explanatory view of a method for forming a fishing line guide and a main body layer integrally with each other.
Figure 13:
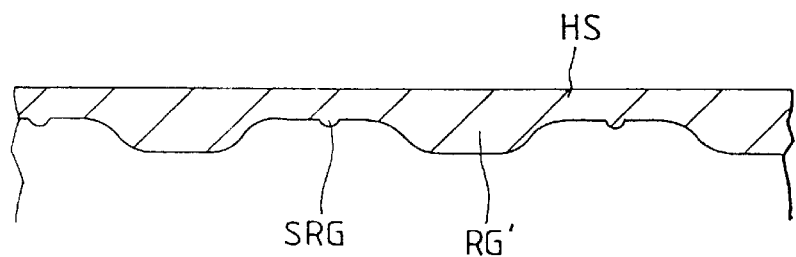
FIG. 13 is a section view of a rod pipe which is formed according to the method shown in FIG. 12.
Figure 14:
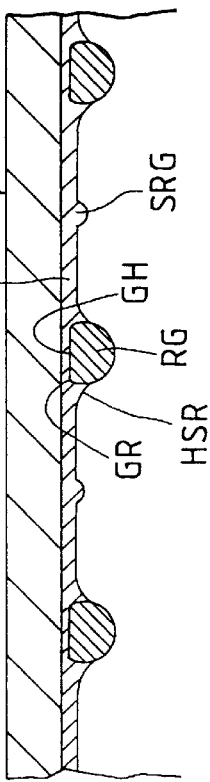
FIG. 14 is a section view of a rod pipe which is formed according to the method shown in FIG. 12.

Now, with reference to FIG. 12, description will be given below of a technique for forming a fishing line guide on the inner surface of the rod pipe main body layer in such a manner that it is integrally united with and projected from the inner surface of the rod pipe main body layer. In this description, there is employed a spiral-shaped fishing line guide. Two or more pieces of thick tape 52 are wound around a core metal 50 at given intervals (of the order of 5–25 mm), and two or more thin tape 54 are then wound around the core metal 50 from above the thick tapes 52 in such a manner that not only they can cover inter-thick-tape portions 56 (of the order of 0.3–3 mm) but also they can form small gaps (0.3–3 mm) on the respective thick tapes 52. These tapes are formed of material having a thermal property capable of standing heat when the rod pipe is formed by heating, such as silicone, polyethylene naphthalate (PEN), polyethylene terephthalate (PET), or the like. And, a prepreg for forming a rod pipe is wound from above these respective tapes and these components are then heated to thereby form the rod pipe. Or, after a mother element for forming a fishing line guide is wound between the respective inter-thick-tape 52 portions and on the upper surfaces of the respective thin tapes 54, the prepregs of the rod pipe main body layer (in an embodiment shown in FIG. 14, a prepreg for the inside layer thereof and a prepreg for the outside layer thereof) are wound, and these components are then heated to thereby form the rod pipe. As a result of this, in the former case, as shown in FIG. 13, a spiral-shaped fishing line guide RG' and small projecting strips SRG, which are respectively formed of the same material as the main body layer HS, are formed on and projected inwardly of the main body layer HS; and, in the latter case, as shown in FIG. 14, a spiral-shaped fishing line guide RG and small projecting strips SRG are formed on and projected inwardly of the main body layer HS.

Since the thin tapes 54 are used in such a manner that they cover the recessed spaces 56 respectively formed between the mutually adjoining thick tapes 52, the fishing line guide RG or RG' is not formed in such a manner that the stepped space shape between the respective thick tapes remains as it is, but it is formed in such a manner that the corners of the stepped space shape are rounded. Due to this, in both of the cases shown in FIGS. 13 and 14, there are not formed corners on which the fishing line can be caught, thereby being able to protect the fishing line as well as reduce the resistance of the fishing line. Also, in the case shown in FIG. 14, front and rear edge portions HSR, which are respectively produced when the fishing line guide RG and the inside layer US of the main body layer HS are engaged with each other, are formed in a curved surface which is recessed in an inward direction, thereby being able to prevent the centralization of stresses in the front and rear portions of the fishing line guide.

Also, the upper surface of the fishing line guide RG is formed in a substantially plane surface, and the upper portion of the fishing line guide RG is formed integrally with the inside layer US of the main body layer HS in such a manner that a portion of the fishing line guide upper portion in the thickness direction thereof is buried in the inside layer US. Due to this, even when the rod pipe is flexed greatly, the rod pipe can be prevented from being broken in this fishing line guide portion. The inside layer US may be a layer which is formed of a fiber reinforced resin prepreg reinforced by fibers mainly consisting of circumferentially directed fibers, or a layer which is formed of only resin, or an inside surface portion formed of a fiber reinforced resin prepreg with the content of resin greater than that of fibers. Further, even if treatments for provision of water repellency, oil repellency, lubrication property are executed on the fishing line guide and/or the inside layer US, since the fishing line guide RG is strongly united with the inside layer US in a partially buried condition or the like, not only the fishing line guide RG is difficult to peel off from the main body layer HS but also the resistance of the fishing line can be reduced.

The small projecting strip SRG is provided along the spiral-shaped fishing line guide RG in such a manner that it extends substantially in parallel to the fishing line guide RG, while the height of the small projecting strip SRG is set approx. 1/10 or less of the height of the fishing line guide RG, in particular, 25 microns or less, normally, on the order of 10 microns. Therefore, even when the fishing line passing through the interior portion of the rod pipe meanders and thus moves in a loosened condition and is thereby going to touch the inside layer of the main body layer, the fishing line is received by the small projecting strip SRG, which can reduce the rate of the direct contact of the fishing line with the inside layer to thereby decrease the resistance of the fishing line. Because the fishing line guide and small projecting strip are both formed substantially parallel, the angles of contact of the fishing line with them can be made to be substantially identical with each other to thereby control the vibrations of the fishing line when it is played out, so that the fishing line is allowed to pass smoothly through the rod pipe while it is forming a slightly spiral shape. Also, since the fishing line guide and small projecting strip can be formed simultaneously when the rod pipe is formed, they are easy to manufacture.

In the illustrated embodiment, the small projecting strip has a semi-circular cross section. However, this is not limitative but any other types of projecting strips can be used, provided that they are projected toward the central side of the rod pipe when compared with the peripheral portions of the main body layer inner surface (inside layer inner surface). Therefore, even if a recessed strip having a large width exists on the main body layer inner surface, the edge portion of such recessed strip can be regarded as a projecting strip. Also, such strip may consist of two or more strips. Further, there can also be employed a fishing line guide structure in which the inside layer inner surface is formed in a rough surface or in a surface having finer recesses and projections formed therein, and such surface is combined with the small projecting strip SRG and fishing line guide RG.

The fishing line guide RG may be formed of a fiber reinforced resin prepreg, fiber reinforced metal, ceramics, thermoplastic or thermosetting resin, rubber, or natural material such as cotton threads or the like. Also, with use of material which is lower in specific gravity than a prepreg for a rod pipe, the weight of the fishing line guide RG can be reduced. Further, it is preferred to use material having a property which allows a fishing line to slide thereon better than the resin of the rod pipe prepreg. It is also preferred to use material which is high in water repellency and wear resistance. When these desired properties cannot be obtained from single material, if a film having these properties are coated on the surface of the material, then the desired properties can be obtained easily.

For example, if the fishing line guide is formed of fluororesin, it can have water repellency and can be improved in the slidability of a fishing line. However, such fishing line guide is inferior in the close contact property with the fiber reinforced prepreg of the rod pipe main body layer. Therefore, in order to prevent the fishing line guide from peeling off from the rod pipe main body layer, a film for enhancement of close contact may be formed in the interface between them, or the inside layer US of the main body layer may be formed of fluororesin or similar system resin.

When a fishing line guide contains high-strength and highly elastic reinforced fibers such as carbon, glass, boron or the like, in order to make the fishing line guide lower in rigidity (or lower in elasticity) than the rod pipe main body layer, the volume ratio of the reinforced fibers may be less than 50%. Also, when low-elasticity material such as synthetic resin or the like is used as mixing fibers (mixing material), the ratio of the mixing material may be set 30% or more, more preferably, the ratio may be made to approach 100%. As an example of the latter case, fluororesin is used as mixing material and epoxy resin is used as matrix material, that is, since use of only the fluororesin provides a poor forming property, the epoxy resin is used as the matrix material in order to retain the shape of the fishing line guide as well as to allow the fishing line guide to be united with the main body layer.

In order that the fishing line guide can be equal to or more than the rod pipe main body layer in rigidity (elasticity), the volume ratio of the reinforced fibers thereof may be preferably 50% or more, more preferably, 70% or more.

By the way, the direction of the fibers may be set in a random direction, or may be so set as to be identical with or intersect at right angles to the longitudinal direction of the fishing line guide, or may be so set as to be identical with the insertion direction of the fishing line.

Figure 15:
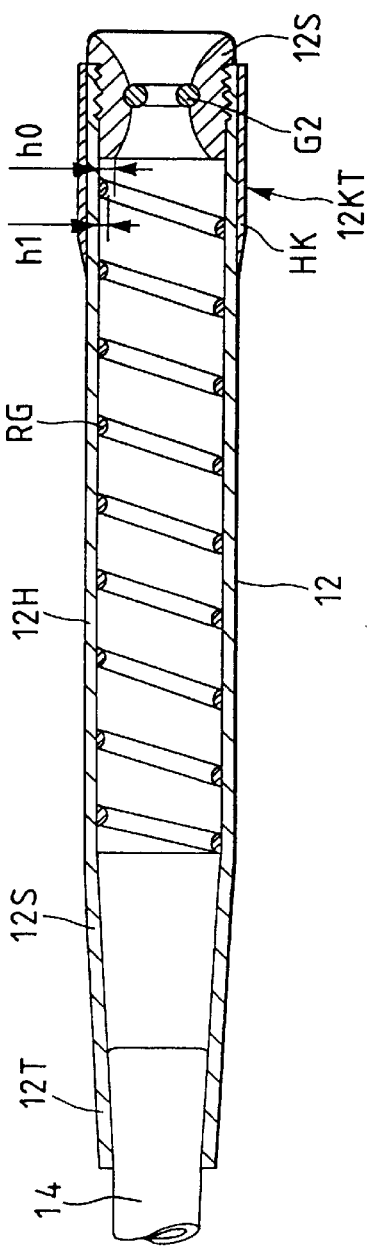
FIG. 15 is a longitudinal section view of a rod pipe.

FIG. 15 is a longitudinal section view of a fishing rod in which a small diameter rod pipe 14 is joined in a swing-out manner to the joining portion 12T of a large diameter rod pipe 12 with a spiral-shaped fishing line guide RG formed integrally with the interior portion thereof. Just in the rear of the joining portion 12T, there is arranged a taper portion 12S and, in the rear of the taper portion 12S, there is arranged a rod pipe main body portion 12H which is formed straight or tapered with an inside taper ratio of $2/1000$ or less. On the rear end portion of the rod pipe main body portion 12H, there is threadedly and removably mounted a hold body 12S which is formed of synthetic resin or the like and is used to hold an annular guide ring G2 formed of hard material such as ceramics or the like.

When the spiral-shaped fishing line guide RG is so formed as to extend up to the neighborhood of the front end of the hold body 12S, if the height h1 of the fishing line guide RG is set lower than the height h0 of the leading end of the hold body 12S, then a line inserting tool or a fishing line are difficult to be caught by the fishing line guide RG when the fishing line is inserted from the rear side of the fishing rod.

As shown in FIG. 16 which will be described later, if the end portion of the fishing line guide is set at a position far away (a distance equal to or more than the pitch of the spiral-shaped fishing line guide) from the end portion of the hold body, then the fishing line can be inserted easily even if the above-mentioned height condition h1<h0 is not satisfied.

If a female screw portion for threaded engagement with the hold body 12S is formed in the rod pipe main body portion 12H after the guide RG is integrally formed up to the rear end of the rod pipe, then there is eliminated a possibility that the integral formation of the end portion of the spiral-shaped fishing line guide RG with the rod pipe main body portion can be unstabilized and thus the rod pipe can run short of strength, so that the rod pipe can be formed easily in such a manner that the integral formation between the rod pipe main body portion and fishing line guide RG is stabilized. In this operation, the portion of the fishing line guide RG, which exists in the female screw portion of the rod pipe main body portion 12H, is cut and removed. In this case, the inner surface of the rod pipe main body portion 12H is left as it is or it is cut off slightly so that the inside diameter of the female screw portion can be equal to or more than the inside diameter of a surface extended from the portion of the inner surface of the rod pipe main body portion 12H that exists just before the female screw portion.

Thanks to this, even if the fiber direction of the inner surface of the rod pipe main body portion is different from the fiber direction of the fishing line guide, or even if the material of the inner surface of the rod pipe main body portion is different from the material of the fishing line guide, because the portion of the fishing line guide existing in the female screw portion is removed, there is eliminated a possibility that the threads of the female screw portion can be chipped off or peeled off. Therefore, according to the present embodiment, there can be provided a threadedly mounting structure which is excellent in durability.

Also, the mother material or element of the spiral-shaped fishing line guide RG to be integrally formed with the inner surface of the rod pipe may be extended to be integrally united with the surface of the area of the rod pipe main body portion 12H where a female screw portion is formed, thereby increasing the thickness of this area, and the increased thickness area may be cut and machined to thereby form a female screw portion. In this case, if the mother material is wound in such a manner that the directed direction of the reinforcing fibers of the mother material extends in a direction intersecting perpendicularly to the axis of the rod pipe main body portion, or extends in a direction which falls within the range of the lead angle of a female screw to be formed with respect to the above perpendicular direction, then there can be formed a female screw portion which is stabilized in strength.

As shown in FIG. 15, when the spiral-shaped fishing line guide RG is terminated in the range of a reinforcing layer HK of a rear end joining portion 12KT of the rod pipe, then the present reinforcing layer HK and spiral-shaped fishing line guide RG are so arranged as to continue with the rod pipe main body portion 12H in the longitudinal direction of the rod pipe, with the result that the rod pipe main body portion 12H includes no longer any portion which can be suddenly weakened in strength. That is, according to this arrangement, there can be provided a high-strength rod pipe 12. By the way, in the case of the reinforcing layer HK, a single prepreg may be wound, or a plurality of prepregs may be wound divisionally. Also, as in the present embodiment, the reinforcing layer HK may be provided on the outer layer, or it may be provided as a middle layer or an inside layer, or further three reinforcing layers HK may be provided on the respective layers divisionally.

If the point of change in the taper ratio of the rod pipe is set in the area where such reinforcing layer is provided, the strength of the rod pipe can be maintained even if the reinforcing fibers are disarrayed when the rod pipe is formed.

Now, FIG. 16 shows a longitudinal section view of the whole length of another rod pipe 12, in which a rod pipe main body portion 12H with a spiral-shaped fishing line guide RG formed integrally therewith is formed straight or gently tapered with an inner surface thereof having a taper ratio of $2/1000$ or less, a taper portion 12S with an inner surface thereof having a steep taper is arranged in front of the rod pipe main body portion 12H, and a joining portion 12T is arranged in front of the taper portion 12S. And, a small diameter rod pipe 14 is joined to the joining portion 12T in a swing-out manner. On the inner surface of an area Z1 which ranges from the joining portion 12T through the taper portion 12S down to the terminated end portion of the spiral-shaped fishing line guide RG located adjacent to the leading end of the rod pipe main body portion 12H, there is provided a reinforcing layer HK1 in such a manner that it is formed integrally therewith. Thanks to this, the portion of the rod pipe 12, in which the taper ratio thereof changes, exists in the thus reinforced area Z1, so that the rod pipe 12 can be made high in strength.

On the other hand, on the rear end portion of the rod pipe 12, there is threadedly mounted a hold body 12S which holds an annular guide ring G2. As described above, although the rear side terminated end portion of the spiral-shaped fishing line guide RG is slightly spaced apart from the leading end of the hold body 12S, on the outer surface of the rod pipe main body portion 12H, there is integrally formed a reinforcing layer HK2 in such a manner that it ranges from the rear end position thereof to the rear side terminated end portion of the fishing line guide RG. In this manner, the reinforcing layers HK1 and HK2 are respectively so provided as to continue with the front and rear side terminated end portions of the spiral-shaped fishing line guide RG of the rod pipe 12. Due to this, the areas of the rod pipe, which cannot be reinforced by the integral formation of the fishing line guide with the rod pipe, can be reinforced by the respective reinforcing layers. This makes it possible to provide a rod pipe which is balanced well in rigidity as a whole and also is high in strength.

A thickness $t2'$, which is the sum of the thickness of the base portion side of the rod pipe main body portion 12H and the thickness of the fishing line guide, is set larger than a thickness $t2$ which is the sum of the front portion side of the rod pipe main body portion 12H and the thickness of the fishing line, and the thickness $t2'$ is also set larger than the thickness $t4$ of the joining portion 12T. When the height of the fishing line guide is set substantially constant, preferably, the thickness $t2'$ may be 1.15 or more times as large as the larger one of the thicknesses $t2$ and $t4$ and, more preferably, it may be 1.25 or more times. Also, the area of the rod pipe main body portion, in which the base portion side or rear end portion side reinforcing layer HK2 is provided, is formed thicker than the thickness $t2'$.

Thanks to the above-mentioned arrangement, even if the fishing line guide is provided, the rod pipe can be formed in such a manner that the rigidity thereof substantially becomes higher toward the base end side thereof. That is, the rod pipe is well balanced in rigidity as a whole, which prevents the presence of the area that is locally lowered in rigidity and strength, thereby allowing the rod pipe to be flexed smoothly. As a result of this, the strength of the rod pipe can be enhanced.

Also, the rod pipe main body portion 12H with the fishing line guide formed integrally therewith has a very low taper ratio of $2/1000$ or less, which prevents the reinforcing fibers of the rod pipe main body layer from meandering or being disarrayed due to the pressurization and heating of the rod pipe when the fishing line guide is formed integrally with the rod pipe, thereby preventing the production of an area which is locally lowered in strength.

Now, FIG. 17 shows a difference or comparison in the size of the fishing line guide between the base portion side of the rod pipe main body portion 12H and the leading portion side thereof. Conventionally, when the spiral-shaped fishing line guide RG is integrally formed on and projected from the inside portion of the rod pipe, the fishing line guide is formed with constant height and width due to the manufacturing conditions thereof such as use of tape-shaped mother material and the like. However, in this conventional structure, there is left room for improvement: that is, the strength of the rod pipe is not stabilized due to the stress centralization in the portion of the rod pipe where the fishing line guide is formed integrally with the rod pipe; and, the ability of the fishing line guide to guide a fishing line must be improved.

Whether the fishing line guide is formed in a spiral shape or not, the pitch of the fishing line guide is set 25 mm or less. If the fishing line guide RG is used not only to guide a fishing line but also to reinforce the rod pipe, it is preferred that the width of the fishing line guide RG may be set larger. The height of the fishing line guide may be preferably set in such a manner that it is higher in the portion of the rod pipe having a large flexure curvature, which makes it difficult for the fishing line to touch the inner surface of the rod pipe. The large flexure curvature portion, in the case of a joined type of fishing rod, may be the leading side portion of the rod pipe or the base side portion thereof depending on which position of the whole of the fishing rod the present rod pipe occupies. Also, when a large diameter rod pipe includes a fishing line introduction portion in the leading portion thereof and a joining portion just in front of the fishing line introduction portion, and also when a small diameter rod pipe is joined to the joining portion of the large diameter rod pipe, it is preferred that a fishing line guide arranged in the base portion side of the small diameter rod pipe is formed high, because this makes it difficult for the fishing line to touch the inner surface of the large diameter rod pipe. That is, it is desirable that the size of the fishing line guide is changed according to the above-mentioned respective conditions. In this sense, if there is provided a condition that the rod pipe main body portion 12H is formed such that the leading side thickness $t1$ thereof is smaller than the base side thickness $t1'$ thereof, or that the flexure curvature of the leading side of the rod pipe main body portion 12H is larger than the flexure curvature of the base side thereof, then the fishing line guide RG may be formed in such a manner that the leading side height $2h$ thereof is larger than the base side height $2h'$ thereof.

In consideration of reduction of the resistance of the fishing line as well as the wear resistance thereof, the fishing line guide may be formed high and wide. When it is desired that the portion of the fishing line guide situated on the base side of the rod pipe is formed larger than the portion thereof on the leading side of the rod pipe according to the above-mentioned various conditions, it should be taken into consideration not only to prevent stress centralization in the portions of the rod pipe before and behind the large fishing line guide caused by the integral formation of the large fishing line guide but also to make the rigidity of the rod pipe base side portion higher than the rigidity of the rod pipe leading side portion to thereby maintain the rigidity balance of the whole rod pipe, that is, to maintain the original strength and rigidity balance of the rod pipe. From the viewpoint of this consideration, it is essential to increase the thickness of the base side of the rod pipe main body portion 12H over the thickness of the leading side thereof. In particular, referring to a thickness which is the sum of the rod pipe main body portion thickness and the fishing line guide thickness, the thickness of the base side may be set 1.5 or more times, preferably, 1.7 or more times as large as the thickness of the leading side. This makes it possible to provide a rod pipe which can maintain the strength thereof and is excellent in rigidity balance. Also, the flexure balance of the rod pipe can be improved.

Here, similarly to the top rod 16 as well as the second middle rod 14 and first middle rod 12 shown in FIG. 1, where the former is considered as a leading side rod pipe and the latter is a base side rod pipe, the preferred dimensions and materials of the fishing line guide are shown below in a comparative manner:

|  | Front Side | Base Side |
|---|---|---|
| (1) Fishing line guide distance: | Small | Large |
| (2) Direction angle of Spiral: | Near to rod pipe axial direction | Far from rod pipe axial direction |

-continued

|  | Front Side | Base Side |
|---|---|---|
| (3) Height (Cross section): Material: | Low (Small) | High (Large) |
| (4) Elastic modulus: | Low | High |
| (5) Wear resistance: | Low | High |
| (6) Others: | Integrally formed with rod pipe | Mounted removably on rod pipe, or forming flat and smooth surface with no guide |

The reason for the condition (1) is as follows: that is, since the front side rod pipe flexes greatly, the distance of the fishing line guide may be set small; as a result of this, even when the front side rod pipe flexes greatly, the fishing line is received by the fishing line guide and is thereby prevented from touching the inner surface of the rod pipe, so that the resistance of the fishing line can be reduced. And,, the reason for the condition (2) is as follows: that is, in the front side rod pipe having a small diameter, partly because it is greatly necessary to drain water flown into the interior portion thereof to thereby reduce the resistance of the fishing line, and partly because the flexure rigidity of the rod pipe main body is originally low, it is necessary to form the front side rod pipe such that the rigidity thereof is not high. For this purpose, the front side rod pipe may be inclined in the longitudinal direction thereof. Also, the reason for the condition (3) is as follows: that is, with use of this setting, the fishing line guide can be made to match with the small diameter of the front side rod pipe, which not only facilitates the insertion of the fishing line but also allows the fishing line guide to be made light in weight to thereby prevent the fishing rod from getting heavy when holding the same. Now, referring to the condition (4), as described above in connection with the condition (2), since the front side rod pipe is originally low in flexure rigidity, the fishing line guide must be so formed as to prevent the low flexure rigidity of the rod pipe from increasing.

Next, referring to the condition (5), if a large load is applied to the fishing rod, then the portion of the fishing rod located in the rear of the front side rod pipe, that is, the base side rod pipe is flexed with a large curvature, whereas the front side rod pipe is caused to face to the downward direction linearly so that it is difficult to be rubbed by the fishing line with a large force. On the other hand, the base side rod pipe does not face fully to the downward direction but is thus rubbed by the fishing line in its flexed condition. Therefore, the base side rod pipe must be formed such that it is high in wear resistance. For a small load, friction matters little. And, the reason for the condition (6) is that, with use of such structure, on the base side, maintenance such as replacement or the like is easy.

If the above conditions (1) to (6) are combined together in one or more sets; then' there can be formed a fishing line guide which has various advantages such as the reduced fishing line resistance, the improved durability of the fishing line guide, and the like.

The above conditions (1) to (6) may be reversed respectively. For example, if the inside diameter of the front side rod pipe is relatively large, the condition (3) may also be reversed, that is, the fishing line guide may be structured reversely. The reversed structure of the fishing line guide is suitable when it is desired to drain water in the front side rod pipe to thereby prevent the water from invading into the base side rod pipe.

Now, preferably, in the portion of a fishing rod which is flexed most (that is, which is largest in curvature) when a load equivalent to the standard target fish of the present fishing rod is applied and also in its neighboring portion, there may be provided a fishing line guide formed of material which is better in wear resistance than a fishing line guide provided in front and rear of the above largest curvature portion and its neighboring portion. Also, as for the shape of the fishing line guide, if it is formed wide, in a trapezoidal shape, and the like, that is, if it is formed such that it has a large contact area with the fishing line, then the durability of the fishing line guide can be enhanced, which in turn can improve the balance of the durability of the fishing line guide over the whole area of the fishing rod.

Figure 18A:
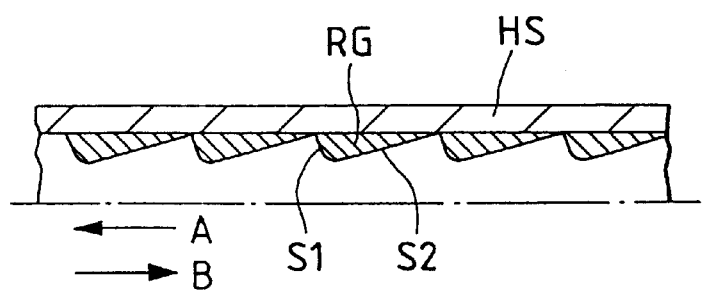
FIGS. 18(a) and 18(b) are explanatory views of a difference in the shape of a fishing line between the provision positions thereof in the interior portion of a rod pipe.
Figure 18B:
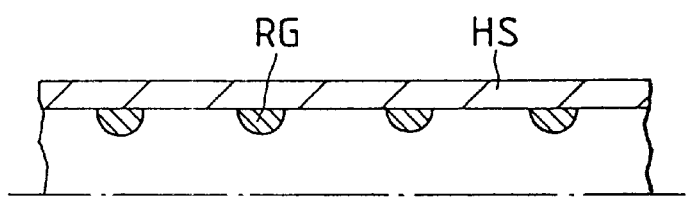

Further, FIG. 18(a) designates a front side rod pipe and FIG. 18(b) stands for a base side rod pipe. The left side in FIGS. 18(a) and 18(b) is the direction of the tip end of the fishing rod. In the front side rod pipe shown in FIG. 18(a), the inside diameter thereof is small, while the cross section shape of a fishing line guide RG consists mainly of a front side steeply inclined surface S1 and a rear side gently inclined surface S2. When a fishing line is played out in a direction A, the fishing line guide RG can receive the fishing line by means of the gently inclined surface S2, push it toward the center side thereof and feed it in the direction A without reducing the play-out energy thereof. On the other hand, when the fishing line is taken up in a direction B, the fishing line guide RG can handle the fishing line on the steeply inclined surface S1 side so that water can be drained well from the fishing line. In the base side rod pipe shown in FIG. 18(b), although a fishing line guide RG is not given any special direction property, since the inside diameter thereof is large, when compared with the front side rod pipe shown in FIG. 18(a), not only the above-mentioned consideration is scarcely necessary in the fishing line play-out operation but also water is drained on the front side in the fishing line take-up operation, that is, such consideration as in the front side rod pipe shown in FIG. 18(a) in the fishing line take-up operation is scarcely necessary.

Figure 19:
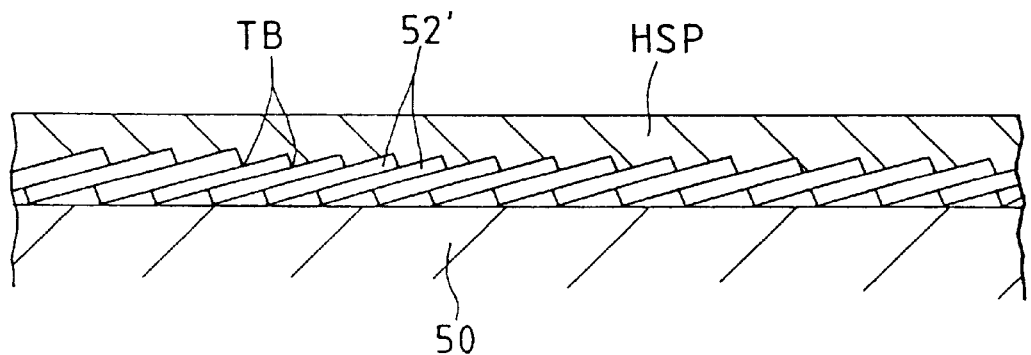
FIG. 19 is an explanatory view of a method for manufacturing an economy type of a rod pipe with a fishing line guide which is formed simultaneously with the rod pipe.

Now, FIG. 19 shows a method in which, when a main body layer is formed of a rod pipe main body layer forming prepreg or the like, a fishing line guide RG' (see FIG. 20) is formed integrally with the main body layer. With use of this method, since it is not necessary to prepare a fishing line guide separately, the cost of material, the number of man-hour, and the like can be reduced. Therefore, the present method is suitable for a fishing rod of a low-price type.

A tape 52' formed of such heat resisting material as previously described is wound around a core metal 50 in such a manner that it is in part overlapped in the width direction thereof. Then, if a highly viscous liquid-state mold releasing agent is applied to the resultant cavities TB and is then dried, or, if, after a provisionally securing resin or paint is applied thereto and is then dried, the mold releasing agent is further applied thereon, then not only these cavities can be respectively turned into curved surfaces but also the curved surfaces are coated with the mold releasing agent. After then, a main body layer forming prepreg HSP is further wound around the resultant wound assembly from above. And, if the finally wound assembly is pressurized and heated, then a rod pipe can be formed. After such formation of the rod pipe, the forming tape 52', mold releasing agent, provisionally securing resin and the like are removed from the inside 6f the rod pipe.

Figure 20:
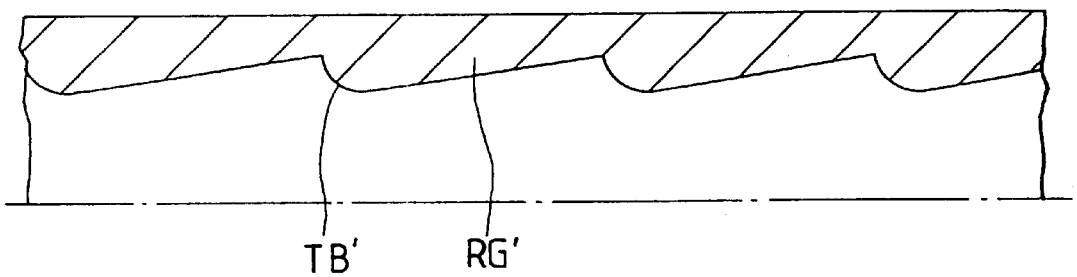
FIG. 20 is a partially longitudinal section view of a rod pipe manufactured according to the method shown in FIG. 19.

As a result of this, there can be produced the rod pipe which is formed integrally with the fishing line guide RG' having such a section shape as shown in FIG. 20. As described above, since the cavities TB are formed into curved surfaces, the top portions TB' of the fishing line guide RG' produce no corners but are formed into curved surfaces. Therefore, even if the fishing line touches the curved top portions of the fishing line guide RG', the fishing line guide RG' does not damage the fishing line and also can reduce the resistance of the fishing line.

Instead of the above method, in order that the projecting side of the fishing line guide into the rod pipe can be formed into curved surfaces, there are available several methods. For example, if such recess-like cavities as shown in FIGS. 21(*a*), 21(*b*) and 21(*c*) are formed in the above-mentioned thick tape 52' formed of heat resisting material, the tape 52' is wound around a core metal in such a manner that the cavity side thereof faces outwardly, the thus wound assembly is covered with suitable material such as a prepreg or the like from outside, and the finally resultant assembly is then pressurized and heated, then there can be formed a fishing line guide which has a desired section shape (the tape 52' is removed from the fishing line guide afterwards). Or, if material such as resin or the like for forming a fishing line guide is arranged in cavities with a desired shape which are formed in the tape 52', a rod pipe forming prepreg is wound around the thus arranged material, and the thus wound assembly is pressurized and heated, then there can be formed a fishing line guide which has a desired section shape (the tape 52' is removed from the fishing line guide afterwards).

The foregoing description in this specification, except for the dimensional relationship for storage, can apply not only to the above-mentioned fishing rod including a joining portion of a swing-out joining type, but also to other fishing rods respectively including joining portions of an ordinary joining type, an "INROW" joining type (adjacent pipe portions are jointed by an insert), and an invertedly joining type. Also, the above-mentioned structures may be used individually or some of them may be combined together.

As can be understood clearly from the foregoing description, according to the invention, there can be provided an interline fishing rod which, even if a fishing line guide is provided in the interior portion thereof, is high in strength, is well balanced in rigidity and can be flexed smoothly. Also, since the inside diameter of the fishing line guide is set larger than the inside diameter of the joining portion, a small diameter rod pipe can be stored into the interior portion of a large diameter rod pipe, provided that the fishing rod is of a swing-out joining type.

FIG. 22 is a side view of an interline fishing rod according to the invention, showing a state thereof in which it is in use, and FIG. 23 is a longitudinal section view of the present fishing rod, showing a state thereof in which it is stored. In the present fishing rod, a third middle rod 112 is joined to a base rod 110, a second middle rod 114 is joined to the third middle rod 112, a first middle rod 116 is joined to the second middle rod 114, and a top rod 118 is joined to the first middle rod 116 in a swing-out joining system. Also, a top guide 120 is engaged threadedly and removably with the tip end of the top rod 118. On the other hand, on the base side of the fishing rod, a reel leg fixing device 122 is mounted on the base rod 110 and a reel 124 is fixed to the reel leg fixing device 122, while a rod bottom part 128 is mounted on the rear end of the base rod 110. And, a fishing line introduction portion 126 is formed in the front portion of the third middle rod 112, while a fishing line 130 is introduced from the reel 124 through the fishing line introduction portion 126 into the interior portion of the rod pipe and is then led out externally from the top guide 120. On the fishing line 130 which is led out externally of the top guide 120, as shown in FIG. 23, there is mounted a ball-shaped fishing line stop member 132 so that the fishing line can be left existing externally of the top guide 120 in the storage condition of the fishing rod.

The top guide 120 includes a hold portion 138 in the rear portion thereof, while the first middle rod 116 includes in the outside portion of the front end thereof a stopper portion 134 and a hold portion 140 disposed in the rear of the stopper portion 134. Similarly, the second middle rod 116 includes in the front end portion thereof a stopper portion 136 and a hold portion 142 disposed in the rear of the stopper portion 103, and further a hold portion 144 is disposed in the rear of the fishing line introduction portion 126. By the way, the fishing line introduction portion 126 may also be disposed in the base rod 110 or the like.

The top guide 120, stopper portions 134, 136, and fishing line introduction portion 126, when the rod pipes 118, 116, 114 and 112 in which they are respectively mounted or formed are stored into their respective adjoining large diameter rod pipes 116, 114, 112 and 110, respectively perform the functions of stoppers to prevent their respective rod pipes from being stored excessively, that is, the rod pipes can be stored in such a manner that the holding portions thereof used when they are pulled out can be left unstored.

Also, on the respective ends of the rod pipes 118, 116, 114 and 112, there are removably mounted hollow plug bodies 118E, 116E, and 114E as well as a bottom plug 112E respectively having guide rings formed of ceramics, and there is still left a space between the hollow plug body 114E and bottom plug 112E. Therefore, when the fishing rod is stored with the fishing line 130 inserted through the interior portion thereof, the fishing line 130 can be inserted freely in a folded manner with the direction thereof changed at the rear end of the second middle rod 114. In FIG. 23, the fishing line 130 is shown with part thereof omitted. That is, when the fishing line 130 is taken up around the reel 124 with the respective rod pipes stored, if the fishing rod is not directed to the downward direction, then the fishing line 130 can be taken up freely. However, in some cases, the fishing rod can be directed downwardly in error and, in this case, the respective rod pipes are allowed to fall down. In order to prevent such fall, there are provided the above-mentioned hold portions 138, 140, 142 and 144. Due to this, the rod pipes, in which the hold portions are respectively provided, can be lightly pressed against and held by the respective leading end inner surfaces of the adjoining large-diameter rod pipes into which they are stored. Therefore, in the storage condition, the respective rod pipes are prevented against removal during the take-up operation of the fishing line 130 by means of the reel 124, thereby being able to stabilize the take-up operation. Also, in order to facilitate the insertion of the fishing line 130, when the rod pipes are stored, the hollow plug body 118E may be held by the front portion of the hollow plug body 116E of the rod pipe 116, and the hollow plug body 116E may be held by the front portion of the hollow plug body 114E of the rod pipe 114.

Now, over the whole 6f the longitudinal direction of the interior portions of the rod pipes 114, 116 and 118 that are situated in front of the fishing line introduction portion 126, there are provided a large number of fishing line guides 146 which are respectively formed in a spiral shape and are projected inwardly from the inner surfaces of their respective rod pipes. That is, in a fishing operation, the fishing line 130 can be inserted through the fishing rod in such a manner that the resistance of the fishing line 130 can be reduced due to the guide of the large number of fishing line guides 146. By the way, there may be present areas in which no fishing line guide is provided. Now, description will be given below by taking the case of the second middle rod 114. However, the description can also apply to the other rod pipes 116 and 118 similarly. Also, in consideration of maintenance, there is provided a pipe member which is structured such that not only a large number of fishing line guides are provided on and projected from the inner wall thereof but also it can be removably inserted into the interior portion of a rod pipe main body. The description of this pipe member can also apply to the other rod pipes similarly.

Now, FIG. 24 shows a state in which a fishing line guide 146 is provided on and projected from the inner surface of a rod pipe main body 114, which is composed of an inside layer 114U including reinforcing fibers mostly directed substantially in the circumferential direction of the rod pipe main body 114, a middle layer 114M including reinforcing fibers mostly directed substantially in the axial direction thereof, and an outside layer 114S including reinforcing fibers mostly directed in the circumferential direction thereof. The fishing line guide 146 includes inclined surfaces KS respectively formed on the two sides thereof and, in the top portion thereof, a fishing line guide surface GS formed in a smooth curved surface which is projected toward the center of the rod pipe. The two inclined surfaces KS and the fishing line guide surface GS are connected with each other by means of curved surfaces R. Further, the two inclined surfaces KS and the rod pipe main body 114 are connected with each other by means of surfaces SS which are respectively formed in an inclined surface or in an unevenly curved surface in the bottom portion of the fishing line guide 146. However, the inclined surfaces KS may be extended as they are to the rod pipe main body and thus the surfaces SS of the bottom portion of the fishing line guide 146 may be omitted.

The fishing line guide 146 is formed widely in such a manner that the width B thereof is two or more times as large as the height H1 thereof. Due to this wide shape, whether the fishing line guide 146 is formed integrally with the rod pipe main body 114 or not, the fishing line guide 146 is stable even if it is given a force from the fishing line. Preferably, the width B may be set 2.5 or more times, more preferably, 3.5 or more times as large as the height H1. Also, the fishing line guide 146 is formed such that the contact of the fishing line can be received by the above-mentioned fishing line guide surface GS. For this purpose, the height width H2 of the fishing line guide surface GS may be set 10% or more, preferably, in the range of 20–60% of the fishing line guide height H1. The inclination angle θ of the inclined surface KS may be normally set at an angle of 30° or more, preferably, in the range of 45–70°. However, since the fishing line guide surface GS is formed in a curved surface, it may also be set in the range of 0–30°. By the way, generally, because it is preferred that the fishing line guide surface is mirror-surface shaped and hard, an area portion KZ having the height width H2 may be formed of hard material.

The height H1 of the fishing line guide may be set in the range of 20–120% of the thickness of the rod pipe main body 114 and, normally, it is set substantially equal to the rod pipe main body thickness. If the height H1 of the fishing line guide is set 1.5 or more times as large as the rod pipe main body thickness, then stress centralization is easy to occur in the portions of the rod pipe main body existing in front and rear of the fishing line guide, so that the rod pipe main body can be broken easily. Also, if the height H1 of the fishing line guide is set too small, then the fishing line can touch the inner surface of the rod pipe main body, which increases the resistance of the fishing line. By the way, when the top and base sides of the fishing rod are compared with each other, the rod top side is large in flexure, so that not only the fishing line and rod pipe main body inner surface are easy to touch each other there but also the rod pipe main body is small in thickness there. For this reason, the rod top side may be formed such that the ratio of the fishing line guide height with respect to the rod pipe main body thickness is set high, while the rod base side may be formed such that the ratio of the guide height is set low.

Now, FIG. 25 shows another embodiment of a fishing line guide according to the invention, in which the fishing line primary guide surface GS thereof is not symmetrical to each other in the right and left direction but is inclined in one direction. In particular, the fishing line guide surface GS is the surface of a portion KZ formed of hard material. In the embodiment as shown in FIG. 25, the forward direction of the arrow line A is the front portion of the fishing rod and, in a casting operation, the fishing line is guided while it is in contact with a gently inclined surface KS' (which is part of the fishing line guide surface). The height width H2' of the fishing line guide surface may be set 10% or more, preferably, in the range of 20–60% of the fishing line guide height H1. However, on the fishing rod base side of the fishing line guide, a surface SS and an inclined surface KS, which are respectively provided in the bottom portion of the fishing line guide in FIG. 25, may be omitted and, instead, the gently inclined surface KS' may be extended as it is to the surface of the rod pipe main body.

Now, FIG. 26 is still another embodiment of a fishing line guide according to the invention, in which two or more smoothly projecting curved primary guide surfaces GS' can be formed within the range of the width B of the fishing line guide. In this case, the curved surfaces GS' are the surfaces of the hard material portions KZ of the fishing line guide.

The hard material portion KZ including the fishing line guide surface may be formed of wear resisting material such as ceramics, metal, synthetic resin harder than the matrix resin of the rod pipe main body, or the like, or may be formed by mixing together two or more of these materials. Also, in some cases, the hard material portion KZ may be formed of the same synthetic resin as the matrix resin of the rod pipe main body. In the above-mentioned mixed formation, they may be mixed in the form of reinforcing fibers or particles. This can enhance the durability of the fishing line guide and further, if the fishing line guide surface of the hard material portion KZ is made smoother than the inclined surfaces KS, the surface SS of the bottom portion, and the inner surface of the rod pipe main body, then the damage of the fishing line can be prevented as well as the slidability of the fishing line can be enhanced. In particular, the fishing line guide surface may be formed in a smooth condition which provides a degree of unevenness of at least 5 microns or less, preferably, a degree of surface roughness of 3 microns or less. More preferably, it may be formed in a mirror surface of 1 micron or less which can provide a gloss surface. Also, if the inclined surfaces KS, the surface SS of the bottom portion, and the inner surface of the rod pipe main body are formed of water repellent material, or if these surfaces are coated with such material, or if such material is adhered to these surfaces, then water drops are easy to flow thereon, the adhesion of the fishing line to these surfaces can be prevented, and the resistance of the fishing line can be reduced. More preferably, if a water repellent property may be applied to the fishing line guide surface as well.

In order to make the fishing line guide surface hard or water repellent, the whole of the portion KZ may be formed of hard material, or the fishing line guide surface may be coated with a film such as a water-repellent tape or the like, or, as shown in FIG. 27, material GR having a hard property or a water repellency may be filled or buried into the fishing line guide surface GS of the fishing line guide. This can also be achieved by mixing the special material GR into a given portion of longitudinally directed reinforcing fiber bundles of a fishing line guide mother element which is formed by impregnating such reinforcing fiber bundles with resin. And, it should be noted here that this can apply regardless of the section shape of the fishing line guide, that is, this can apply similarly even when the section shape of the fishing line guide is triangular, trapezoidal, or circular.

Now, FIG. 28 is a longitudinal section view of a fishing rod, showing a state in which the fishing rod is greatly flexed. The height and pitch of the spiral-shaped fishing line guide 146 are set in such a manner that the fishing line 130 does not touch the inner-surface of the rod pipe main body 114 but touches the fishing line guide surface GS of the spiral-shaped fishing ling guide 146 even in such flexed condition of the fishing rod. In particular, the pitch of the fishing line guide 146 may be set 10–100 times as large as the height of the fishing line guide 146. Also, when the pitch is 50 times as large as the height, if the portions of the rod pipe inner surface respectively existing between the fishing line guides are formed uneven to thereby prevent the fishing line from touching directly the rod pipe inner surface in the wide range thereof, then the resistance of the fishing line can be reduced. Preferably, the fishing line may be prevented from touching not only the rod pipe main body inner surface but also the other portions of the fishing line guide than the fishing line guide surface GS thereof. Also, as shown in FIG. 28, if the width B of the fishing line guide 146 is large, then it is possible to prevent stresses from being centralized on the rod pipe main body when the fishing rod is flexed greatly.

As described above, if the fishing line guide surface is formed in a projectingly curved surface, then the contact area thereof with the fishing line is reduced and the resistance of the fishing line is thereby reduced. This is an experimental fact, that is, as a result of an experiment conducted on several kinds of spiral-shaped fishing line guides which respectively have a substantially trapezoidal section shape with the upper side thereof decreased in length, it is found that the shorter the upper side of the trapezoidal section is, the smaller the fishing line resistance is. And, the fishing line resistance is the smallest when the fishing line guide surface is a curved surface which projects on the central side of the pipe element. Also, when there are arranged a large number of fishing line guides such as the spiral-shaped fishing line guides, there is eliminated the possibility that the special positions of the fishing line guides can be worn. That is, it can be well said that the above-mentioned arrangement is excellent in durability as well.

Now, FIGS. 29(a), 29(b) and 30 are respectively explanatory views of a method for manufacturing a fishing line guide according to the invention, in which a thick tape 148 formed of heat resisting material such as silicone or the like is wound around a core metal 152 at a given interval TB. The thick tape 148 is formed such that it has a thickness almost as large as the height of a fishing line mother element 146'. The section of the thick tape 148 before it is wound shows a state which is shown in FIG. 29(a), in which each of the side surfaces 148K thereof is previously cut into an inclined surface. If tension is applied to the thick tape 148, then the thick tape 148 is turned into a state which is shown in FIG. 29(b). That is, the tape 148 is deformed in such a manner that the end portion 148T of the acute-angle side thereof is raised up. With the surface of the thus raised side of the tape 148 opposed to the surface of the core metal 152, the thick tape 148 is wound while applying a given amount of tension to the tape 148. After then, a thin tape 150, which is formed of polypropylene, polyethylene naphtalate (PEN), polyethylene terephatalate (PET), or the like having heat resistance to the forming temperature of the rod pipe main body, is wound in such a manner that it covers the clearances between the winding sections of the thick tape 148.

Due to the shape of the thick tape 148 and the form retaining property of the thin tape 150, in spite of the existence of the surface of the core metal 152, the thin tape 150 existing in the clearances of the winding sections of the thick tape 148 is allowed to have a curved surface which is projected in the core metal direction. On top of this, the fishing line guide mother element 146' is wound or mounted. Further, on top of this, a prepreg for forming the rod pipe main body is wound and, after then, such assembly is heated and hardened while it is pressurized by means of a tightening tape. After the rod pipe main body is formed, the core metal 152 is taken out from the assembly and then the thick tape 148 and thin tape 50 are removed therefrom.

In order to facilitate the removal of the core metal and the respective tapes, after a mold releasing agent is applied to the surface of the core metal, the thick tape is wound and, after a mold releasing agent is, applied to the surface of the thick tape, the thin tape is wound. Further, after a mold releasing agent is applied to the surface of the thin tape, the fishing line guide mother element is wound. However, if the thin tape 150 is formed of fluorine system material, the fishing line guide and rod pipe main body inner surface can be enhanced in water repellency and, therefore, after the thin tape 150 is wound, the mold releasing agent may not be applied. Further, in order to prevent the fishing line guide from being formed integrally with the rod pipe main body, after a mold releasing agent is applied from above the fishing line guide, the rod pipe main body prepreg may be wound.

Since FIG. 30 is an explanatory view, the clearances are drawn enlargedly. In the case of the fishing line guide mother element which is composed of reinforcing fiber bundles impregnated with resin, if the section area of the fishing line guide mother element is set substantially equal to the area of the thick tape clearance, then, when the rod pipe main body is formed by heating, the reinforcing fibers of the fishing line guide mother element are not moved so much but the resin impregnated into the fishing line guide mother element flows out to thereby be able to not only form the inclined surfaces KS and bottom portion surface SS of the fishing line guide but also prevent the fibers of the rod pipe main body from meandering and the thickness thereof from varying. For this purpose, the ratio of the resin impregnation of the fishing line guide mother element may be set in the range of 30–40 wt %. Also, if circular-shaped or oval-shaped fiber bundles are used in the fishing line guide, then the fishing line guide surface can be easily formed into a projecting curved surface, the unevenness of the surface of the fishing line guide top portion can be reduced, and the manufacture of the fishing line guide can be made easy.

As can be clearly understood from the foregoing description, according to the invention, since the fishing line guide is formed large in width, even if the fishing line guide surface situated on the central side of the rod pipe member receives resistance due to the contact of the fishing line, the fishing line guide is left stable. Also, because the fishing line guide surface is a curved surface which is projected on the central side of the pipe element, the area (length) of contact of the fishing line is small or like a dot, so that the resistance of the fishing line can be made small as much as possible. Even in this case, since the fishing line guides are provided in large number, there is also eliminated the possibility that the special points of the fishing line guides can be worn and the durability of the fishing line guides can be thereby lowered.

FIG. 31 is an explanatory view of a fishing rod manufacturing method according to the invention, in which a mold releasing agent to be used normally is applied onto a core metal (core member) 210, resin such as epoxy resin or the like is applied after the mold releasing agent is dried, and, before or after the resin is dried, a heat resisting thick tape 212 formed of fluorine material or the like is wound from above with a suitable clearance between the winding sections thereof. Due to the adhesive action of the resin applied, the thick tape 212 is provisionally secured on the core metal 210 and is thereby difficult to be shifted from the winding position thereof, that is, the thick tape 212 can be stabilized. After then, a thin tape 214 formed of polypropylene or the like is wound in such a manner that it covers the clearance produced between the winding sections of the thick tape 212. Further, from above this, there is wound spiral-shaped fishing line guide mother material 216 which is composed of carbon fiber bundles impregnated with resin.

If a tape is wound at a constant pitch around the core metal 210 having a forwardly narrowed taper, then the direction of the tape on the base side of the core metal 210 having a larger diameter is nearer to the circumferential direction of the core metal 210, whereas the direction of the tape on the front side of the core metal 210 is nearer to the longitudinal direction of the core metal 210. Therefore, if the tape winding operation starts on the base side of the core metal 210, the tape wound is difficult to collapse and can be stabilized (in particular, if the tape is wound about 3 to 4 times, then it can be stabilized), which in turn facilitates the following tape winding operation. The thin tape 214 has a width to extend even to the upper surfaces of the thus wound thick tape 210 existing on both sides of the clearance between the winding sections of the thick tape 210, and the thin tape 214 is wound in such a manner that it hangs down into such clearance. A fishing line guide mother material 216 is wound in the clearance from above the thin tape 214.

The above-mentioned thick tape 212, thin tape 214 and fishing line guide mother material 216 may be wound sequentially in this order, or, they may be wound together in such a state as shown in FIG. 31. If they are wound together, of course, the winding operation efficiency can be improved.

After then, as shown in FIG. 32, a scrim tape 218 is wound in the neighboring portion of the terminated end portion of the above winding, and, while the neighboring portion of the winding terminated end portion is held with fingers, the portion of the scrim tape 218 exposed in front of a given line CT is cut by a cutter. After the core metal 210 is exposed in this manner, resin such as epoxy resin or the like used in the rod pipe main body forming prepreg is applied again onto the surface of the thud exposed portion 210S, and a prepreg P1 is wound on top of this in such a manner that it can have a thickness almost as large as the height of the fishing line guide mother material 216. The use of the adhesive property of the resin applied facilitates the winding operation.

Next, a mold releasing agent having not only a releasing property but also a water repellent property and the like is applied onto the upper surface of the fishing line guide mother material 216 existing in the winding range thereof, except for the upper surfaces of the prepreg P1 and scrim tape 218. This is partly because, if the inner surface of the rod pipe formed has a water repellent property, then water drops can be removed therefrom effectively, which leads to the reduced fishing line resistance; and, partly because, if the fishing line guides formed of the fishing line mother material 216 is united together with the rod pipe main body into an integral body, when the rod pipe are flexed greatly, the existence of the thus integrally united fishing line guides forms a thin mold releasing layer which prevents the possibility that stress centralization can occur in the rod pipe main body to thereby break the same.

After then, resin (preferably, the resin that is used in the rod pipe main body forming prepreg) is applied from above the fishing line guide mother material 216, and thick and thin tapes 212 and 214; before or after the resin is dried, the rod pipe main body forming prepreg is wound from above; and, this winding assembly is heated while it is being pressurized by a tightening tape or the like, thereby forming the rod pipe. The reason why the resin is applied is that a certain degree of adhesive property of the resin secures the rod pipe main body forming prepreg onto the respective tapes provisionally, which in turn makes the tapes difficult to shift their respective winding positions, thereby being able to stabilizing the forming operation. In this case, if the rod pipe main body forming prepreg is wound in other positions than the base side portion where the thick tape 212 and thin tape 214 have already been wound (in other words, if the winding range of the thick and thin tapes is increased accordingly), then it is quite easy to remove these tapes after the rod pipe is formed. Therefore, after formation of the rod pipe, the core metal 210 is firstly taken out from the assembly and, next, these thick and thin tapes are removed; and, after then, the end portion of the mother material of the rod pipe may be cut. However, after the core metal 210 is taken out and the end portion of the rod pipe mother material is cut, fingers or a jig may be inserted into the assembly from the thus cut portion to thereby grip the thick and thin tape end portions, so that these tapes can be removed.

Now, FIG. 33 is an enlarged view of a typical structure of the front portion of a rod pipe with a main body prepreg wound therearound, while the above-mentioned thin tape 214 is omitted here. A fishing line guide mother material 216 is wound in the clearance between the winding sections of a thick tape having a trapezoidal section through a thin tape (not shown). In FIG. 33, reference character 218 designates the remaining portion of a scrim tape after it is used and cut in the above-mentioned cut end portion, PS stands for a wound layer of the above-mentioned prepreg P1, and PH expresses a wound layer of a rod pipe main body forming prepreg, respectively. The layer PS becomes substantially equal in thickness to the fishing line guide after the rod pipe is formed. Due to this, in a fishing rod of a joining type, when a small-diameter rod pipe joined to the front side of the formed rod pipe is stored into the interior portion of the fishing rod, the layer PS is able to guide the small-diameter rod pipe in such a manner that it prevents the small-diameter rod pipe from being caught by the fishing line guides respectively projecting from the inner surface of the formed rod pipe.

Besides the above-mentioned fishing rod manufacturing methods, according to the invention, there can be employed various manufacturing methods which are expressed as a–h respectively in the following table. Step elements 1–15 are shown in the table in the order of steps, for example, Step 3 means that it is enforced after the steps 1 and 2 have been completed. A mark O (round) in the respective manufacturing methods means that it requires executing a step element specified in the left column thereof. However, in every manufacturing method, one of the steps 13 and 15 is selected, if the thin tape must be left there, then the thin tape is not removed but is left as the inner-most layer of the rod pipe. Also, in the case of a manufacturing method which includes all of the three step elements 4, 5 and 6, these step elements may be enforced at the same time. Further, between the step elements 6 and 7, as the need arises, there can be inserted a series of operations to wind a scrim tape, to cut the scrim tape, to apply resin, and to wind a prepreg P1, which are explained with reference to FIG. 32.

|  |  | Kinds of Manufacturing Methods | | | | | | | |
|---|---|---|---|---|---|---|---|---|---|
| Step | Elements | a | b | c | d | e | f | g | h |
| 1. | Core member | 0 | 0 | 0 | 0 | 0 | 0 | 0 | 0 |
| 2. | Mold releasing agent | 0 | 0 | 0 | 0 | 0 | 0 | 0 | 0 |
| 3. | Resin | 0 | 0 | 0 | 0 | 0 | 0 |  |  |
| 4. | Thick tape | 0 | 0 | 0 | 0 |  | 0 | 0 | 0 |
| 5. | Thin tape | 0 | 0 | 0 |  | 0 |  | 0 |  |
| 6. | Guide mother material | 0 | 0 |  | 0 |  | 0 | 0 | 0 |
| 7. | Mold releasing agent (Water repelling agent) |  | 0 |  |  | 0 | 0 |  |  |
| 8. | Resin | 0 | 0 | 0 | 0 | 0 | 0 | 0 | 0 |
| 9. | Rod pipe main body forming prepreg | 0 | 0 | 0 | 0 | 0 | 0 | 0 | 0 |
| 10. | Tightening tape | 0 | 0 | 0 | 0 | 0 | 0 | 0 | 0 |
| 11. | Heating and baking | 0 | 0 | 0 | 0 | 0 | 0 | 0 | 0 |
| 12. | Core member removal | 0 | 0 | 0 | 0 | 0 | 0 | 0 | 0 |
| 13. | Thick (and thin) tapes removal | 0 | 0 | 0 | 0 | 0 | 0 | 0 | 0 |
| 14. | Formed mother material end portion cutting | 0 | 0 | 0 | 0 | 0 | 0 | 0 | 0 |
| 15. | Thin (and thin) tapes removal | 0 | 0 | 0 | 0 | 0 | 0 | 0 | 0 |

The manufacturing method a does not include the step element 7. That is, this method is suitable for a case in which the thick and thin tapes can be removed easily without using this step, for example, a case in which these tapes are formed of material which can be separated quite easily from the rod pipe main body layer, or a case in which these tape are coated with mold releasing agent on the boundary sides to the rod pipe main body layer. Also, since the fishing line guides are formed integrally with the rod pipe main body, this method is suitable for a case in which the fishing line guides are small in height and thus only the slight degree of stress centralization can occur.

The manufacturing method b is a method which has been already described in detail and, in this method, the fishing line guide are not formed integrally with the rod pipe main body. When a mold releasing agent having a water repellent property is used in the step 7, the inner surface of the rod pipe shows a water repellent property.

The manufacturing method c excludes the step elements 6 and 7. In this method, the fishing line guide is formed of resin, in more particular, it is formed by use of the flow of the resin of the rod pipe main body forming prepreg, and the fishing line guide is thus formed integrally with the rod pipe main body. Also, in the present method, no water repellent layer is formed on the inner surface of the rod pipe. However, when the thin tape itself has a water repellent property, the thin tape is not removed but is left in the step 13 or 15.

In the manufacturing method d, there are excluded the step elements 5 and 7, and the fishing line guide is formed in accordance with the shape of a fishing line guide forming groove formed in the thick tape, or by forming the cut shape of the edge of the thick tape in a recessed curved surface. Therefore, the present method is suitable for a case in which the fishing line guide can be formed in such a manner that it does not include any sharp edge. In the present method, although the fishing line guide is formed integrally with the rod pipe main body, no water repellent layer is formed on the inner surface of the rod pipe.

The manufacturing method e excludes the step element 6. In this method, the fishing line guide is formed of resin, in more particular, it is formed by use of the flow of the resin of the rod pipe main body forming prepreg, and the fishing line guide is thus formed integrally with the rod pipe main body. Also, in the present method, a water repellent layer is formed on the inner surface of the rod pipe.

The manufacturing method f does not include the step element 5 and thus it is similar to the above-mentioned manufacturing method d in this respect. However, the fishing line guide is not formed integrally with the rod pipe main body because the mold releasing layer is intervened between them, and a water repellent layer is formed on the inner surface of the rod pipe.

The manufacturing method g excludes the step elements 3 and 7 and, when compared with the previous manufacturing methods a–f, with use of this method, although it is slightly more difficult to wind the tapes, it is possible not only to save trouble in applying the resin but also to reduce the man-hour. Also, the fishing line guide is formed integrally with the rod pipe main body, but no water repellent layer is formed on the inner surface of the rod pipe.

The manufacturing method h excludes the step elements 3, 5 and 7. With use of the present method, the man-hour can be reduced further when compared with the manufacturing method g. However, from the viewpoint of the formed shape of the fishing line guide, it is preferred to employ such a device as described in the manufacturing method h in winding the thick tape.

In the above-mentioned manufacturing methods, even when no water repellent layer is formed on the inner surface of the rod pipe in the step 7, except for the manufacturing methods d, f and h, if the thin tape is so treated as to have a water repellent property and also the thin tape is left in the step 13 or 15, then the inner surface of the rod pipe shows a water repellent property.

The position of the step 7 may be moved to a position just before the step 6 of winding the fishing line guide mother material and, in this case, the fishing line guide is formed integrally with the rod pipe main body. Also, in the manufacturing methods c and e, fluorine particles are mixed into the resin to paint the previously wound elements in place of the step 8, and fluorine particles are put into the groove portion of thin tape where the fishing line guide is formed, or a step of putting material having a special property such as wear resistance and the like into the groove portion is inserted just before the step 8. In this case, because the material such as fluorine or the like is arranged adjacently to the surface of the thus formed fishing line guide, the fishing line guide can repel water and reduce the contact resistance with respect to the fishing line. That is, the present fishing line guide has a property more excellent than the fishing line guide which is formed of only the resin of the rod pipe main body forming prepreg.

Referring to the thin tape 214, generally, as described above, even if a thin tape formed of polypropylene or the like is used, it is removed after the rod pipe is formed. However, this is not limitative but, for example, in order that the inner surface of the rod pipe formed and the surface of the fishing line guide formed can be turned into smooth mirror surfaces, can be made to have wear resistance, or can be turned into water repellent surfaces, a thin tape formed of material abundant in such properties can be used, and, after then, the thin tape can be adhered to the interior portion of the rod pipe when the rod pipe is formed by heating, that is, the thin tape can be left there as it is as a thin layer. As the material that can be used in this example, for the sake of production of the mirror surface, there are available thermoplastic resin such as polyamide resin, polypropylene resin, polyethylene resin or the like, a metal foil, a resin tape coated with metal, and the like. And, for the sake of water repellency, there are available polyester, polyethylene, polyether ether ketone, polyether imide, fluorine resin, silicone resin, very thin body of polypropylene coated with fluorine resin, a very thin metal belt of nickel alloy, copper alloy, stainless steel or the like coated with fluorine resin, and the like.

If the tension with which the thin tape 214 is wound is set small, then the thin tape 214 does not sink deep along the inner surface of the clearance between the winding sections of the thick tape and thus the depth of the entry of the fishing line guide material 216 is small. On the other hand, if such tension is set large, then the thin tape 214 sinks deep so as to extend along the inner surface of the clearance between the winding sections of the thick tape and thus the depth of the entry of the fishing line guide material 216 is large. For example, where the thickness of the thick tape 212 is of the order of 0.4 mm, the thickness of the thin tape 214 formed of polypropylene is of the order of 0.01 mm, and the width thereof is 10 mm, if the tension is set of the order of 0.5 kg, then the thin tape does not sink completely, so that, if the fishing line guide mother material is wound, then the thin tape is pressed by the fishing line guide mother material and is thereby deformed so as to extend therealong. Also, if the tension is set of the order of 1 kg, then the thin tape is allowed to sink almost completely, so that, even if the fishing line guide mother material is wound, there can be produced a clearance between the right and left portions of the fishing line guide mother material and the thin tape.

The section of the spiral-shaped fishing line guide formed, preferably, may have a shape which can be obtained by rounding the upper bottom of a trapezoid in which the ratio of the lengths of the sides of the upper and lower bottoms is about 1 to 3, or by rounding the vertex of an isosceles triangle or any other type of triangle with the width of 0.4 mm or less (0.1–0.4 mm). The reasons for this are as follows: that is, a variation in the width dimension of the thick tape 212 is of the order of ±0.1 mm, the pitch accuracy of the operation to wind the fishing line guide in a spiral manner is of the order of ±0.1 mm, if the vertex of the fishing line guide is too sharp-edged, then the durability of the fishing line guide is reduced, and the like.

When a fishing line guide, which is provided on and projected from the inner surface of the rod pipe, is formed of the resin that flows, if the section area of a clearance (when a thin tape is not used, a clearance between the winding sections of a thick tape) between a thin tape, which is so wound as to extend between the winding sections of a thick tape, and the rod pipe main body prepreg wound layer PH is set 7% or less, preferably, 5% or less with respect to the section area AP of the rod pipe main body prepreg wound layer PH between the fishing line guide pitches LP, then the fibers of the rod pipe main body prepreg wound layer PH can be prevented from meandering, which in turn can prevent the strength of the rod pipe main body layer from being lowered. In this case, the quantity of the flow of the resin may be set in the range of 3%±2% (1–5%).

Also, when a fishing line guide is provided on and projected from the inner surface of the rod pipe by use of other material (fishing line guide mother material) such as carbon fiber bundles or the like which are produced separately from the rod pipe main body, if the size of a clearance between the fishing line guide mother material 216 and a thin tape wound (when the thin tape is not used, a clearance between the fishing line guide mother material 216 and thick tape) is set 7% or less, preferably, 5% or less with respect to the section area AP of the rod pipe main body prepreg wound layer PH between the fishing line guide pitches LP, then the fibers of the rod pipe main body prepreg wound layer PH can be prevented from meandering, which in turn can prevent the strength of the rod pipe main body layer from being lowered.

In the foregoing description, instead of the thick tape, a tape including on the outside thereof a groove in which the fishing line guide mother material can be wound may be wound around the surface of the core metal. Also, the above-mentioned tapes may be replaced with a sheet-shaped member which is large in width.

As can be clearly understood from the foregoing description, according to the invention, in a fishing rod manufacturing method in which a fishing line guide is provided on and projected from the inner wall of the rod pipe main body, the operation efficiency thereof can be enhanced and the quality of products can be improved.

FIG. 34 is an explanatory view of a method for manufacturing an interline fishing rod, in which a mold releasing agent, which is normally used, is applied onto a core metal (core member) 310, resin such as epoxy resin or the like is then applied onto this, and a thick tape 312 formed of heat resisting material such as fluorine material or the like is wound onto this with a proper clearance between the winding sections of the thick tape 312. The adhesive action of the resin applied allows the thick tape 312 to be stabilized on the core metal 10. In order that the section of the thick tape 312 can have a trapezoidal shape (for example, the upper base, lower base, and height thereof may be 0.4 mm, 1.2 mm, and 0.4 mm, respectively), the two side edges of the thick tape 312 are respectively formed in such inclined surfaces 312K as shown in FIG. 34, while the shape of a clearance set between the mutually adjoining tape winding sections is also a trapezoidal shape. The trapezoidal clearance may have an upper base length B of the order of 0.1–0.4 mm.

If the thick tape is wound around the core metal having a taper in such a manner that the winding pitches of the thick tape are set constant, then the direction of the thick tape becomes nearer to the circumferential direction of the core metal 310 on the base side thereof which is larger in diameter, whereas the tape direction becomes nearer to the longitudinal direction of the core metal 310 on the front side thereof which is smaller in diameter. Next, a thin tape 314, which is formed of polypropylene or the like and has a width extending up to the upper surfaces of the two side portions of the thick tape 312 which are positioned on the two sides of the trapezoidal clearance, is wound on the above in such a manner that it hangs down into the trapezoidal clearance. After then, a fishing line guide mother material 316, which has been previously prepared, is wound into the trapezoidal clearance from above the thin tape 314.

Next, a rod pipe main body forming prepreg is wound on the above and is then formed by heating while it is being pressurized by a tightening tape or the like. If the tightening tape is wound in a direction crossing the winding direction of the fishing line guide mother material 316 spirally wound in the tape clearance (for example, if the fishing line guide mother material 316 is wound clockwise, then the tightening tape is wound counterclockwise), then the height of the fishing line guides within the rod pipe formed can be made uniform easily. After the rod pipe is formed, the core metal 310 is taken out, the thick tape 312 is removed, and the thin tape 314 is generally removed but it may be left there according to cases.

Here, an area, which is enclosed by the thin tape 314 disposed into the trapezoidal clearance between the two side edges of the thick tape 312 and a broken line L1 representing the height of the thick tape 312, is a section area which is capable of receiving the fishing line guide mother material 316, while this section area may be formed substantially as large as the cross section area of the fishing line guide mother material 316. If the area of the former is assumed to be 100, then the cross section area of the fishing line guide mother material 316 is set in the range of 70~110. If the tension with which the thin tape 314 is wound is set large, then the thin tape 314 is able to invade deep into the trapezoidal clearance between the two side edges of the thick tape 312, whereas if such tension is set small, then the thin tape can invade into the trapezoidal clearance only a little. Therefore, the section area capable of receiving the fishing line guide mother material 316 can be adjusted according to the levels of the tension set.

To form the fishing line guide mother material 316, a large number of, that is, several thousands of fibers such as carbon fibers may be arranged into a bundle, the thus arranged bundle may be twisted, and, after then, it may be impregnated with resin such as epoxy resin or the like. In the case of a bundle which is composed of three thousand fibers or so, if it is twisted 80–120 times/m, then the cross section is easy to approach a circular shape. If the number of times of twisting is larger than this, then the fibers are twined together unless the tension is applied thereto. If it is smaller than this, the fibers are twisted unevenly and are thereby loose, so that they are difficult to invade into the clearance between the two side edges of the tape. In the case of a bundle which is composed of six thousand fibers or so, it may be twisted about 60 times/m. That is, the degree of the twisting may be changed according to the diameters of the fishing line guide mother material 316. If no twist is given to the bundle, it may be guided through a hole, so that it can invade into the clearance between the two side edges of the tape easily. In any case, the direction of the fibers extends substantially along the longitudinal direction of the fishing line guide.

The impregnation amount of the synthetic resin of the fishing line guide mother material is set in the range of 25~50 wt %. If the impregnation amount is less than 25 wt %, then the amount of the resin is too small, that is, air bubbles are easy to be generated, so that the surface of the fishing line guide surface of the fishing line guide becomes rough. Also, since the amount of the fibers is relatively large, the fishing line guide mother material is heavy in weight, with the result that the fishing rod is heavy in weight. On the other hand, if the impregnation amount exceeds 50 wt %, then the amount of the resin is too large, so that the fibers are caused to flow. As a result of this, the shape of the fishing line guide mother material is easy to collapse. Also, the fishing line guide is lowered in durability because it is short of the amount of the fibers. When the resin ratio of the rod pipe main body forming prepreg is 30 wt % or more, preferably, the impregnation amount of the synthetic resin of the fishing line guide mother material may be in the range of 25~40 wt %; and, on the other hand, when the resin ratio of the rod pipe main body forming prepreg is more than 30 wt %, preferably, the impregnation amount of the synthetic resin of the fishing line guide mother material may be in the range of 35~50 wt %. The reason for this is that, when the fishing line guide is formed of the fishing line guide mother material, there must be secured a sufficient flow of the resin within the thick tape clearance, including the resin inflow from the rod pipe main body forming prepreg.

The fishing line guide G formed in this manner is shown in FIG. 36. In FIG. 36, reference character 320 designates the layer of the rod pipe main body. Since the clearance between the two side edges of the tape is formed substantially as large as the cross section area of the fishing line guide mother material 316 and also the fishing line guide mother material 316 is formed in such a manner that the bundle of the fibers is twisted, the fibers are difficult to get loose and the fibers of the fishing line guide mother material 316 are difficult to flow when the rod pipe is formed by heating. After the bundle of the fibers of the fishing line guide mother material is wound, it is pressurized by a tightening tape or the like and is thereby pressed toward the core metal 310, so that it remains almost at the thus pressed position in the form of the fiber bundle GS impregnated with the resin. Although the synthetic resin of the fishing line guide mother material is easy to flow into a small clearance on the contact side of the fishing line guide G (that is, the foot side of the fishing line guide G) with the rod pipe main body forming prepreg to form the foot GJ of the fishing line guide G, the fibers prevail in the neighborhood of the top portion of the fishing line guide G serving as the contact surface thereof with the fishing line, so that the fishing line guide G is enhanced in durability. Also, as described above, since the clearance defined by the thin tape and broken line L1 is almost as large as the fishing line guide mother material, the reinforcing fibers of the rod pipe main body layer forming prepreg are prevented from flowing toward the core metal, thereby making it difficult for the rod pipe main body layer to meander, so that a high-strength rod pipe can be formed.

Between the fishing line guides, in some cases, there can be formed such a projecting portion SG having a small height as shown in FIG. 36. The cause for this seems that, since a soft and thick fluorine tape is wound around the tapered core metal 310 with tension applied thereto, the fluorine tape is not extended uniformly but the upper surface portion 318 of the thick tape 312 is caused to sink. At any rate, the existence of the projecting portion SG prevents the fishing line from touching the inner surface of the rod pipe directly. The pitch P of the fishing line guide G may be 50 or more times, preferably, 100 or more times as large as the height H of the fishing line guide G. When playing out the fishing line, the fishing rod is flexed only lightly and, therefore, even if there is employed the above-mentioned pitch P, the fishing line is received by the fishing line guide, the resistance of the fishing line is not increased, the carry of the fishing line can be extended, and the fishing line can be cast at an accurate position. Also, when the fishing rod is flexed greatly, as in a case in which fish caught on the terminal tackles of the fishing rod is wound up, if the pitch P is large, then the most part of the fishing line is received by the inner surface of the rod pipe main body layer, that is, for example, even if the fishing line guide G is formed of soft synthetic resin material, the soft fishing line guide G can be prevented against wear.

It is preferred that, if the surface hardness of the fishing line guide G is set almost equal to the hardness of a fishing line to be used, then they are difficult to wear against each other. That is, when a fishing line is formed of synthetic resin, the fishing line guide may be formed of synthetic resin which is almost equal in hardness to the synthetic resin of the fishing line, or only the surface portion of the fishing line guide may be formed of such resin. Also, it is preferred that, if the fishing line guide is formed of the same material or the same kind of material as the fishing line, they are difficult to be damaged against each other. For example, when a fishing line formed of polyamide system synthetic resin is used, the fishing line guide may be coated with a polyamide film, or the whole of the fishing line guide may be formed of polyamide resin. When one of the fishing line and fishing line guide is formed higher in hardness than the other, it is desirable that the fishing line guide may be formed slightly harder, because this can maintain the durability of the fishing rod longer than that of the fishing line. Also, if the surface of the fishing line guide is formed in a mirror surface, then such mirror surface can contribute toward reducing the resistance of the fishing line and prevent the fishing line against wear and damage. In order to provide such mirror surface, for example, a film of thermoplastic resin may be integrally coated onto the surface of the fishing line guide, or, after hard material is embedded into a small hole formed in the neighborhood of the top portion of the fishing line guide, the fishing line guide may be polished, or, after the rod pipe is formed by heating, the surface of the fishing line guide may be polished.

From the viewpoint of the relationship between the fishing line guide and spinning reel, it is preferred that the spiral direction of the spiral-shaped fishing line guide is opposite to the swing direction of the fishing line when it is played out from the spinning reel, because the fishing line can be received by the fishing line guide sufficiently and thus the resistance of the fishing line can be reduced.

In the top portion of the fishing rod, in some cases, the height of the fishing line guide can be set 0.2 mm or less. This is because the inside diameter of the rod pipe is increased to thereby secure a fishing line insertion space in a larger size or to reduce stress centralization which is caused by the existence of the fishing line guide and acts on the top portion of the rod pipe main body.

In the small diameter portion (front portion) of the fishing rod, since the height of the fishing line guide cannot be set large, it is preferred that the fishing line guide and rod pipe inner surface are both formed water repellent to thereby prevent water drops from being attached thereto and thus reduce the resistance of the fishing line. On the other hand, in the large diameter portion (base portion) of the fishing rod, since the height of the fishing line guide can be set large, when the fishing line guide is actually formed high, the neighborhood of the top portion of the fishing line guide may be formed water repellent to thereby cause the water drops to flow in the direction of the rod pipe inner surface; and, on the other hand, the rod pipe inner surface may be formed in an uneven rough surface of 10 microns or in a hydrophilic surface which can absorb the water drops received to thereby extinguish or spread thin them, so that the fishing line inserted through the interior portion of the rod pipe can be prevented from touching the water drops to thereby reduce the resistance of the fishing line.

Because the water drops are easy to flow into the top portion of the fishing rod, in order to prevent the fishing line from touching the water drops, it is preferred that the fishing line guide is set as high as possible; and, on the contrary, the water drops are difficult to flow into the base portion of the fishing rod and, therefore, the height of the fishing line guide may be set small. In view of this, the height of the fishing line guide in the top portion of the fishing rod may be set on the order of 0.4~0.5 mm, whereas the height of the fishing line guide in the base portion (middle rod) thereof may be set on the order of 0.1~0.4 mm. For example, in the top rod, the height of the fishing line guide may be set 0.4 mm, whereas the guide height may be set 0.2 mm in the middle rod.

The heights of the fishing line guides are set substantially constant within one rod pipe. Under this condition, there are available the following embodiments.

(1) If the main body layer of the front side of the rod pipe is formed thinner than the height of the fishing line guide and that of the base side of the rod pipe is formed thicker, then not only the flexure of the rod pipe can be enhanced but also the resistance of the fishing line can be reduced. Also, since the main body layer of the base side, on which a large force acts, is formed thick, the rod pipe is high in strength and durable with respect to the stress centralization that is caused by the existence of the fishing line guide. This embodiment is suitable for a surf-fishing rod which is used to catch medium- and small-sized fish.

(2) If the thickness of the main body layer is set smaller than the height of the fishing line guide within one rod pipe, then there can be obtained a rod pipe which is easy to flex. This embodiment is suitable for a soft-tone fishing rod.

(3) If the thickness of the main body layer is set larger than the height of the fishing line guide within one rod pipe, then there can be obtained a rod pipe which is strong. This embodiment is suitable for a surf-fishing rod which is used to catch big-sized fish, a ship fishing rod, a boat fishing rod, and the like.

If it is assumed that the circumferential direction of the rod pipe is zero in an angle standard, then the spiral-shaped fishing line guide can be inclined up to 60 degrees or so (that is, the lead angle thereof is 60 degrees or so). Preferably, the lead angle of the front side of the rod pipe may be set larger than that of the base side thereof, because the water drops can be drained outside with such ease as corresponds to the difference between the lead angles. Therefore, preferably, in the top rod, the lead angle thereof may be set in the range of 45~60 degrees. More preferably, the lead angle may be set in the range of 50 to 60 degrees.

In the foregoing description, the thin tape 314 may be replaced with a thin sheet member which is large in width. Also, if such thin tape or thin sheet is provided with a water repellent property and the like and also it has such heat resistance that allows itself to be engaged with the fishing line guide G and the inner surface of the rod pipe main body layer 320 when the rod pipe is formed by heating, as described above, such thin tape or thin sheet is not removed but may be left there. Generally, a thermoplastic resin tape or the like may be provided with a water repellent property. Also, instead of the clearance formed between the winding sections of the thick tape, there may be used a thick tape or a thin sheet which includes on the outer surface thereof a groove having a desired section shape, and the fishing line guide mother material 316 may be wound in the groove. If the section shape of the groove is set in a curved surface shape, then no corner is produced in the fishing line guide surface of the fishing line guide formed even without using the thin tape 314 or the thin sheet.

Now, FIG. 35 shows another embodiment of the invention in which the section of a thick tape 312' is not trapezoidal but rectangular. In this manner, in the manufacturing method according to the invention, no special restrictions are put on the shape of the thick tape. However, as will be described later, in order to manufacture a fishing rod which includes a fishing line guide higher in durability and can maintain the strength of the rod pipe main body, it is preferred that the thick tape has a specific trapezoidal shape.

Now, FIG. 37 shows an embodiment of a structure which is characterized by the boundary between the fishing line guide G and rod pipe main body layer 320. A typical example of the structure of the rod pipe main body layer 320 includes a thick middle layer 320B in which reinforcing fibers are directed mainly in the axial direction of the rod pipe, a thin outside layer 320A which is located outside the middle layer 320B and also in which reinforcing fibers are directed mainly in the circumferential direction of the rod pipe, and a thin inside layer 320C which is located inside the middle layer 320B and also in which reinforcing fibers are directed mainly in the circumferential direction of the rod pipe. In the present embodiment, further inside the inside layer 320C, there is arranged an axially extending thin layer 320D in which reinforcing fibers are directed mainly in the axial direction of the rod pipe. That is, since the reinforcing fibers of the layers 320C and 320D cross each other at right angles, the fishing line guide mother material is prevented from sinking into the rod pipe main body layer due to the pressure that is applied to the fishing line guide material when it is provided on and projected from the inner surface of the rod pipe main body layer. This in turn prevents the reinforcing fibers of the rod pipe main body layer 320, especially, the middle layer 320B from meandering, thereby preventing the strength of the rod pipe from being lowered. Here, it should be noted that the crossing direction of the reinforcing fibers must not be always at right angles but may also be at inclined angles.

Now, FIG. 38 shows another embodiment of the structure of a rod pipe main body layer which is similar in operation to the above-mentioned embodiment. The layers 320A, 20B, 20C and 20D of the present embodiment are similar to those employed in the above embodiment. However, in the present embodiment, further inside the layer 320D, there are arranged a similar thin inside layer 320E including reinforcing fibers directed mainly in the circumferential direction of the rod pipe, and an axially extending similar thin layer 320F with the reinforcing fibers thereof directed mainly in the axial direction of the rod pipe. That is, in the present embodiment, there is provided a structure in which there are arranged two sets of reinforcing fibers which intersect each other at right angles. According to the present embodiment, when compared with the structure shown in FIG. 37, the sinking preventive effect is enhanced. As a modification of this embodiment, the layer 320F can be omitted and, in this case, the layers 320D and 320E are considered to form a sinking preventive set. The thicknesses of the respective layers, for example, may be 0.05 mm, 0.4 mm, 0.03 mm, 0.03 mm, 0.03 mm, and 0.03 mm in the order of the layers 320A, 320B, 320C, 320D, 320E, and 320F. Referring to the thickness ranges of the respective layers, generally, the layer 320A has a thickness of 0.01~0.1 (preferably, 0.01~0.05) mm, the layer 320B has a thickness of 0.08~1 mm, and the remaining layers each has a thickness of 0.01~0.05 (preferably, 0.01~0.03) mm.

Now, FIG. 39 shows a section view of a rod pipe, in which a thick tape 312 is wound around core metal 310, a thin tape to be arranged in a clearance between the two side edges of the thick tape 312 is not shown, a fishing line guide mother material is wound in the clearance, and a rod pipe main body forming prepreg is wound on this; and, more particularly, FIG. 39 shows a section view of such assembly after the fishing line guide mother material and the rod pipe main body forming prepreg are formed by pressuring and heating. When the thick tape 312 wound around the core metal 310, as in the above-mentioned example, has a trapezoidal shape which is symmetrical in the horizontal direction and has the upper base, lower base, and height dimensions respectively of 0.4 mm, 1.2 mm and 0.4 mm, the two corners of the lower base of such trapezoid provide an angle θ of 45 degrees, and thus the foot of a rice-ball-shaped fishing line guide G actually formed also provides the same angle θ. However, this is only an example of dimensions that can be employed in the invention. As shown in FIG. 40, when this angle θ is small, even due to the pressure given thereto when it is formed, the deformation of the twisted fishing line guide mother member 316 is difficult to spread to the foot area SP of the clearance between the two side edges of the thick tape 312. As a result of this, the foot area SP runs short of fibers and resin. Also, in FIG. 41, there is shown a case in which the angle θ is large, and, in this case, even due to the pressure given thereto when it is formed, the deformation of the twisted fishing line guide mother member 316 is difficult to spread to the top area SP' of the clearance between the two side edges of the tape. As a result of this, the top area SP' runs short of fibers and resin.

Such areas, which run short of fibers and resin, are low in durability. In particular, when the top area of the fishing line guide G is short of such fibers and resin, it is poor in the fishing line guide performance. And, when the foot area of the fishing line guide G is short of such fibers and resin, stresses are centralized on this area, thereby lowering the strength of the rod pipe main body 320. When the angle θ is large, the foot area of the fishing line guide formed causes stresses to be centralized on the rod pipe main body 320, which similarly lowers the strength of the rod pipe main body 320. In view of this, the angle θ must be set in a proper range and, if it is set substantially in the range of 45±15 degrees, then not only the durability of the fishing line guide G but also the strength of the rod pipe main body 320 can be maintained.

Next, while the top area of the rice-ball-shaped fishing line guide G has a curved surface which projects outwardly, if the distance B of the clearance between the two side edges of the trapezoidal thick tape 312 is set too small, then the top area of the fishing line guide G is excessively sharpened, so that the fishing line can be cut easily by the sharpened top area and the fishing line guide G can be worn and damaged heavily. On the other hand, if the distance B is set too large, then the contact length of the fishing line becomes too long, so that the resistance of the fishing line can be increased. Therefore, the distance B must be set in a proper range and, preferably, it may be 0.1 mm or more and less than 0.4 mm. When the dimension B representing the width of the top area of the fishing line guide G is measured from the fishing line guide G, the distance between two points of intersection P4 and P1 may be measured, where the two points of intersection P4 and P1 are points of intersection between a line, which passes through the vertex T of the fishing line guide G and extends in parallel to the longitudinal direction of the rod pipe main body 320 (in FIG. 39, a line passing through points P4 and P1), and the extension lines of the two side surfaces of the rice-ball-shaped fishing line guide G (in FIG. 39, a line connecting a point P3 with a point P4, and a line connecting a point P2 with a point P1).

In FIG. 39, there is shown a method in which the fishing line guide is formed by using the thick tape 312. However, it is also possible to employ another method in which a thick sheet including a groove having a cross section shape identical with the section shape of the fishing line guide is used instead of the tape 312 and the fishing line guide mother material is wound in the groove of the thick sheet. In this case, even when the side wall surface of the groove is not always a plane but a gently curved surface, if the tangent plane of the side wall surface existing adjacently to the width-direction central position thereof is considered as a virtual plane (virtual line) equivalent to a line connecting the point P1 with P2 or a line connecting the point P3 with P4 in FIG. 39, then the remaining portions of this method are similar to the method shown in FIG. 39 using the thick tape 312.

When the fishing line guide G is formed in the interior portion of the rod pipe main body 320, if the rod pipe main body 320 is formed straight as shown in FIG. 42(a), then the longitudinally directed reinforcing fibers thereof are straight, which is best from the viewpoint of the strength of the rod pipe. However, as described before, actually, in the fishing line guide manufacturing method, if a soft tape such as a fluorine tape is used and the tape is wound around a core metal while applying tension to the tape, then the center portion of the tape is caused to sink when compared with the two side edge portions of the tape, with the result that the rod pipe main body 320 is turned into such a state as shown in FIG. 42(b), that is, in the portions of the rod pipe main body existing between the two mutually adjoining fishing line guides G, the t2 portion (center portion) thereof becomes thicker, whereas the t1 portion (end portion) thereof becomes thinner. The difference $\delta$ t is generally about $\frac{1}{10}$ of the portion t2 or less, and the absolute size thereof is of the order of 0.02 mm. In the t1 portion, stress centralization is caused to occur due to the presence of the fishing line guides G. However, since the t1 and t2 portions are substantially equal in the fiber amount to each other, the fiber ratio of the t1 portion is increased or higher as the t1 portion is smaller in thickness, which allows the t1 portion to withstand the stress centralization more strongly according to the increased fiber ratio thereof, thereby being able to maintain the strength of the rod pipe.

Also, if the rod pipe main body 320 is turned into such a state as shown in FIG. 42(c), then the stress centralization in the base portion of the fishing line guide G due to the existence of the fishing line guide G can be relieved when compared with the state shown in FIG. 42(b). Further, because the base portion (that is, t1' portion) of the fishing line guide is larger in thickness than a t2' portion, the portion t1' can withstand well the stress centralization in the base portion of the fishing line guide caused by the existence of the fishing line guide, with the result that the strength of the rod pipe main body 320 can be maintained.

As can clearly understood from the foregoing description, according to the invention, even if the fishing line guide is provided on and projected from the inner surface of the rod pipe main body, the reduction in the strength of the rod pipe is small as well as the durability and fishing line guiding performance of the fishing line guide formed can be enhanced.

Also, it is possible to provide an interline fishing rod which includes a fishing line guide that is high in durability and fishing line guiding performance.

FIG. 43 is a side view of a rod pipe for an interline fishing rod according to the invention, showing a state in which the rod pipe is under formation. FIG. 44 is an enlarged section view of the above rod pipe taken along the arrow line B—B shown in FIG. 43, showing a state in which the rod pipe is already formed by heating after passage of the state shown in FIG. 43. In particular, at first, a thick tape-shaped member 412 is wound on a core metal 410, while the tape-shaped member 412 is formed of skin, silicone, teflon, or artificial material such as rubber or the like, or natural material having heat resistance to the temperature at which the rod pipe is heat-treated. The term "thick" is used in comparison with a "thin" tape 414 to be discussed later and, in particular, the thick tape-shaped member 412 has a thickness almost as large as the height of the mother material of a fishing line guide 420.

There is prepared spiral-shaped fishing line guide mother material which is previously formed by impregnating fibers with synthetic resin into a string shape. And, the thick tape-shaped member 412 is wound around the core metal 410 while a clearance SP is arranged between the side edges of the tape-shaped member 412. This clearance SP is a space which is formed between the mutually adjoining side edges 412a and 12b of the tape-shaped member 12 wound. The spiral-shaped fishing line guide mother material (after formed, reference number 420 is given thereto) is wound in the clearance SP in such a manner that a thin tape-shaped member 414 formed of polyethylene naphthalate (PEN), polyethylene terephtalate (PET) or the like having heat resistance to the forming temperature is interposed between the spiral-shaped fishing line guide mother material and the clearance SP. Alternatively, prior to the winding of the spiral-shaped fishing line guide mother material, a mold releasing agent may be applied so that, after formed, the fishing line guide 420 and thin tape-shaped member 414 can be separated smoothly from each other.

The thin tape-shaped member 414 is provided in order that the fishing line guide 420 does not include any corner on the surface thereof but includes a round surface when the synthetic resin flows and is hardened in the rod pipe heating formation, in other words, the tape-shaped member 414 is provided in order to prevent the fishing line resistance from increasing and to prevent the fishing line against damage when the fishing line touches the fishing line guide 420. Therefore, the thin tape-shaped member 414, may be omitted. That is, in place of this, the side edge portion of the thick tape-shaped member 412 may be formed in a recessedly curved surface. Or, instead of forming the outer shape of the fishing line guide 420 by the clearance SP between the side edges of the thick tape-shaped member 412, a recessedly curved surface may be previously formed in the outside middle portion of the thick tape-shaped member 412 itself, and the outer shape of the fishing line guide may be defined here. Further, a recessedly curved surface may be previously formed in the outside portion of a thick cylindrical tube itself to be put on the core metal, and the outer shape of the fishing line guide may be defined here.

After the fishing line guide mother material is provided in this manner, from above this, there is applied a mold releasing agent such as fluorine system or silicone system synthetic resin, natural wax, synthetic wax, oil-based wax, or the like. In this case, the mold releasing agent must be applied onto the fishing line guide mother material, but it may be applied to the other areas in an arbitrary manner, that is, it may be applied or it may not. However, since the mold releasing agent has a water repellent proper or a property which can reduce the contact resistance of the fishing line, if the mold releasing agent is applied onto the upper surface of the thick tape-shaped member 412 (or onto the upper surface of the thin tape-shaped member 414, when it is used) as well, then a layer having such property can be formed together on the inner surface of the rod pipe main body layer formed, which is advantageous in reducing the resistance of the fishing line.

After the mold releasing agent is dried, a prepreg for forming a rod pipe main body layer (a rod pipe main body layer formed of this prepreg, after formed, is designated by reference number 418) is wound a proper number of times. Next, according to the usual method, the resultant assembly is tightened by a tightening tape and is then heated and hardened. After then, if the core metal 410 is taken out from the thus formed assembly held in a state shown in FIG. 44 (in which the tightening tape is not shown) as well as the thick tape-shaped member 412 and thin tape-shaped member 414 are removed therefrom, then there can be formed a rod pipe including the spiral-shaped fishing line guide 420 projecting inwardly of the rod pipe. Also, on the inner surface (including the boundary portion between the fishing line guide 420 and itself) of the rod pipe main body layer 418, there is formed a thin layer 416 containing a large amount of mold releasing agent, while the synthetic resin such as epoxy resin or the like contained in the rod pipe main body forming prepreg and spiral-shaped fishing line guide mother material has flown away. By the way, instead of using the tightening tape, the rod pipe may also be pressurized and formed by using a metal mold.

The existence of the layer 416 prevents the fishing line guide 420 from being united together with the rod pipe main body layer 418. In particular, when the flexure of the rod pipe is small, the fishing line guide 420 is not separated from the rod pipe main body layer 418 seemingly but, when the flexure of the rod pipe is large, the fishing line guide 420 is separated from the rod pipe main body layer 418, thereby preventing the stress centralization. Therefore, even if the rod pipe is flexed greatly, the rod pipe can be prevented against breakage. Also, in the present embodiment, a seat surface at which the fishing line guide 420 is to be situated is formed in the inner surface of the rod pipe main body layer 418, exactly, in a recessed portion 418D thereof, and the fishing line guide 420 is embedded in such seat surface. Due to this, at least when the flexure of the rod pipe is small, the fishing line guide 420 can be stabilized with respect to the rod pipe main body layer 418.

Instead of applying the mold releasing agent after provision of the fishing line guide mother material, a very thin fluorine film or the like may be wound and, after then, the rod pipe main body forming prepreg may be wound. In the thus formed rod pipe, a layer having a mold releasing property is formed between the rod pipe main body layer and fishing line guide and, at the same time, a layer having a water repellent property can be formed on the inner surface of the rod pipe main body layer. Instead of winding the fluorine film, there can be used a film formed of synthetic resin material which is excellent in a fishing line sliding property and is difficult to be damaged, such as polyethylene, polypropylene, or the like. Further, the synthetic resin film may also be used in combination with a film having a mold releasing property such as the above-mentioned fluorine film or the like. By the way, the rod pipe manufacturing process consists mainly of an operation to wind the necessary components around the core metal, while the winding operation is carried out at room temperature. Therefore, if thermoplastic resin having a separating property, a water repellent property, and a fishing line sliding property is used, then it is not sticky, so that the winding operation can be executed with high efficiency. Also, since the thermoplastic resin shows a high melting temperature, it is difficult to melt perfectly even at the rod pipe forming temperatures, so that a thin film-shaped layer is easy to be formed as it is.

Generally, the rod pipe main body layer 418 comprises a thin inside layer 418A, a thick middle layer 418B with the reinforcing fibers thereof directed substantially in the axial direction of the rod pipe main body layer, and a thin outside layer 418C with the reinforcing fibers thereof directed substantially in the circumferential direction of the rod pipe main body layer. If most of the reinforcing fibers of a prepreg for forming the inside layer 418A are directed substantially in the circumferential direction, then the fishing line guide 420 is formed such that it is embedded in this prepreg when the rod pipe is formed, which is convenient to achieve the structure in which the fishing line guide is provided in such a manner that it is embedded in a recessed portion formed in the rod pipe main body layer. Also, preferably, the impregnated resin ratio of the inside layer may be set larger than the middle and outside layers. For example, the ratio may be set 30 wt % or more, preferably, 40 or 50 wt % or more. The fishing line guide may be embedded in the shallow range of the inside of the inside layer. Preferably, the reinforcing fibers of the middle layer 418B may be influenced by the embedded fishing line guide and thereby prevented from meandering so that they are directed in the axial direction of the rod pipe main body layer.

However, in a small-diameter rod pipe such as a top rod or the like, the reinforcing fibers of the inside layer 418A are not directed in the circumferential direction of the rod pipe, but they are formed by overlapping a very thin prepreg directed, for example, in the direction of +45 degrees with respect to the axial direction of the rod pipe with a very thin prepreg directed in a direction at right angles to the above direction, that is, in the direction of −45 degrees with respect to the axial direction, thereby being able to enhance the strength of the top rod against not only the collapse thereof but also the twist thereof, which in turn eliminates the need for reinforcement with the fishing line guide. The overlapping or obliquely intersecting angles may also be ±30 degrees or the like, that is, the essential thing is that the angles are symmetrical with respect to the axial direction. These two very thin prepregs may be 50 microns or less, preferably, 30 microns or less in thickness.

If the reinforcing fibers of the inside layer are directed substantially in the axial direction of the rod pipe, then such reinforcing fibers apply a force to hold the fishing line guide, thereby preventing the fishing line guide from being embedded into the inside layer prepreg. That is, when the rod pipe is flexed greatly, the fishing line guide is easy to be separated from the rod pipe main body layer in appearance as well, which facilitates the relief of the stresses. Such fishing line guide may also be other fishing line guides than the spiral-shaped fishing line guide with the reinforcing fibers directed in a direction extending along the longitudinal direction of the fishing line guide. For example, such fishing line guide may be composed of annular fishing line guides which are provided separately from each other.

That is, although the fishing line guide 420 consists of the spiral-shaped fishing line guide in the foregoing description, the invention is not limited to this but the fishing line guide 420 may also be composed of the annular fishing line guides that are provided individually.

As can be clearly understood from the foregoing description, according to the invention, since the layer having a mold releasing property is interposed between the rod pipe main body layer and fishing line guide, the fishing line guide is not formed integrally with the rod pipe main body layer. Thus, if the flexure of the rod pipe is increased, then the fishing line guide is seen in appearance as well in such a manner that it is separated from the rod pipe main body layer, that is, stresses are not centralized as in a case when a fishing line guide is formed integrally with a rod pipe main body layer, thereby being able to prevent the rod pipe against breakage.

In addition to the above effect, because the fishing line guide is provided in such a manner that it is embedded in a recessed portion formed in the rod pipe main body layer, although they are not united together, their mutual positions are difficult to shift and, even if rubbed by the fishing line, the fishing line guide is stabilized, thereby being able to prevent an increase in the fishing line resistance.

Before the prepreg for forming the rod pipe main body layer is wound on the fishing line guide mother material, the mold releasing agent is applied onto the upper side of the fishing line guide mother material or a film-like member having a mold releasing property is disposed on the same. Therefore, after then, if the prepreg for forming the rod pipe main body layer is wound and the thus formed winding assembly is then heated according to the usual method, then the rod pipe can be formed. At the same time, the fishing line guide projected inwardly can be provided easily and at low costs through the layer having a mold releasing property.

FIG. 45 is a partial view of a tape 510 which is employed in a fishing rod manufacturing method according to the invention. The central portion 510K of the tape 510 is a reinforcing layer, while the upper and lower layers 510J are layers which are respectively formed of flexible material. Here, alternatively, the flexible material layer 510J may be arranged only one side. As the flexible material, there are available a natural rubber system or synthetic rubber system elastomer, thermoplastic resin and the like which have a property to stand temperatures at which the rod pipe is heated and formed. Since the flexible material is removed after the rod pipe is formed, the material that can be separated smoothly from other elements is desirable, for example, fluorine rubber and silicone rubber are suitable for this purpose. The reinforcing layer 510K consists of an aggregate of fibers which are lower in elongation than the flexible material. The component fibers of the aggregate or the reinforcing layer 510K have a diameter of 30 micron or less, preferably, 10 microns or less. Such fine fibers, or very fine fibers are aggregated into a bundle, a woven fabric, or an unwoven fabric to thereby form the reinforcing layer, and flexible material smaller in thickness than the reinforcing layer is united integrally with at least one surface side of the reinforcing layer, thereby producing the tape 510.

In particular, to form the tape 510, there are used natural fibers such as silk and the like, inorganic fibers such as carbon fibers, glass fibers and the like, or organic fibers such as polyester fibers, aramide fibers and the like. The tape 510 formed of such fibers is softer than a tape which is formed of flexible material over the whole thickness of the tape, and is thus easier to flex. Therefore, this tape 510 can be wound easily around a core metal having a small diameter, and also can be wound easily and accurately into a desired spiral shape or the like. Also, when compared with the tape which is formed of the flexible material over the whole tape thickness, the tape 510 is small in elongation. Therefore, because the tape 510 is elongated only a little and is deformed little even if it is pulled with a strong force when it is wound around a core metal or the like, it can be wound with a given width dimension of great precision.

Further, the layer of the flexible material is a layer which is formed of a natural rubber system or synthetic rubber system elastomer, thermoplastic resin or the like. As the material for forming the present flexible material layer, there is selected the material that has a property to stand the temperatures at which the rod pipe is heated and formed. However, if it is heated, then it is inevitable that the flexible material layer can be deteriorated to a certain degree, that is, if a tape is formed of only the material of this layer, there is a fear that the tape can be cut on the way when it is removed after the rod pipe is heated and formed. On the other hand, in the tape used in the present invention, there is provided the reinforcing layer 510K, so that the tape is increased in strength. Especially, when the tape is formed of inorganic fibers, the tape is high in strength, because the inorganic fibers will deteriorate little.

Now, FIG. 46 is an explanatory view of a rod pipe, showing a case in which an interline fishing rod is manufactured in a fishing rod manufacturing method according to the present invention. Preferably, a mold releasing agent may be applied to the surface of a core metal 512, and the tape 510 with a given width shown in FIG. 45 may be wound around the core metal 512 at a given pitch. A heat resisting thin tape or sheet is then wound in a clearance or a space formed between the side edges of the thus wound tape 510. However, according to cases, this thin tape or sheet can be omitted. Next, fishing line guide mother material 514, which is formed of carbon fibers or the like impregnated with resin, is wound in the space between the tape side edges. Then, a prepreg for forming a rod pipe main body is wound on the fishing line guide mother material 514 and tape 510. After then, the resultant assembly is heated and hardened while it is pressurized by winding a tightening tape or by use of a metal mold or the like.

After the rod pipe is formed by heating and hardening, the pressurizing means is removed, the core metal 512 is also taken out, and the tape 510 is further removed by pulling end portion thereof.

In this rod pipe manufacturing operation, since the tape 510 is flexible, high in strength and small in elongation, the tape 510 can be wound easily around the core metal 512 having a small diameter, and the dimensional precision of the tape clearance is improved, with the result that a spiral-shaped fishing line guide, which is capable of guiding the fishing line smoothly and with high precision, can be formed easily. Also, because very fine fibers are generally used to form the reinforcing layer 510K, the reinforcing layer 510K includes fluffy bodies on the surface thereof and, when the rod pipe is heated and formed, the resin of both the fishing ling guide mother material 514 and rod pipe main body forming prepreg 516 melts and takes such fluffy bodies thereinto. And, when the tape 510 is removed, these fluffy bodies are left on the surface of the fishing line guide and on the inner surface of the rod pipe main body. This can reinforce the fishing line guide surface portion as well as the rod pipe inner surface portion, which in turn can improve the wear resistance of these portions.

When the pitch distance of the spiral-shaped fishing line guide is too large, or when the clearance between the annular fishing line guides is too large, there is a possibility that the fishing line can touch the portion of the rod pipe inner surface existing in such large pitch or clearance and the resistance of the fishing line can be thereby increased. Therefore, it is necessary to reduce the increased resistance of the fishing line. Now, description will be given below of an idea to achieve the reduction of such increased resistance of the fishing line. In FIG. 47, a reinforcing layer 510K' includes a flexible material layer 510J' on one side thereof, while one surface of the flexible material layer 510J' is formed in a slightly undulated or uneven condition. The reason for this is as follows: that is, the reinforcing layer 510K' is formed in a woven fabric and thus, if a layer of flexible material is pressurized from above the reinforcing layer 510K' or is caused to melt to be thereby united together with the reinforcing layer 510K', then the flexible material layer is caused to show such an undulated condition as corresponds to the undulated condition of the surface of the reinforcing layer 510K' which serves as the base member for the flexible material layer. Such undulated condition normally has a height of 10 microns or less, preferably, 0.1~7 microns. If the tape 510' is wound with such slightly undulated surface side thereof facing to the rod pipe main body forming prepreg, then slight undulations can be formed on the rod pipe inner surface.

If such slight undulations are formed, then fluorine resin or the like can be sprayed on the inner surface of the rod pipe by means of a sprayer, and the fluorine resin or the like can be held in the slight undulations, so that a water repellent property can be given to the inner surface of the rod pipe and the effect to reduce the contact resistance of the fishing line can be maintained.

Also, the slight undulations on the tape surface can also be produced by any other methods, and the existence of the reinforcing layer 510K' is not always essential, for example, the tape may be formed of only fluorine rubber.

Now, FIG. 48 is an explanatory view of a method for forming spiral-shaped undulated strips on the outer periphery of a rod pipe used in a fishing rod of a type that a fishing line is guided outside the rod. In this method, a mold releasing agent is applied onto a core metal 512, a rod pipe main body forming prepreg 516 is wound on this, and a tape 510 having the same property as the tape employed in the embodiment shown in FIG. 46 is used and wound on the above. Of course, other types of tapes can also be used. However, as described above, since the tape 510 is flexible, if the tape 510 is used, then the winding operation can be executed easily and with high precision, and the clearance dimension precision can also be improved. Then, string-shaped mother material 524 is wound in a space formed between the side edges of the tape 510 and, next, for example, vertically divided metal molds 520A and 520B are placed on the above components. After then, the whole of such assembly is heated and formed while it is being pressurized. Similarly to the embodiment shown in FIG. 46, after a thin tape or sheet is arranged over the space between the side edges of the tape in which the string-shaped mother material can be wound, the string-shaped mother material may be wound on the thin tape or sheet. Also, instead of the metal molds, a tightening tape may be used.

After completion of such heating and formation, if the metal molds are taken out from the assembly as well as the tape 510 and core metal 512 are removed therefrom, then spiral-shaped undulated strips of a desired dimension shape can be formed on the surface of the rod pipe, the fishing line can be prevented from touching the surface of the rod pipe, and the fishing line is allowed to touch the rod pipe only in a point contact manner. Also, even if the rod pipe is wet, because the top portions of the projecting strips of the undulated strips are not wet, the contact resistance of the fishing line can be reduced.

The width of the recessed strips of the undulated strips may be set 3 or more times, preferably, 5~20 times as large as the width of the projecting strips of the undulated strips. Also, with the height of the projecting strips of the undulated strips used as a reference, the width of the recessed strips of the undulated strips may be set 10 or more times, preferably, 15~50 times as large as the height of the projecting strips of the undulated strips.

When the thickness of the rod pipe main body forming prepreg 516 is sufficiently large with respect to the necessary strength, if the above assembly is heated and formed while being pressurized instead of winding the string-shaped mother material, then the rod pipe main body forming prepreg 516 is partly caused to flow, so that projections can be formed on the rod pipe surface instead of the string-shaped mother material. This can also apply similarly to a case in which projecting portions such as fishing line guides or the like are to be formed on the inner surface of the rod pipe.

As can be seen clearly from the foregoing description, according to a fishing rod manufacturing method of the invention, in an interline fishing rod, there can be formed a projecting fishing line guide of high precision which can guide the fishing line smoothly, and, in a fishing rod with a fishing line guided outside the rod, there can be provided a fishing rod in which undulations are provided on the surface of a rod pipe and the fishing line is received by the projecting portions of the undulations so that the fishing line can be guided smoothly. Further, in the interline fishing rod, slight undulations can be formed easily and simply on the inner surface of the rod pipe.

FIG. 49 is a longitudinal section view of the main portions of an interline fishing rod according to the invention, and FIG. 50 is an enlarged transverse section view taken along the arrow line B—B shown in FIG. 49, that is, a transverse section view of a rod pipe 610 extending at right angles to the axial direction of the rod pipe 610. In the present embodiment, a fishing line guide G, which extends continuously for a given length in a spiral manner, is formed integrally with the interior portion of the rod pipe 610 which is formed of resin such as epoxy resin or the like and is reinforced with fibers such as carbon fibers or the like. The spiral-shaped fishing line guide is formed mainly of string-shaped fishing line guide mother material which is made of a bundle of reinforcing fibers C such as carbon fibers or the like impregnated with resin such as epoxy resin or the like. That is, the string-shaped fishing line guide mother material is heated and hardened together with the mother material of the rod pipe 610, so that the spiral-shaped fishing line is united with the rod pipe 610.

On the two sides of a reinforced area G1 which contains a relatively large number of the above-mentioned reinforcing fibers C, there are disposed resin areas G2 and G3 which are respectively formed mainly of resin in such a manner that they extend continuously with the reinforced area G1. Also, the respective inner peripheries G2S and G3S of the two resin areas are substantially continuous with the inner periphery G1S of the reinforced area G1, while the thickness of the resin areas decrease substantially little by little as they become more distant from the reinforced area G1. In this manner, the end portions of the two resin areas lie at positions which, when they are measured from the central position of the reinforced area G1, respectively form angles $\alpha 1$ and $\alpha 2$ which are both equal to or less than 90 degrees, and, when the central portion of the outer periphery GS of the reinforced area G1 is set in the lower-most position, are higher than the reinforced area GC. Further, the shape of the inner periphery G1S of the reinforced area G1 is substantially a recessed shape or a plane shape.

Therefore, when the rod pipe 610 is flexed, the stress centralization of the rod pipe 610 can be prevented from occurring at the positions of the two side ends of the reinforced area GC, that is, at the boundary positions of the reinforced area to the respective resin areas; and, since the resin areas decrease gradually in thickness, the occurrence of stress centralization can be prevented in the resin areas as well. Also, even the whole of the fishing line guide G with the reinforced area and resin areas summed together is less than the half of the periphery of the rod pipe 610 and, therefore, even if the fishing line guide is provided, an increase in the weight of the rod pipe can be controlled to a minimum. Further, the fishing line can be guided stably by the reinforced area inner periphery G1S that is situated lower than the inner peripheries of the resin areas. Moreover, since the inner periphery of the reinforced area has a substantially recessed or plane shape, the fishing line is going to stay in such reinforced area inner periphery, which can stabilize the guiding state of the fishing line.

In the above-mentioned embodiment, the reinforcing material of the reinforced area is the reinforcing fibers C but this is not limitative, for example, particles harder than the resin used and short fiber-like material can also be used. Also, from the viewpoint of integrated formation, it is preferred that the resin of the spiral-shaped fishing line guide G is similar to (or identical with) in property to the resin of the rod pipe 610. However, alternatively, the spiral-shaped fishing line guide G may also be provided in such a manner that it can be freely separated from the rod pipe 610. Further, as shown in FIG. 51, for example, in the inner periphery of the reinforced area G1, there can exist partially projecting portions T (or partially recessed portions), or, in the inner periphery of the resin areas, there can exist partially projecting or recessed portions which are similar to the above. However, the terms used in the present specification, that is, "substantially continuous state" and "substantially recessed or plane shape" of the inner periphery of the reinforced area do not mean to exclude the existence of the above-mentioned projecting or recessed portions. The essential thing is that the fishing line is situated in the inner periphery of the reinforced area but not in the resin areas.

For example, as in the section view of the spiral-shaped fishing line guide G shown in FIG. 49, if the shown inner periphery line G1S' of the reinforced area G1 is a straight line, then the shape of the inner periphery of the reinforced area G1 provides such a recessed shape as shown in FIG. 50 in the transverse section taken along the arrow line B—B shown in FIG. 49. Even if the inner periphery line G1S' is not a straight line but a gently projecting line, generally, in FIG. 50, the shape of the inner periphery of the reinforced area G1 provides a recessed shape. But, if a spiral angle θ measured with the transverse section as a reference is too large, then the inner periphery shape is difficult to provide a recessed shape. Therefore, the spiral angle θ may be set 45 degrees or less, preferably, it may be set in the range of 10–35 degrees. However, here, the essential thing is that the shape of the inner periphery of the reinforced area in FIG. 50 is a recessed or plane shape, that is, no limit is set on the section shape shown in FIG. 49.

As can be seen clearly from the foregoing description, according to the invention, it is possible to provide a fishing rod with an inserted fishing line which is not contrary to the expected weight reduction, prevents the occurrence of the stress centralization, and, even when a rod pipe is flexed, is able to guide a fishing line in the reinforced area of a fishing line guide. of said two resin areas are so formed as to be substantially continuous with the inner periphery of said reinforced area, while said reinforced area inner periphery is so formed as to have a substantially recessed or plane shape; and, when the central position of the outer periphery of said reinforced area is set in the lower-most position, said two resin areas respectively decrease little by little in thickness as they become more distant from said reinforced area, while the respective end portions of said resin areas are present at positions of 90 degrees or less in the circumferential direction of said rod pipe from said central position and higher than said reinforced area.

What is claimed is:

1. An interline fishing rod including an interior passageway for receiving fishing line extending along a longitudinal direction of said rod, said rod comprising:

a rod pipe main body portion defining a passageway extending in a longitudinal direction along an interior of said main body portion from a base end side to a top end side thereof;

a fishing line guide projected inwardly from an inside wall of said main body portion and defining a width in said longitudinal direction at a joining interface with said main body portion, said fishing line guide comprises a primary guide surface projecting away from said main body portion, wherein said primary guide surface is asymmetrical and substantially inclined in one direction from a base end side of said primary guide surface to a top end side of said primary guide surface.

2. The interline fishing rod according to claim 1, wherein said fishing line guide is asymmetrically formed with respect to said longitudinal direction, wherein a radially inner most surface of said primary guide surface is adjacent said top end side of said fishing line guide and longitudinally offset from a longitudinal center point of said width.

3. The interline fishing rod according to claim 2, wherein said top end side of said primary guide surface defines a convex surface projecting into said passageway to contact said fishing line.

4. The interline fishing rod according to claim 2, wherein said fishing line guide further comprises a gently inclined surface extending from said primary guide surface toward said main body portion.

5. The interline fishing rod according to claim 2, wherein a tip end of said fishing line guide including said primary guide surface is formed of a relatively hard material as compared to a base portion of said fishing line guide upon which said tip end is disposed.

6. The interline fishing rod according to claim 5, wherein said fishing line guide defines an overall height from said main body portion to said radially innermost surface, and said tip end defines a secondary height from said base portion to said radially innermost surface, and wherein said secondary height is more than 10% of said overall height.

7. The interline fishing rod according to claim 6, wherein said secondary height is in the range of 20% to 60% of said overall height.

8. The interline fishing rod according to claim 5, wherein said tip end comprises a gently inclined surface extending from said top end side of said primary guide surface to said base end side of said primary guide surface.

9. The interline fishing rod according to claim 8, wherein said gently inclined surface terminates at a sloping surface of said base portion of said fishing line guide.

10. The interline fishing rod according to claim 8, wherein said gently inclined surface terminates at a main body portion.

11. The interline fishing rod according to claim 1, wherein said width defines a maximum width of said fishing line guide at said joining interface with said main body portion.

12. The interline fishing rod according to claim 1, wherein each of said primary guide surfaces comprises a tip end formed of a relatively hard material as compared to a base portion of said fishing line guide upon which said tip end is disposed.

13. The interline fishing rod according to claim 12, wherein said relatively hard material is selected from the group consisting of at least one of ceramic, metal, and synthetic resin.

14. The interline fishing rod according to claim 12, wherein said fishing line guides defines an overall height from said main body portion to said radially innermost surface, and said tip end defines a secondary height from said base portion to said radially innermost surface, and wherein said secondary height is more than 10% of said overall height.

15. The interline fishing rod according to claim 14, wherein said secondary height is in the range of 20% to 60% of said overall height.

16. An interline fishing rod including an interior passageway for receiving fishing line extending along a longitudinal direction of said rod, said rod comprising:

a rod pipe main body portion defining a passageway extending in a longitudinal direction along an interior of said main body portion;

a fishing line guide projected inwardly from an inside wall of said main body portion and defining a width in said longitudinal direction at a joining interface with said main body portion, said fishing line guide comprises a primary guide surface projecting away from said main body portion, wherein said fishing line guide is asymmetrically formed with respect to said longitudinal direction, wherein a radially innermost surface of said primary guide surface is longitudinally offset from a center point of said width and an exterior surface of said fishing line guide defines a bell-curve shape skewed toward a tip end of said interline fishing rod.

17. An interline fishing rod including an interior passageway for receiving fishing line extending along a longitudinal direction of said rod, said rod comprising:

a rod pipe main body portion defining a passageway extending in a longitudinal direction along an interior of said main body portion;

a fishing line guide projected inwardly from an inside wall of said main body portion and defining a width in said longitudinal direction at a joining interface with said main body portion, said fishing line guide comprises a primary guide surface projecting away from said main body portion, wherein said fishing line guide is asymmetrically formed with respect to said longitudinal direction, wherein a radially innermost surface of said primary guide surface is offset from a longitudinal center point of said width and said fishing line guide further comprises a gently inclined surface extending from said primary guide surface toward said main body portion.

18. An interline fishing rod including an interior passageway for receiving fishing line extending along a longitudinal direction of said rod, said rod comprising:

a rod pipe main body portion defining a passageway extending in a longitudinal direction along an interior of said main body portion;

a fishing line guide projected inwardly from an inside wall of said main body portion and defining a width in said longitudinal direction at a joining interface with said main body portion, said fishing line guide comprises a primary guide surface projecting away from said main body portion, wherein each of said primary guide surfaces comprises a tip end formed of a relatively hard material as compared to a base portion of said fishing line guide upon which said tip end is disposed, and said base portion comprises a gently inclined surface extending from said primary guide surface toward said main body portion.

19. The interline fishing rod according to claim 18, wherein said gently inclined surface terminates at a sloping surface of a bottom portion of said base portion of said fishing line guide.

20. The interline fishing rod according to claim 18, wherein said gently inclined surface terminates at a main body portion.

21. An interline fishing rod including an interior passageway for receiving fishing line extending along a longitudinal direction of said rod, said rod comprising:

a rod pipe main body portion defining a passageway extending in a longitudinal direction along an interior of said main body portion;

at least one fishing line guide projected inwardly from an inside wall of said main body portion and defining a width in said longitudinal direction at a joining interface with said main body portion, said fishing line guide comprises a primary guide surface projecting away from said main body portion, wherein a single one of said at least one fishing line guide comprises a plurality of longitudinally spaced apart primary guide surfaces defined by discrete projecting surfaces projecting into said passageway to contact said fishing line.

22. The interline fishing rod according to claim 21, wherein said fishing line guide further comprises a gently inclined surface extending from said primary guide surfaces toward said main body portion.

23. The interline fishing rod according to claim 21, wherein said fishing line guide comprises a plurality of convex primary guide surfaces disposed within said width and projecting into said passageway to contact said fishing line.

24. The interline fishing rod according to claim 21, wherein each of said primary guide surfaces comprises a tip end formed of a relatively hard material as compared to a base portion of said fishing line guide upon which said tip end is disposed.

25. The interline fishing rod according to claim 24, wherein said relatively hard material is selected from the group consisting of at least one of ceramic, metal, and synthetic resin.

26. The interline fishing rod according to claim 24, wherein said fishing line guides defines an overall height from said main body portion to said radially innermost surface, and said tip end defines a secondary height from said base portion to said radially innermost surface, and wherein said secondary height is more than 10% of said overall height.

27. The interline fishing rod according to claim 26, wherein said secondary height is in the range of 20% to 60% of said overall height.

28. An interline fishing rod including an interior passageway for receiving fishing line extending along a longitudinal direction of said rod, said rod comprising:

a rod pipe main body portion defining a passageway extending in a longitudinal direction along an interior of said main body portion;

a fishing line guide projected inwardly from an inside wall of said main body portion and defining a width in said longitudinal direction at a joining interface with said main body portion, said fishing line guide comprises a primary guide surface projecting away from said main body portion, wherein said at least one fishing line guide comprises a plurality primary guide surfaces defined by discrete projecting surfaces into said passageway to contact said fishing line, each of said primary guide surfaces comprises a tip end formed of a relatively hard material as compared to a base portion of said fishing line guide upon which said tip end is disposed, and said base portion comprises a gently inclined surface extending from said primary guide surface toward said main body portion.

29. The interline fishing rod according to claim 28, wherein said gently inclined surface terminates at a sloping surface of a bottom portion of said base portion of said fishing line guide.

30. The interline fishing rod according to claim 28, wherein said gently inclined surface terminates at a main body portion.

* * * * *